United States Patent [19]

Borbas et al.

[11] 3,908,099

[45] Sept. 23, 1975

[54] FAULT DETECTION SYSTEM FOR A TELEPHONE EXCHANGE

[75] Inventors: Robert A. Borbas; John R. Dufton, both of Brockville, Canada

[73] Assignee: GTE Automatic Electric (Canada) Limited, Brockville, Canada

[22] Filed: Sept. 27, 1974

[21] Appl. No.: 510,093

[52] U.S. Cl. .......... 179/175.2 R

[51] Int. Cl.[2] .......... H04M 3/24

[58] Field of Search . 179/175.2 R, 175.2 C, 18 AG; 340/172.5

[56] References Cited

UNITED STATES PATENTS

| | | | |
|---|---|---|---|
| 3,060,273 | 10/1962 | Nowak et al. | 179/175.2 R |
| 3,409,877 | 11/1968 | Alterman et al. | 179/175.2 R |
| 3,423,539 | 1/1969 | Page et al. | 179/175.2 R |
| 3,557,315 | 1/1971 | Kobus | 179/18 AG |
| 3,623,011 | 11/1971 | Baynard et al. | 340/172.5 |
| 3,626,383 | 12/1971 | Oswald | 179/172.5 |
| 3,865,999 | 2/1975 | Spitaels | 179/175.2 R |

*Primary Examiner*—Kathleen H. Claff
*Assistant Examiner*—Douglas W. Olms
*Attorney, Agent, or Firm*—John T. Winburn; Richard O. Gray, Jr.

[57] ABSTRACT

A fault detection system transfers the control of the telephone exchange from the presently on line common data bus and its associated dedicated subsystems over to an off line common data bus and its associated dedicated subsystems.

The fault detection system comprises a monitoring means for monitoring the operation of the on line common data bus and its associated dedicated subsystems for providing a first multiple bit status word indicative of the operative conditions of the on line common data bus and its associated dedicated subsystems, means coupled to the monitoring means for storing the first multiple bit status word, status word updating means coupled to the monitoring means and the storing means for updating the first status word to indicate the current operative status of the on line common data bus and associated dedicated subsystems and for setting a bit within the first status word indicating a request for a first test routine, and means for transmitting the first status word to the on line central processor for causing it to obtain a first test instruction from its program memory and for acting thereupon. The fault detection system additionally comprises clock means coupled to the monitoring means for setting a predetermined time period and for providing a control signal when the on line common bus and its associated dedicated subsystems fail to complete the first test instruction routine within the predetermined time and transfer means coupled to the clock means and to the dedicated subsystems for transferring the control of the telephone exchange from the on line common data bus and its associated dedicated subsystems over to the off line common data bus and its associated dedicated subsystems in response to the control signal.

18 Claims, 50 Drawing Figures

FAULT DETECTION SYSTEM FOR A TELEPHONE EXCHANGE

BACKGROUND OF THE INVENTION

The present invention is directed to a fault detection system for use in a telephone exchange of the type which has duplicated common data buses and dedicated subsystems for each common data bus and additionally a third plurality of subsystems which are common to both data buses.

Modern telephone exchanges must exhibit high reliability for continuously processing requested service by the telephone subscribers associated with the telephone exchanges. One method of providing high reliability is to duplicate those subsystems of the exchanges which provide the primary control functions for processing telephone subscriber calls. One such exchange is disclosed and claimed in Borbas et al, U.S. Pat. No. 3,767,803 which issued on Oct. 23, 1973 and which is assigned to the assignee of the present invention. The exchange system theredisclosed is a system wherein first and second common data buses are associated with respective dedicated first and second subsystems and wherein a third plurality of subsystems are common to both data buses. Each of the plurality of dedicated subsystems includes a central processing unit comprising a bus control unit, a test panel, a central processor and a fault buffer, a program memory, a status detector driver, a status detector control, a data memory selector and a data memory control.

The bus control units interface each central processor to its common data bus and one such bus control unit is fully disclosed and claimed in Borbas, U.S. Pat. No. 3,812,297 which is also assigned to the assignee of the present invention. The bus control unit theredescribed is one which is compatible with the present invention and provides an address cycle followed by a data cycle indicated by signals on the control conductors for use by the central processor. Any further reference to a bus control unit may be made to the aforementioned U.S. Pat. No. 3,816,297.

The central processor of each plurality of dedicated subsystems controls the overall operation of the telephone exchange under the commands of the operational codes which are stored in its associated program memory. Such a central processor is fully disclosed and claimed in copending U.S. Pat. application Borbas et al, titled Central Processor for a Telephone Exchange, Ser. No. 510,092 which was filed on the same day as this application and is also assigned to the assignee of the present invention.

During the operation of a telephone exchange such as the one disclosed in U.S. Pat. No. 3,767,863 only one common data bus and its associated plurality of dedicated subsystems are operatively on line to control the operation of the third plurality of subsystems common to both data buses for processing telephone calls. The fault detection system of the present invention monitors the operation of the on line common data bus and its associated dedicated subsystems and provides a transfer of the control of the telephone exchange from the on line common data bus and its associated dedicated subsystems to the off line common data bus and its associated dedicated subsystems under a plurality of conditions which indicate that the presently on line system is faulty. In so doing, the fault detection system of the present invention assures that the telephone exchange is continuously in an operative state for properly handling requested service by its telephone subscribers.

SUMMARY OF THE INVENTION

It is therefore an object of the present invention to provide a fault detection system for a telephone exchange.

It is a further object of the present invention to provide a fault detection system which monitors the operation of an on line common data bus and its associated dedicated subsystems and which transfers the control of the telephone exchange to the off line data bus and its associated dedicated subsystems when the on line data bus and its associated dedicated subsystems are inoperative for the proper handling of requested subscriber service.

It is a still further object of the present invention to provide a fault detection system which requests the on line central processor to obtain test instructions from its associated program memory and which monitors the on line central processor to determine if the on line common data bus and its associated dedicated subsystems complete the test routine defined by the test instructions within a predetermined time and to transfer control of the telephone exchange to the off line common data bus and its associated dedicated subsystems should the on line common data bus and its associated dedicated subsystems fail to complete the test routine within the predetermined period of time.

It is a still more particular object of the present invention to provide a fault detection system for a telephone exchange which periodically initiates a test call to be executed by the on line common data bus and its associated dedicated subsystems and for transferring control of the telephone exchange to the off line common data bus and its associated dedicated subsystems should the on line common data bus and its associated dedicated subsystems fail to execute two consecutive test calls within a predetermined period of time.

The present invention provides, in a telephone exchange of the type which includes a first common data bus, a second common data bus, a first plurality of subsystems dedicated only to the first common data bus, a second plurality of subsystems dedicated only to the second common data bus, and a third plurality of subsystems common to both of the first and second common data buses, wherein only one common data bus and its associated dedicated subsystems are operatively on line with the third plurality of subsystems at any instant in time for providing requested telephone subscriber service, and wherein each of the first and second dedicated subsystems includes a program memory for storing a plurality of operational codes including a plurality of test instructions, and a central processor for controlling the operation of its associated dedicated subsystems and the third plurality of subsystems in response to its program memory operational codes, a fault detection system for transferring the control of the telephone exchange from the presently on line common data bus and its associated dedicated subsystems over to the other off line common data bus and its associated dedicated subsystems. The fault detection system comprises monitoring means for monitoring the operation of the on line common data bus and its associated dedicated subsystems for providing a first multiple bit status word indicative of the operative conditions of the one line common data bus and its associated dedicated subsystems, means coupled to the monitoring means for storing the first multiple bit status word, and status word updating means coupled to the monitoring means and the storing means for updating the first status word to indicate the current operative status of the on line common data bus and associated dedicated subsystems and for setting a bit within the first status word indicating a request for a test routine. The fault detection system additionally comprises means for transmitting the first status word to the on line central processor for causing it to obtain a first test instruction from its program memory and for acting thereupon, clock means coupled to the monitoring means for setting a predetermined time period and for providing a control signal when the on line common bus and its associated dedicated subsystems fail to complete the first test instruction routine within the predetermined time and transfer means coupled to the clock means and to the dedicated subsystems for transferring the control of the telephone exchange from the on line common data bus and its associated dedicated subsystems over to the off line common data bus and its associated dedicated subsystems in response to the control signal.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings and in the several figures of which like reference numerals indicate identical elements and in which:

DESCRIPTION OF THE PREFERRED EMBODIMENT

Figure 1:
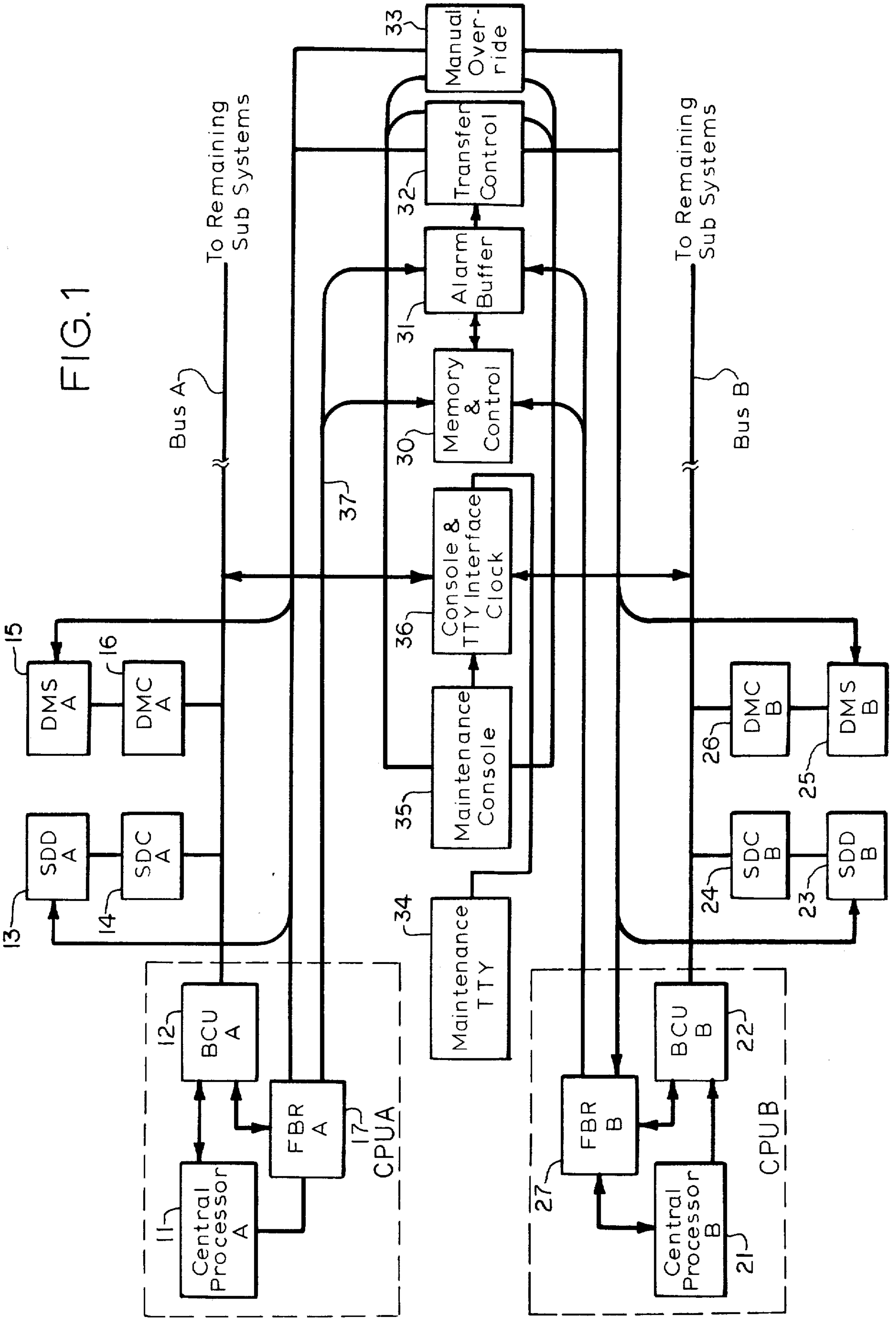
FIG. 1 is a simplified block diagram showing a fault detection system embodying the present invention.

Referring now to FIG. 1, there is shown a portion of a telephone exchange which embodies the fault detection system of the present invention. A portion of the telephone exchange shown on FIG. 1 comprises common data bus A and its associated dedicated subsystems comprising central processor A, 11, bus control unit A, 12, status detector driver A, 13, status detector control A, 14, data memory selector A, 15, and data memory control A, 16. Hereinafter bus A and its dedicated subsystems will be referred to as system A.

Likewise, system B comprises common data bus B and its associated dedicated subsystems including central processor B, 21, bus control unit B, 22, status detector driver B, 23, status detector control B, 24, data memory selector B, 25, and data memory control B, 26.

The fault detection system comprises fault buffer A, 17, fault buffer B, 27, and a configuration controller comprising the memory and control 30, alarm buffer 31, transfer control 32, and manual override 33. Also associated with the configuration controller is maintenance TTY 34, maintenance console 35 and the console and interface clock 36.

As can be seen from the drawing each central processing unit comprises a central processor, a bus control unit and a fault buffer. Each fault buffer monitors the operation of its common data bus and dedicated subsystems and stores its systems operative status conditions within a memory. The configuration controller operates in a series of time slots, and at various times the information in the fault buffer memories are transferred to the configuration controller wherein they are incorporated into a system status word which is indicative of the operative conditions of the common data buses and their associated dedicated subsystems. The status words during preselected time intervals are transferred back to the fault buffers and their central processors to provide the central processors with current information as to their operative status. The configuration controller operates through eight consecutive time slots and these time slots will be referred to in detail later.

The configuration controller receives the operative status information from the fault buffer and uses this information to provide the status word and also to cause a system transfer under preselected sets of conditions. At any one instant in time, the telephone exchange is under the control of only one of the systems, system A or system B in conjunction with the remaining subsystems which are connected in common to both bus A and bus B for establishing requested service by telephone subscribers.

The functions of the dedicated subsystems such as the status detector drivers, status detector controls, data memory selectors and data memory controls are described in the aforementioned U.S. Pat. No. 3,767,863 patent.

When the configuration controller determines that one of the systems is not performing its functions properly, transfer control 32 will cause the control of the exchange to be transferred from the on line system to the off line system. One condition which could cause such a transfer is the failure by the on line system to perform an extended test routine which is requested by its configuration controller. At periodic intervals, the configuration controller will *r* request a test routine which is hard wired activated and the on line central processor will obtain from its program memory a series of test instructions. For example, assuming that system A is on line and that the configuration controller requests an extended test routine, the configuration controller will update the system A status word to indicate that it is time for system A to execute the extended test routine. This status word is transferred to the fault buffer over line 37 from memory and control 30 wherein the status word is contained and central processor 11 will read the status word and recognize that one of the bits in the multiple bit status word requires the extended test routine. Central processor 11 will then obtain from its program memory the extended test routine program and cause its system to execute the test instructions. If the test instructions are not completed within a predetermined period of time, transfer control 32 of the configuration controller will cause system A to go off line and system B to go on line.

Another situation which could cause a transfer is the failure of the on line system to execute two consecutive test calls which are hard wired initiated by the configuration controller within a predetermined time period for each execution. As will be made clear later, the configuration controller includes test call logic which includes an associated clock for requesting a test call to be placed into the on line system at periodic intervals. If the on line system fails to execute the test call within a predetermined time, two consecutive times, the transfer and control 32 will cause the on line system to go off line and the off line system to go on line.

Another condition which could cause a transfer to take place is referred to as the autostop condition. Each central processor has a test panel associated with it which provides manual access to the central processor. Each subsystem of the telephone exchange is assigned a discrete address and a discrete address may be entered and stored on the test panel associated with the on line central processor. When the on line system addresses the selected address, a comparator within its fault buffer will match the manually selected address with the address utilized by its system and cause its system to stop functioning. Obviously, the next time an extended test routine is requested, the extended test routine will be failed and control of the telephone exchange will be transferred from the on line system to the off line system.

Another condition which could cause a transfer is referred to as a one hour transfer wherein every hour (or 64 minutes) the control of the telephone exchange is transferred from the on line system to the off line system to assure that the off line system is fully operative. The configuration controller includes a one hour clock and one hour transfer logic for accomplishing this function and will be described in detail later.

Lastly, a transfer may be brought about manually by the manual override 33. This allows maintenance personel to cause a transfer and to obtain maintenance information by utilizing maintenance console 35 and having the maintenance information printed out by maintenance TTY 34.

Even though only one of the systems is operatively on line to establish requested subscriber service in conjunction with the remaining subsystems common to both data buses, the off line system does execute certain internal instructions to maintain itself in ready condition. However, the off line system is precluded from writing information onto its bus to avoid improper data from reaching the remaining subsystems common to both buses. The off line system stores within its fault buffer memory its operative conditions and additionally performs a test routine which comprises fewer instructions than the extended test routine performed by the on line processor. The configuration controller provides the off line system with its own status word to be read by its central processor. One bit of this status word will indicate to the off line system that it is off line.

Figure 2:
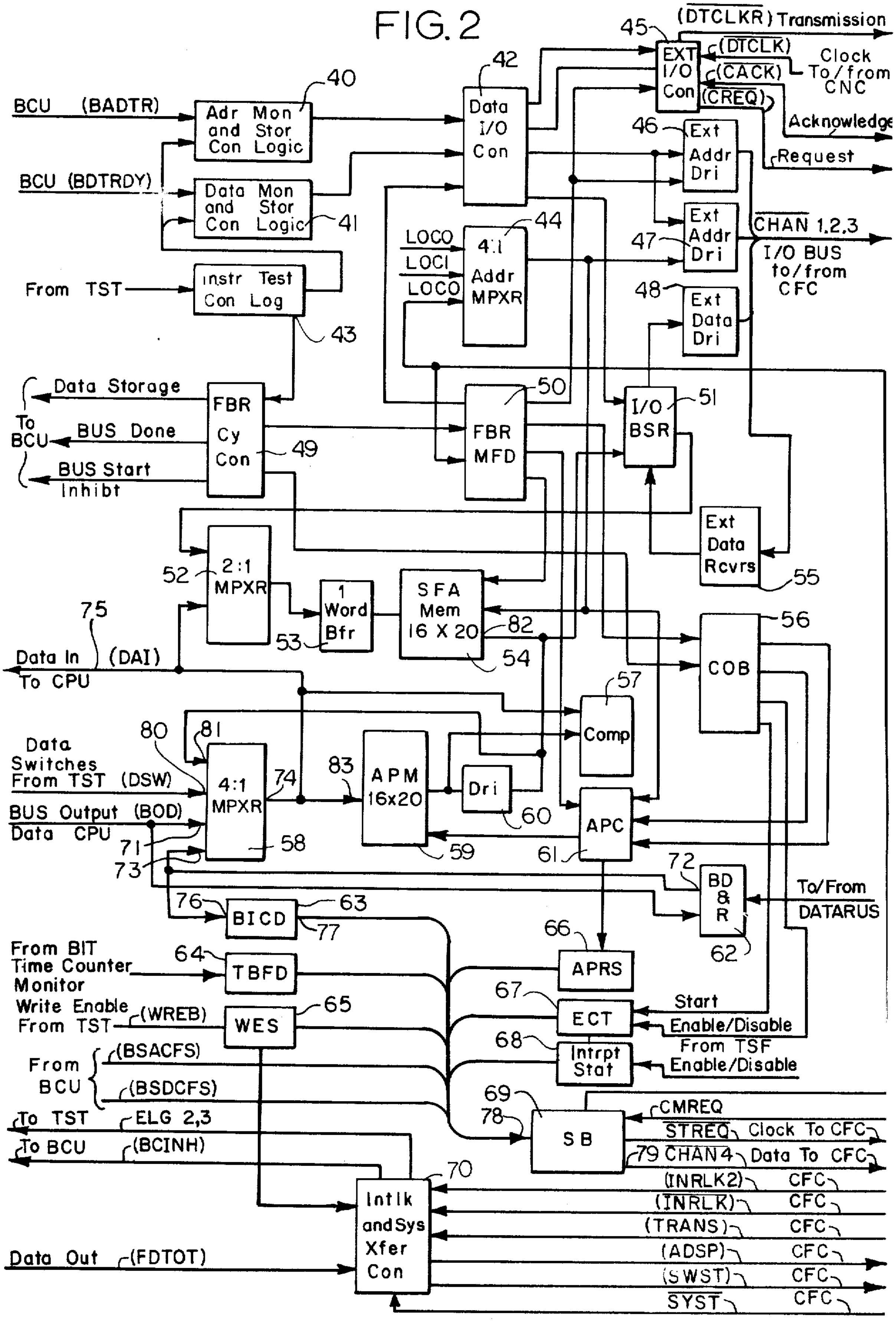
FIG. 2 is a detailed block diagram of a fault buffer comprising a portion of the fault detection system of the present invention.

Referring now to FIG. 2, there is shown a detailed block diagram of one of the fault buffers which comprises a portion of the fault detection system and which embodies the present invention. The fault buffer of FIG. 2 comprises address monitor and storage control logic 40, a data monitor and storage control logic 41, data in-out control 42, instruction test control logic 43, 4-1 address multiplexer 44, external in-out control 45, external address drivers 46 and 47, external data drivers 48, fault buffer cycle control 49, fault buffer memory field decoder 50 and in-out buffer shift register 51. The fault buffer of FIG. 2 additionally comprises 2-1 multiplexer 52, one word buffer 53, 20 bit 16 word system fault accumulator memory 54, external data receivers 55, command output buffer 56, comparator 57, 4-1 multiplexer 58, 20 bit 16 word autoprint memory 59, drivers 60, autoprint control 61, and bus drivers and receivers 62. It additionally comprises bus initial conditions detector 63, time base fault detector 64, write enable status 65, autoprint ready status 66, executive cycle timer 67, interrupt status 68, status buffer 69, and interlocking and system transfer control 70.

The 4-1 multiplexer 58 receives data from its central processor at input 71. This data is received from the central processor arithmetic logic register which provides the data, and address data from the central processor bus address register. This data is also transferred to the bus drivers and receivers 62 which serves as an interface between the central processor and the data bus. Any time a subsystem is addressed by the central processor, the central processor provides an address cycle wherein the data passed to the bus drivers and receivers 62 is the address of the particular subsystem being written into or read out from and then a data cycle which either passes data from the central processor to the selected subsystem over the data bus or receives data from the selected subsystem over the data bus back to the central processor. The data coming back from the bus is transferred from output 72 of bus drivers and receivers 62 to input 73 of the 4-1 multiplexer 58. If the data is to be passed to the central processor, the 4-1 multiplexer at output 74 will provide this data which will then be passed to the central processor over DAI line 75. Output 72 is also coupled to input 76 of bus initial conditions detector 63. The bus initial conditions detector at the start of each bus cycle examines the data bus lines to determine if any of them are inoperative by being shorted to ground. Should there be such a line which is inoperative, the bus initial conditions detector 63 provides an output at its output 77 which goes to the status buffer 69 input 78 which is then transferred to the configuration controller at output 79.

Input 80 of the 4-1 multiplexer 58 is coupled to the data switches located on the central processor test panel. These switches are used to input an instruction or data manually from the test panel into the multiplexer to be utilized by the central processor. Input 81 is coupled to the output 82 of the system fault accumulator memory 54 and to the output of drivers 60. The junction of the output of driver 60 and output 82 of the system fault accumulator memory forms a hard wired OR.

The output of the 4-1 multiplexer 74 is coupled to the central processor over DAI line 75 for transferring information to the central processor, to input 83 of autoprint memory 59, and to comparator 57. Therefore, multiplexer 58 is utilized to funnel data at its inputs to the central processor, the autoprint memory, or comparator 57.

The 4-1 multiplexer 58 and the 2-1 multiplexer 52 comprise what will be referred to later as an I/O selector. The I/O selector simply switches bits of information into different places within the fault buffer. This provides the capability of sending data out onto the data bus and additionally sending this data to the fault buffer.

Time base fault detector 64 is coupled to the bit time counter of the central processor. As fully described in the copending application Ser. No. 510,092, entitled a Central Processor for a Telephone Exchange, the bit time counter is described in detail as including a shift register which provides a shifting bit to initiate the instructions of the central processor. The time base fault detector examines the bit time counter output to determine whether or not the shifting bit is present. If the output of the bit time counter is all zeros, the central processor will be in an undefined state which is unacceptable. Should the shifting bit not be present, the time base fault detector will provide an output to the status buffer 69 which then will be transferred to the configuration controller wherein this information is used to update the on line system status word which later will be communicated back to the central processor to inform it that the bit time counter is in an undefined state and will additionally reset the bit time counter to 0.

The write enable status 65 is utilized to allow the off line processor to write if it is so desired. As previously stated, the off line system is precluded from writing onto the bus because both systems have common subsystems connected to the pair of data buses. Write enable status 65 is coupled to the central processor test panel and provides means to write for test purposes under the commands received from the test panel. The write enable status 65 has an output coupled to the interlocking and system transfer control which normally precludes the off line system from writing and responsive to the write enable status will allow the off line system to write under the commands initiated at the CPU test panel. The write enable status is also coupled to the status buffer 69 wherein the write enable status commands from the test panel are transferred from the configuration controller and used to update the off line systems status word for communicating with the central processor that its system may write.

Autoprint ready status 66 allows maintenance personnel to print out data which is stored in a preselected subsystem when the system reaches the selected subsystem. The autoprint ready status 66 is merely a flag to indicate the ready status for the print function. The maintenance console 35 of FIG. 1 is utilized for providing the address of the selected subsystem. The central processor will read the data switches on the maintenance console defining the address of the particular subsystem or program memory to be accessed for printing and conveys the address to the autoprint memory through the 4-1 multiplexer 58. The autoprint memory is coupled to the comparator 57. DAI line 75 is also coupled to the comparator 57. On each bus cycle the comparator will compare the selected subsystem address to the address sent out by the central processor on the DAI lines and when they match the comparator will provide a signal to the autoprint control which then conveys the ready status to the autoprint ready status 66. At the same time, the data on the bus at the time the address is matched will be stored in the autoprint memory 59. Then, when the central processor receives its status word which will indicate that the autoprint ready status 66 is set, the data stored in the autoprint memory will then be utilized to print the data received from the selected address. The data is printed onto the maintenance TTY 34 shown in FIG. 1.

The executive cycle timer 67 is merely a timer which sets a minimum time in which its system can carry out its executive routine. At the beginning of each executive cycle of the central processor, which is a predetermined number of instructions, the executive cycle timer is set and should its system fail to complete its executive cycle within the time specified by the timer, the executive cycle timer will provide an output to the status buffer which is conveyed to the configuration controller to update its status word indicating that its system has failed to execute its executive instructions within the minimum time established by the executive cycle timer. The executive cycle timer therefore is simply a timer which is utilized to detect when the central processor is hung up in a closed loop and unable to get out of the loop.

The interrupt status 68 is coupled to the executive cycle timer 67 and provides an input to the status buffer when the system has failed to run its executive cycle within the minimum time established by the executive cycle timer. The interrupt status 68 provides an output to the status buffer 69 which is conveyed to the configuration controller to update its system status word to reset the systems central processor by resetting its program address register back to 0.

The interrupt status 68 is coupled to the command output buffer 56 which is in turn coupled to fault buffer cycle control 49. The fault buffer cycle control 49 is coupled to the instruction test control logic 43 which is coupled to the CPU test panel. Therefore the CPU test panel has access to the interrupt status 68 and provides it with an enable status to enable the interrupt to occur. Likewise, the interrupt status 68 may be disabled from the CPU test panel.

The status buffer 69 is additionally coupled to the bus control unit and receives the BSACFS and BSDCFS signals from the bus control unit. The status buffer in response to these signals will detect whether or not a device which is addressed responds within a predetermined period of time. If it does not, it will convey this information also to the configuration controller. Therefore, the status buffer at input 78 has inputs from 8 different sources. The status buffer is a shift register which is a parallel load and serial output shift register and as the 8 lines provide the status buffer with their information, the status buffer will be loaded. The status buffer will then generate a clocking sequence $\overline{\text{STREQ}}$ and transfers its information over $\overline{\text{CHAN4}}$ to the configuration controller. $\overline{\text{CHAN4}}$ is a single 8 bit data line which is unidirectional, that is, information only flows in the direction from the status buffer to the configuration controller over this line. It can therefore be considered an error data line which is utilized to update the systems status word within the configuration controller.

Interlocking and system transfer control 70 provides manual control of the off line processor and additionally serves to preclude the off line processor from writing onto the data bus. It also disables the on line systems test panel to preclude manual manipulation of the on line system. The only exception to this is when a maintenance personnel decides to stop the on line processor when it addresses a specific subsystem as previously explained. Leads INRLK2, $\overline{\text{INRLK}}$, TRANS are all received via the configuration controller which provide the interlocking and system transfer control with necessary information to allow it to interlock the proper system.

The autoprint memory 59 is a random access bipolar memory and is capable of storing 16, 20 bit words. It is utilized to store the address of the particular subsystem that is desired to print on.

The system fault accumulator memory is a 20 bit, 16 word memory and has two locations which are dedicated to fault buffer hardware. These are locations 0 and 1. Location 0 is utilized for storing the address of the current subsystem being addressed by the system and location 1 is used for storing the data received from or sent out to the particular subsystem with the address in location 0. Therefore, should a fault occur while the particular subsystem is being addressed by the system, the fault buffer will contain that address which may be utilized for maintenance purposes. Each address and each set of data received or sent out to each address is stored within the system fault accumulator memory.

Command output buffer 56 is a set of flip-flops in the fault buffer which are accessible by the system's software and are used to enable and disable such portions of the fault buffer such as the interrupt status 68, starting the executive cycle timer 67, and for controlling the autoprint control 61.

Fault buffer cycle control 49 provides overall timing that is required by the fault buffer. The fault buffer operation is by necessity closely linked to the timing of the bus operation and the fault buffer cycle control is utilized to monitor the timing sequence of the bus operations. If the central processor wants to store information into the system fault accumulator memory into any location except location zero and one, it addresses that memory of FFF1X, where X is 0-F. The first three digits, FFF, are unique to the fault buffer. If the control logic determines that the data is not to be sent out onto the bus but instead to remain within the fault buffer, the bus control unit must be inhibited because this information is not to be sent out onto the bus. As soon as the FFF address is detected, the bus start inhibit is generated by the fault buffer cycle control 49. The fault buffer itself then takes on the timing function which the processor still expects to see in transferring its data. Therefore, after all of the data is transferred from the central processor to the fault buffer memory, the fault buffer cycle control 49 provides a bus done signal, as the bus cycle unit would have, had the central processor written onto the data bus. The BCU forwards the bus done signal from the fault buffer cycle control to the central processor. Should the central processor request a data in from the fault buffer, the fault buffer cycle control 49 will provide a data storage signal to be utilized by the central processor so that is knows that it may store the data.

The address monitor and storage control logic 40 provide the function of taking the address from the BCU which the central processor is to communicate with and sees to it that the address is stored within the system fault accumulator memory at location zero. The data monitor and storage control logic 41 provides a similar function in that it takes the data coming back from the device or being sent out to the device and stores it in location 1 of the system fault accumulator memory. The address monitor and storage control logic and the data monitor and storage control logic receive their address and data information respectively from the bus control unit over lines BADTR and BDTRDY respectively.

The instruction test control logic 43 is coupled to the central processor test panel. This is where the instruction test data from the test panel can be introduced into the central processor. The instruction test control logic provides the timing for transferring the data on the test panel into the central processor. Its output goes back into the fault buffer cycle and control 49 to provide bus done, data storage and bus start inhibit signals for the central processor.

The data I/0 control 42 and the 4-1 address multiplexer 44 provide timing signals for controlling the sequence when data is stored into or read out of the configuration controller, the system fault accumulator memory, the autoprint memory, or the command output buffer. The fault buffer must generate its own internal timing because these memories must be conditioned for writing data into them or extracting data from them. They can be considered therefore a memory timer. The output of the 4-1 address multiplexer 44 is utilized as the address leads into the autoprint memory, system fault accumulator memory, or the command output buffer. The location information is obtained from LOC0, LOC1 and LOC0 leads on the 4-1 address multiplexer 44. Recalling for the moment that location 0 and location 1 of the system fault accumulator memory were hard wired, the 4-1 address multiplexer therefore selects one of these addresses and the address monitor and storage control logic will provide a code to the 4-1 address multiplexer to select location 0 and that address will be presented to the system fault accumulator memory. There are two accesses to location 0, one from the address monitor 40 and the other from the leads labeled LOC0. The configuration controller utilizes the second location 0 lead to obtain information from the system fault accumulator memory.

The external I/O control 45 is set of drivers and receivers used to generate the requesting and acknowledgement signals in order for the fault buffer to communicate with the configuration controller. $\overline{\text{CREQ}}$ is the request, and $\overline{\text{CACK}}$ is the acknowledge signal. Whenever the configuration controller is requested for data transmission it is conditioned by the $\overline{\text{CREQ}}$ request signal. A signal is sent on $\overline{\text{CACK}}$ at the same time the request signal is generated if the data is to be transmitted to the configuration controller and when the data cycle is over the configuration controller will send a signal back on the acknowledge line to acknowledge that the data transmission is over. $\overline{\text{DTCLK}}$ and $\overline{\text{DTCLKR}}$ are utilized during the transmission of the data and are utilized to clock data through the 20 bit channel line designated $\overline{\text{CHAN}}$1.2.3. The 20 bit channel is three parallel bidirectional eight bit channels. The first two channels utilize all eight bits, and the third channel utilizes only the first four bits thus providing a communication channel capable of transferring 20 bits of data.

The configuration controller does the timing for the transfer of information and the fault buffer sets up the request. The request is set up on the $\overline{\text{CREQ}}$ line. The 4-1 address multiplexer 44 feeds into the external address driver 47 and sets up an address. The configuration controller upon receiving the request will store the address and will pass the requested information back to the fault buffer. The configuration controller has a memory, which will be disclosed in greater detail later, and it is the information in this memory that is requested by the fault buffer. The address received by the configuration controller is the address of the information contained within that memory. The information in that address is passed back over $\overline{\text{CHAN}}$1.2.3. In actuality, the configuration controller obtains the information from the address in its memory and places it in three 8 bit shift registers. It then generates a series of clock pulses which are used to shift the data out of its shift registers and the clock pulses are also sent on line $\overline{\text{DTCLK}}$ back to the fault buffer and are used to shift the data into the shift registers of the fault buffer. In this way the 20 bit data word can be reconstructed. The data is received at the I/O buffer shift register through the external data receivers 55. It is introduced back into the fault buffer through the 2-1 multiplexer 52. It is then passed through the system fault accumulator memory and then back to the 4-1 multiplexer 58. From there it may be transferred to the DAI line to the central processor. This therefore establishes a path from the configuration controller back to the central processor. It is this path that is utilized for transmitting the 20 bit status word from the configuration controller to the central processor.

Figure 3:
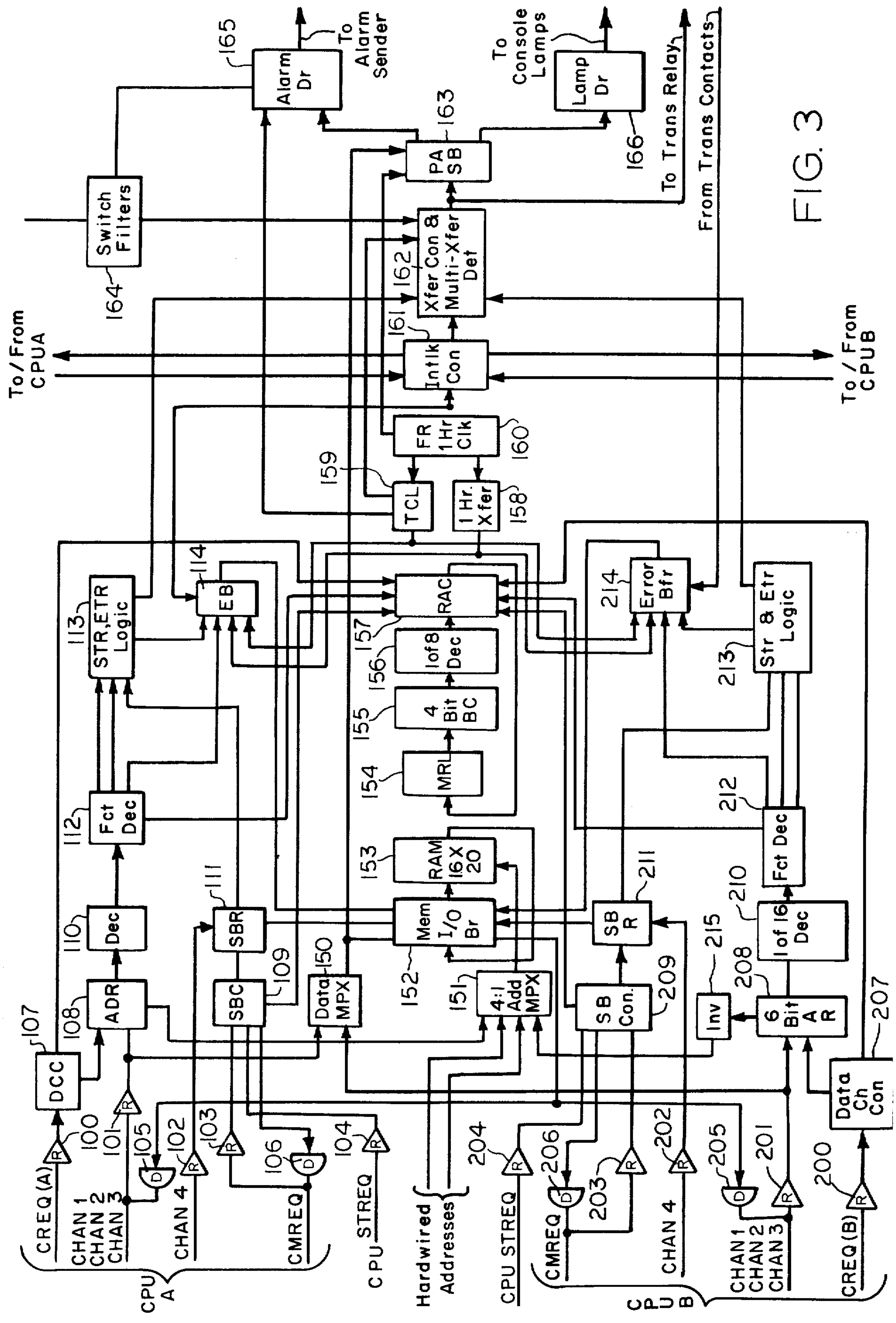
FIG. 3 is a detailed block diagram of a configuration controller which is part of the fault detection system of the present invention.

Referring now to FIG. 3 there is shown a detailed block diagram of the configuration controller which coacts with the fault buffer of FIG. 2 to provide the fault detection system. Its main function is to determine which system is to be on line and which system is to be off line. It comprises system A receivers 100, 101, 102, 103, and 104 and system B receivers 200, 201, 202, 203, and 204, system A drivers 105 and 106, system B drivers 205 and 206, system A data channel control 107, system B data channel control 207, system A 6 bit address register 108, system B 6 bit address register 208, system A status buffer control 109, system B status buffer control 209, 2-1 data multiplexer 150 and 4-1 address multiplexer 151. It additionally comprises system A one of 16 decoder 110, system B one of 16 decoder 210, system A status buffer receiver 111, system B status buffer receiver 211, system A function decoder 112, system B function decoder 212, system A STR and ETR logic 113, system B STR and ETR logic 213, system A error buffer 114, system B error buffer 214, and memory input output buffer 152. The configuration controller of FIG. 3 additionally comprises a 20 bit 16 word random access memory 153, memory request logic 154, a 4 bit binary counter 155, a one of eight decoder 156, request auction control 157, one hour transfer 158, test call logic 159, free running one hour clock 160, interlock control 161, transfer control and multi-transfer detector 162, processor alarm and status buffer 163, switch filters 164, processor alarm and status buffer 163, switch filters 164, alarm driver 165, lamp driver 166 and system B inverter 215.

As can be seen from the diagram of FIG. 3, the system A components and system B components are in identical configuration except for inverter 215. For that reason, only the operation of the system A portion of the configuration controller and that portion of the configuration controller which is common to both the system A and system B portions will be described in detail. However, the one difference being the inverter 215 will also be described.

In performing its functions, the configuration controller of FIG. 3 performs its specific functions in 8 different time slots. It includes a master timing clock and a sequence counter which goes through eight states. These states are designated time slot 0 through time slot 7. Each time slot dictates a specific function to be performed by the configuration controller.

Time slot 0 is used to update system A's status word. The system status word is used to convey the extended test routine request, the test call request, the one hour transfer, and all the error conditions which were discussed in relation to the bus initial conditions detector, time base fault detector, write enable status, auto ready print status, executive cycle timer, interrupt status, and the BSACFS and BSDCFS leads from the BCU of the fault buffer. All of this information is placed into one word within the configuration controller. Each system has its own status word, therefore there is a system status work A and a system status word B. On time slot 0 the configuration controller updates system A's status word. It collects the required information from three sources, the status information generated by the fault buffer when there is a status change in the fault buffer which is sent to the configuration controller and stored in an eight bit shift register, another eight bit shift register within the configuration controller that stores the extended test routine request, test call request, one hour transfer, and similar information. At time slot 0, the configuration controller obtains the fault buffer information from the one eight bit shift register, the information in its other eight bit shift register, and an identification field which identifies it as the system A status work or the system B status word. The configuration controller then combines the two eight bit words, and the four bit word which is the identification field, into a twenty bit status word and stores it in a memory. Therefore, a current status word is always stored in that memory for on the average, the configuration controller will return to time slot 0 within 15 microseconds.

Time slot 1 dictates the same function as time slot 0 except that system B's status word is updated.

Time slots 2 and 3 are used for data transfer, time slot 2 for system A and time slot 3 for system B. During these time slots the data transfer flows from the configuration controller to the fault buffer. If the fault buffer had put up a request for data and if it is the fault buffer of system A which is requesting the information, when time slot 2 comes up the configuration controller will service that request. It will generate the clock pulses previously described to transfer the data from the fault buffer into the configuration controller memory.

Time slots 4 and 5 are also used for data transfer but in this case for transferring data from the fault buffer to the configuration controller. Time slot 4 is used for system A, and time slot 5 is used for system B. If the fault buffer of system A makes a data request, at time slot 4 the configuration controller will service this request.

Time slots 6 and 7 are used in conjunction with the status update, for when it generates the update cycle it transfers this information to another 8 bit register within the configuration controller, a temporary holding register. Then the configuration controller waits until time slot 6 for system A and time slot 7 for system B to go back and get the contents of location 0 in the fault system accumulator memory which contains the address of the subsystem where the error occurred.

As previously explained, at periodic intervals, and in particular every 650 miliseconds, the configuration controller will update the system A and system B status word to set a bit in that status word to cause an extended test routine request. If that extended test routine is not completed by the on line system, the configuration controller will cause the control of the telephone exchange to be transferred over to the off line system to the on line system.

Another function the configuration controller performs is the test call, wherein at periodic intervals, the configuration controller indicates via a telephone line circuit a request for a test call. This test call is hard wired generated within the exchange and actually looks like a telephone call being placed by a subscriber. When it is requested, the network associated with the test call will go off hook like a normal subscriber telephone would and must be placed through the network to its particular termination point within a predetermined period of time, i.e., one minute. This insures that the whole system can process calls. Should the on line system fail to process the call within the predetermined period of time for two consecutive test calls, the configuration controller will cause a transfer to take place from the on line system to the off line system. As a preferred form, the test call request is made every two minutes. When the test call has failed two consecutive times, a counter counts the two consecutive fails and sets a bit within the twenty bit system status word when the status word is updated. The transfer means of a configuration controller is responsive to the setting of this bit and will cause the transfer to take place.

Referring now specifically to FIG. 3, the memory request logic 154, four bit binary counter 155, 1-8 decoder 156, and 157 request auction control comprise that portion of the configuration controller which generates the 8 time slots in which the configuration control performs its functions. The 4 bit binary counter 155 is capable of counting up to 16 and the 1–8 decoder is coupled to it so that out of the 16 possible counts only 8 of them are used. Request auction control 157 effectively controls the timing of the configuration controller so that if for example time slot 2 comes around and the system A does not request a data transfer to take place, the request auction control will allow the counter to go on to time slot 3. Therefore, a configuration controller will not perform an entire function within time slot 2 but will go on to time slot 3.

The request auction control 157 detects all of the possible conditions that may cause a request and if there is a request, it will generate an output for the memory request logic 154. This will effectively stop the 4 bit binary counter at the particular time slot until the configuration controller performs whatever function it is to perform within that time slot.

The memory within the configuration controller is the 20 bit 16 word random access memory 153. Memory input output buffer 152 is a total of three eight bit shift registers and is used to transfer data into the 20 bit 16 word random access memory 153. Each of the eight bit shift registers are capable of being parallel loaded, parallel outputs can be taken out of them, serial outputs can be taken out of them, and they are capable of receiving serial and shift left and serial and shift right data, in other words, they are flexible eight bit shift registers.

The overall operation of the configuration controller FIG. 3 may best be understood by referring to the functions it performs during its time slots.

During some point in time the fault buffer makes a data in request which is sent over line $\overline{\text{CREQ}}$ and recieved by receiver 100. It also transmits a data address over channel 1, channel 2 and channel 3 lines which are received by receiver 101. The 6 bit address register 108 receives the data address from the fault buffer and each of the channels has a bit on it. A strobe signal strobes these 3 bits on the channel 1, 2, and 3 lines out through the configuration controller and stores these bits as the most significant 3 bits of the 6 bit address, the last 3 bits being transferred on a second strobe. The 6 bit address register 108 receives the 6 bits of address and puts them together. Effectively, 4 bits out of the 6 are used to access any location in the 20 bit 16 word random access memory 153. The address is stored in the 6 bit address register 108. At this time, the 4 bit binary counter 155 continues to run within the configuration controller. Data channel control 107 receives the request from receiver 100 and transfers it to the request auction control 157. This request will be serviced on time slot 2. The request auction control serves a time slot and request comparison function and matches a particular request with a particular time slot. In this case, when time slot 2 occurs the request auction control causes the memory request logic to stop the 4 bit binary counter and it remains in time slot 2. Now, the configuration controller generates additional timing comprising ten pulses. The first clock pulse is used to get the information out of the 20 bit 16 word random access memory. Referring to FIG. 3, the 6 bit address register 108 has an output which goes to the 4-1 address multiplexer 151 which in turn is coupled to the 20 bit 16 word random access memory 153. Upon the first clock pulse, the address is presented to the memory and the 20 bit word data therein is transferred to the random access memory outputs and is loaded into the inputs of the memory input output buffer 152. The requested data is therefore stored within the 3 shift registers of the memory input output buffer 152. The following 8 clock pulses shift the data out of these 3 shift registers and the information is shifted out onto the line which couples the output of the memory input buffer to the channel 1, 2 and 3 driver 105. The data is then transferred back to the fault buffer on the channel 1, 2 and 3 lines. The 8 clock pulses are also sent to the fault buffer over line $\overline{\text{DTCLK}}$ of FIG. 2. These pulses are used to load information into the shift registers of the fault buffer because the clock pulses and the data will experience the same delay time between the configuration controller and the fault buffer. The tenth clock pulse is not used for this function. At the end of the tenth pulse sequence an acknowledge signal is sent to the fault buffer to inform it that all of the data has been sent.

Now that the configuration controller has performed its function in time slot 2, its counter is allowed to continue to the next time slot. The previous function for time slot 2 as previously described is similar to the operation of the configuration controller during time slot 4 when the fault buffer is writing information into the configuration controller. A request is generated, along with the address indicating where the fault buffer wants to write the data within the configuration controller and when that request is satisfied as time slot 4 occurs, the 4 bit binary counter will be stopped again and the 10 clock pulses will be generated. In this case the first pulse of the channel is not used, the second through ninth are sent back out to the fault buffer to shift the data out of its shift registers and into the memory input output buffer 152. The tenth clock pulse is used to store that information into the 20 bit 16 word random access memory 153. The tenth clock pulse will also cause the configuration controller to send back an acknowledge signal to the fault buffer to acknowledge receipt of all of the data from the fault buffer.

Referring now to inverter 215, the only difference between the system A and system B portions of the configuration controller, and recalling that memory 153 has 16 available words, all 16 words must be available to both system A and system B fault buffers. To simplify the overall system, it would be advantageous to use the same addressing for this purpose. In order to use the same addressing by the fault buffers but to allow each to gain access to all of the memory, inverter 215 inverts the address of the program memory supplied by the system B fault buffer so that in this way both fault buffers can use the same addresses but can address any address of the memory it desires. For example, the system A status word is stored in location 5 of the 20 bit 16 word random access memory 153 and the hexadecimal complement of address 5 is address data which is utilized for storing the system B status word. In other words, when the fault buffer requests its status word, it will generate an address 5, but will be inverted by inverter 215 to present to the 20 bit 16 word random access memory address data for obtaining its status word. Therefore, both fault buffers, and for that matter, their associated central processors and data buses have access to the memory 153 but one uses a direct address and the other one uses a complement address.

Referring now to time slots 0 and 1, time slot 0 is utilized to update the system A status word. When time slot 0 occurs the 4 bit binary counter is stopped. The error information contained in the status buffer 69 of the fault buffer of FIG. 2 is transferred over line CHAN4 to receiver 102 and is stored in status buffer receiver 111. The error buffer 114 contains the status information such as the extended test routine request, test call request, etc. The contents of the error buffer are shifted into bits 9–16 of the memory input output control or the second shift register and the contents of the status buffer receiver 111 are shifted into bits 1–8 of the memory input/output buffer or the first shift register. The identification code goes into the last 4 bits, bits 17–20 of the memory input/output buffer or the third shift register. The 2–9 clock pulses which are produced when the 4-bit binary counter is stopped are used to shift the 8 bits of information from the error buffer and the status buffer receiver into the memory input/output buffer. The 4-bit identification code is additionally shifted into the third shift register at this time. The last clock pulse is used to load the 20 bit status word stored in the 3 shift registers of the memory input/output buffer into the 20 bit 16 word random access memory 153. The updated status word is loaded into the 20 bit 16 word random access memory 153 at the address specified by the hard wired addresses inputs to the 4-1 address multiplexer 151. In this case, system A status word is being updated, and the third hard wired address lead will contain the address 5, the address of the system A status word, and the status word will be stored in location 5 of the 20 bit 16 word random access memory 153.

At time slot 1, the same process occurred for updating the status word of system B.

Time slot 6 is used to get from the fault buffer the address that an error condition occurred on. As previously mentioned the address of each subsystem which the central processor communicates with is stored within the system fault accumulator memory 54 of FIG. 2. During time slot 6, the configuration controller obtains from the system fault accumulator memory 54 the address of the subsystem which was being communicated with by the central processor at the time a fault condition occurred.

The request for service which occurs in time slot 6 is a function of the information which is received on line CHAN4. The information on CHAN4 is received from the status buffer 69 of FIG. 2. Whenever information is sent out from the status buffer to the configuration controller, the configuration controller receives this information at the status buffer receiver 111 via receiver 102. When the status buffer is to transfer information to the configuration controller, it generates a signal on STREQ which is received by receiver 104 and transferred to the status buffer control 109. At that time, the status buffer control generates a CMREQ signal which is transferred back to the status buffer over driver 106. The CMREQ signal is used to alert the fault buffer that the address located in location 0 of the system fault accumulator memory is to be transferred to the configuration controller. The status buffer control 109 is coupled to the request auction control and provides the request auction control with the request to be recognized on time slot 6.

At the first clock pulse on STREQ, the CMREQ is sent back to the fault buffer. Recalling for the moment that the clock pulses on STREQ are utilized to shift data from the status buffer to the configuration controller, and that there are 9 such clock pulses for this purpose, the request auction control is not set with a request from the status buffer control until the ninth pulse, or in other words, until all of the information from the status buffer is received by the status buffer receiver.

Referring to FIG. 2 again, the CMREQ signal is transferred to one of the location 0 inputs of the 4-1 address multiplexer and therefore addresses the location 0 of the system fault accumulator memory which contains the address of the system's subsystem which was being communicated with by the central processor at the time the fault condition occurred. The CMREQ signal is also transferred to the fault buffer memory field decoder 50 for selecting a system fault accumulator memory as opposed to the auto print memory.

At the start of each instruction, the current address on the bus is written into the system fault accumulator memory 54. Therefore, the timing of the function performed in time slot 6 must be such that the system fault accumulator memory is accessed for the desired address before a new address is written into the system fault accumulator memory.

As an example, assume that the central processor is transmitting data to a particular subsystem on the bus and that a subsystem has failed to respond. The address of that subsystem is stored within location 0 of the system fault accumulator memory 54. Now, the central processor goes through the two bus cycles, the address and data cycle, and when the data cycle is executed, the particular subsystem which has failed fails to respond within the predetermined time period causing a BSDCFS input to the status buffer 69. This indicates to the status buffer that an error condition has occurred and tranmits this error condition to the configuration controller.

The CMREQ comes back into the status buffer and the bus cycle to the faulty subsystem is allowed to complete. However, the data received from the failing subsystem will be all zeros because it has failed to respond. This information is ignored by the central processor.

When that bus cycle is completed, the normal operation of the central processor is to go into a fetch cycle to go into program memory for the next instruction. As previously mentioned however, it is the object during this execution in obtaining the address of the faulty subsystem to access the system fault accumulator memory before a new address is written into it. The CMREQ signal is received by the fault buffer prior to the new address being written into location 0 of the system fault accumulator memory and accesses the address of the faulty subsystem prior to the writing of the new address therein.

The address of the faulty system is transferred from the system fault accumulator memory 54 to the I/O buffer shift register 51 from output 82. By this time, the 8 bits of error conditions from the status buffer have been transferred to the status buffer receiver 111 of the configuration controller and the request for service in time slot 6 has been made to the request auction control from the status buffer control 109.

When the configuration controller reaches time slot 6, the 4 bit binary collar 155 is stopped and the configuration controller generates the 10 additional pulses. The second through 9th pulses are utilized to shift the address of the fault subsystem from the I/O buffer shift register through the external data drivers 98 on to channel 1, 2 and 3 line into the memory input/output buffer 152 of the configuration controller via the 2-1 data multiplexer 150. At this point in time, the address of the faulty system is stored within the memory input/output buffer 152. The last clock pulse writes the address of the faulty system into the 20 bit 16 word random access memory 153.

The address of the faulty subsystem is written into location 0 of the 20 bit 16 word random access memory 153 because at the termination of each time slot, the address register 108 is cleared. Therefore, because no address has been written into the 6 bit address register 108 it will have all zeros which is recognized as location 0.

The same function is performed during time slot 7 but in this case by system B. The only difference is that inverter 215 inverts the all 0 address contained in the 6 bit address register 208 to provide its complement which is location S, and the address of the faulty subsystem is stored in location S of the 20 bit 16 word random access memory 153.

The free running one hour clock 160 is an oscillator having a basic time interval of 25 miliseconds and these time intervals are counted up to 1 hour. The test call logic taps off certain ones of these time intervals to provide the periodic time sequences for initiating the test call.

The test call logic 159 contains a counter and a timer and times the interval of the test call itself. In other words, there is a predetermined time for the telephone exchange to service the test call which in this preferred embodiment is 1 minute. When the telephone exchange fails to process two consecutive test calls within the predetermined time interval, the test call logic provides an output to the error buffer 114 which then transfers this information to the 20 bit 16 word random access memory 153 to update the system status word at time slots 0 or 1 depending upon which system is on line. The system status word having the test call fail bit set tells the central processor that a transfer is to occur and the test call logic also provides an input to the transfer control and multitransfer detector 162 to cause the system transfer to take place.

The one hour transfer 158 provides an output to the error buffer each hour which then transfers this information to the 20 bit 16 word random access memory 153 for setting a 1 hour transfer bit in the system status word to notify that central processor that the 1 hour transfer is to take place and that it should terminate its executions when it has completed its executions to that point.

Interlock control 161 is coupled to both central processors and locks out the central processor test panel from the on line system. The only exception to this is the auto stop function control which has been previously mentioned. The auto stop can be utilized only if the off line system is in an operative state.

Transfer control and multi-transfer detector 162 is that portion of the configuration controller which ultimately causes a system transfer. It receives its inputs from the test call logic 159 for causing a transfer should the telephone exchange fail to execute 2 consecutive test calls within the predetermined period of time and from the STR and ETR logic 113 which provides an input to the transfer control to cause a transfer when the on line system fails to complete the expended test routine within the predetermined time period specified for that operation. The transfer control and multi-transfer detector 162 also includes a counter which counts the number of transfers occuring within a predetermined period of time and precludes further transferring when a predetermined number of transfers have occurred within a predetermined period of time. In this preferred embodiment, this will occur when four transfers have occurred within the predetermined period of time. The transfer control and multi-transfer detector 152 are coupled to a transfer relay which is controlled by the transfer control 162 to ultimately cause a transfer to take place.

Switch filters 164 are utilized to filter out the switch noise which is generated by the console panel switches. One of these switches is a manual transfer switch which is utilized to cause a manual transfer to occur.

The alarm driver 164 is utilized to set off an audible alarm when a transfer has taken place. It is coupled to the process alarm and status buffer 163.

Lamp driver 166 is utilized to light the lamps on the maintenance control console to indicate a current operative status of the two systems.

Figure 4:
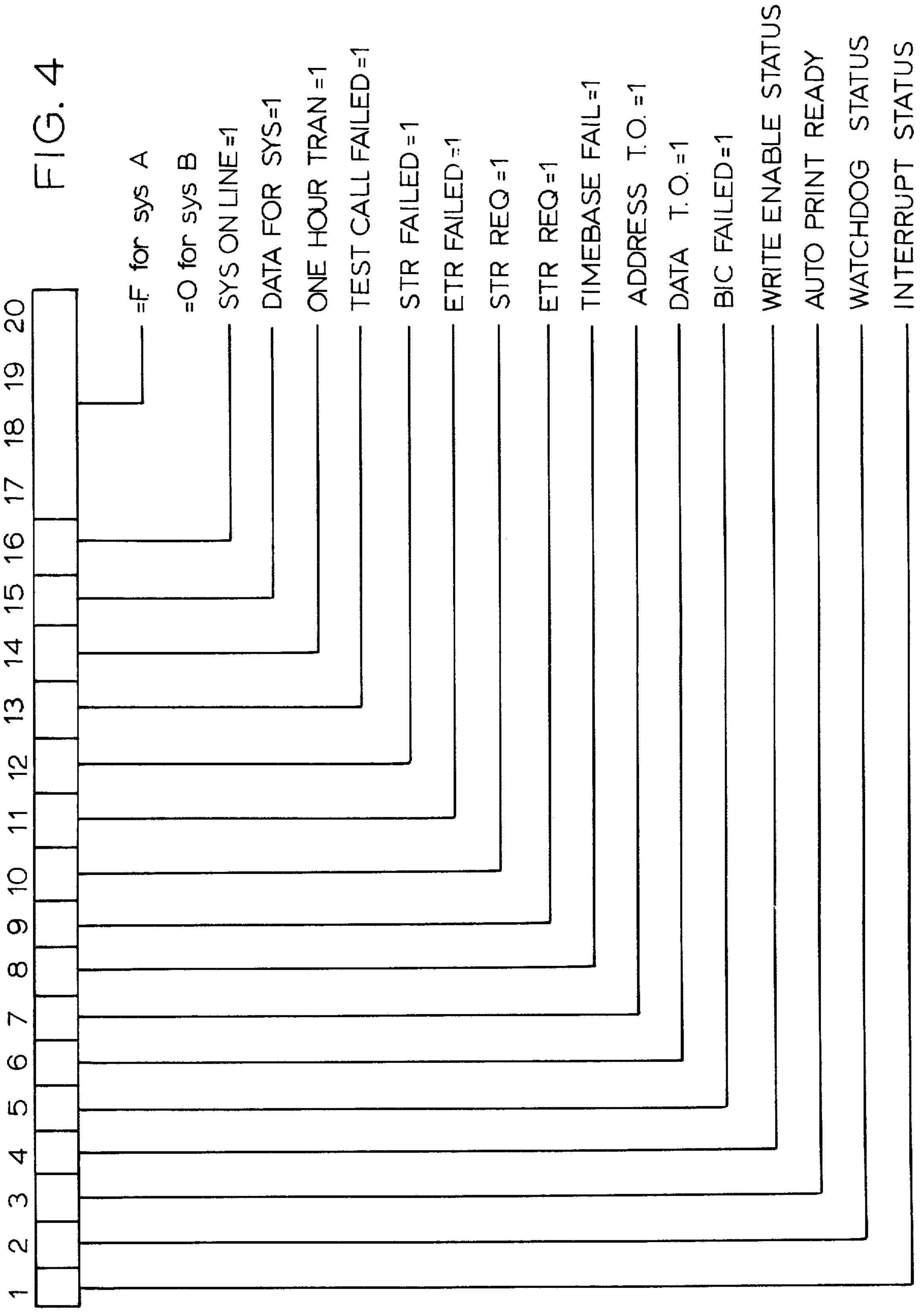
FIG. 4 is a graphic representation of a 20 bit control word provided by the fault detection system of the present invention.

Referring now to FIG. 4, FIG. 4 is a graphic representation of the 20 bit status word utilized by the configuration control in communicating with the central processors.

Each system has its own status word which is identified by an identification code contained within bits 17 – 20. For system A bits 17–20 are equal to F, and for system B, bits 17–20 are equal to 0.

Bit 1 of the status word is used to indicate that an interrupt has occurred, bit 2 if equal to 1, indicates that the executive cycle timer is actively timing, if equal to 0 the timer has timed out or is disabled, bit 3 is utilized to indicate when the autoprint is ready, bit 4 is utilized for the write enable status, bit 5 is used to indicate when a line of one of the buses is inoperative, bit 6 is utilized to indicate when a subsystem fails to respond on a data cycle within a predetermined period of time, bit 7 is utilized when a subsystem fails to respond to its address cycle within a predetermined period of time, bit 8 is utilized to indicate when shifting bit within the bit time counter is absennt indicating that the central processor is in an undefined state, bit 9 is utilized by the on line processor to receive the extended test routine request, bit 10 is utilized by the off line system for initiating the shortened test routine, bit 11 is used to indicate that the on line system has failed its extended test routine, bit 12 is utilized to indicate when the off line system has failed to complete its shortened test routine within a predetermined time, bit 13 is used to indicate when the telephone exchange has failed to execute the test call within the predetermined period of time for two consecutive test call executions, bit 14 is utilized to communicate to the on line central processor that the 1 hour transfer is to take place, bit 15 is utilized to indicate that data has been transferred from one processor to the other via the configuration controller memory, and bit 16 is utilized to inform the central procesors as to which one of them is on line.

Before referring to the detailed schematic circuit diagrams of FIGS. 5–50, reference may be made to the following glossary of terms which provides a short definition of all of the abbreviations utilized in the detailed schematic drawings.

Glossary of Terms and Definitions

| | |
|---|---|
| ACDRLB | Access Data Request Enabled system A |
| ACDTRA | Access Data Request Flag system A |
| ACDTRB | Access Data Request Flag system B |
| ACRSTA | Access Data Flag Reset system A |
| ACRSTB | Access Data Flag Reset system B |
| ADAC | Address Acknowledge |
| ADCL | Address Clock |
| ADSP | Address Stop Request |
| AETRF | System A ETR Fail Lamp Driver |
| AFRST | System A Fault Reset |
| ALADSJ | Alarm Disable Flag |
| ALCLK | Alarm Buffer Clock |
| ALM1 | Alarm Level One |
| ALM4 | Alarm Level Four |
| ALP1 | Alarm Priority One |
| ALP2 | Alarm Priority Two |
| AON | System A on Line |
| APCLK | Auto Print Match Clock |
| APMO1-20 | Auto Print Memory Outputs to ND5 drivers |
| APMA8 | Autoprint Memory Address bit 8 weight 8 |
| APMA4 | Autoprint Memory Address bit 4 weight 4 |
| APMA2 | Autoprint Memory Address bit 2 weight 2 |
| APMA1 | Autoprint Memory Address bit 1 weight 1 |
| APRDYJ | Autoprint ready flags (Q and $\overline{Q}$ outputs) |
| APRDYK | |
| APRDYS | Autoprint Ready Status |
| APRUDK | Autoprint Ready Update ($\overline{Q}$ output) |
| APTM2K | Autoprint Timing FF2 $\overline{Q}$ output |
| ASINLK | Autoprint timing FF2 $\overline{Q}$ output |
| AUTOP | Autoprint Start |
| BADTR | Bus Address True |
| BCINH | Bus Control Inhibit |
| BCSIH | Bus Control Start Inhibit |
| BDTRDY | Data on Bus |
| BDTTR | Bus Data True |
| BETRF | System B ETR Fail Lamp Driver |
| BFRST | System B Fault Reset |
| BICFD | Bus Initial Conditions Failed |
| BICFS | Bus Initial Condition Failure Status |
| BIENB | Bus Input Enable |
| BODO1-BOD20 | Bus Output Data |
| BOENB | External Signal to Generate DTOTB |
| BON | System B on line |
| BSACFS | Bus Sequence Address Cycle Failure |
| BSDCFS | Bus Sequence Data Cycle Failure |
| BSDE | Bus Sequence Detector Enable |
| BTDF | Bit Time Detector Fail |
| BTSAC | Bit Time Stop Acknowledge (Processor stopped) |
| BTSTPK | Bit Time Stop - To Processor |
| CACK | Configuration Controller Acknowledge |
| CACKA | Communications Acknowledge System A |
| CACKB | Communications Acknowledge System B |
| CETRSTA | Common ETR Reset System A |
| CETRSTB | Common ETR Reset System B |
| CFCLK | 10 MHz Configuration Controller Clock |
| CHAN1 | Serial Data Channel No. 1 |
| CHAN10 | Serial Data Channel No. 1 Output |
| CHAN5 | Grounded Data Channel |
| CISHCK | Input Shift Clock |
| CLKRQA | Data Clock Request Flag System A |
| CLKRQB | Data Clock Request Flag System B |
| CMB17J | Command Output Buffer Bit 17 |
| CMB18K | Command Output Buffer Bit 18 ($\overline{Q}$) |
| CMBCK | Command Output Buffer Clock |
| CMLDA | Memory Address Enable |
| CMRCK | Communications Register Clock |
| CMREQ | Configuration Control Message Request |
| CMREQ | Message Request Channel |
| CMRMAD3 | Memory Address bit 3 |
| CMSLA | Address Multiplexer Control A |
| CMSLB | Address Multiplexer Control B |
| CMSLC | Clock Mode Select C |
| CMSLD | Clock Mode Select D |
| CMSTR | Autoprint Memory Drivers Strobe |
| CMWRT | Memory Write Enable |
| CNC | lamp driver (Console Control Alarm) |
| COF3 | Count of 3 |
| CONSW | lamp driver |
| CPLUP | Logic Pull Up Signal |
| CREQ | I/O Controller External Request |
| CRSTM | Master Reset |
| CSHCLK | Memory Input Output Buffer Shift clock |

-Continued

Glossary of Terms and Definitions

| | |
|---|---|
| CSHMD1 | Memory Input Output Buffer Shift Control |
| CSHMD2 | Memory Input Output Buffer Shift Control |
| CSHM1A | Status Word Shift Register Control |
| CSHM1B | Status Word Shift Register Control |
| CSYRT | Console System Reset |
| CTSO | Configuration Controller Time Slot Zero |
| CTS1 | Configuration Controller Time Slot One |
| CTS7 | Configuration Controller Time Slot Seven |
| C100MS | 100 milisecond tap off one hour timer |
| DA101-DA120 | Data In Lines |
| DCHAD3 | Data Channel Address bit 3 |
| DCHAD6 | Data Channel Address bit 6 |
| DDSB | Data Display Selection Leads |
| DMC | Lamp Driver (Data Memory Alarm) |
| DSELB | Data Selection Leads |
| DSELA1 | Instruction Test Mode Data Switch Selector |
| DSELD-C | Data Selection Control Signal for Memory Address MPX |
| DSTBFR | Data For Alarm Status Buffer |
| DSTRA | Disable ETR on system A |
| DSTSCL | Disable Test Call |
| DSWO1-DSW20 | Data Switch Outputs from CPU Test Panel |
| DTCAE | Data Cycle Enable system A |
| DTCAEO | Receive Data Cycle and Access Data Cycle Enabled System A |
| DTCBE | Data Cycle Enable system B |
| DTCKGK | Data Clock Gate |
| DTCLK | Data Transfer Clock (8 Pulses) |
| DTCLKR | Data Transfer Clock Returned |
| DTCLK1 | Data Transfer Clock No. 1 (9 Pulses during CTSO, 1, 2, 3 or 8 pulses during CTS4, 5, 6, 7) |
| DTCLK2 | Data Transfer Clock No. 2 (8 pulses) |
| DTFSA | Data For System A |
| DTFSB | Data for System B |
| DTSTM | Data Storage Mode both A and B |
| DWTDG | Disable Executive Cycle |
| EADGT2 | External Address Gate |
| EBCDP1 | External Bus Control Done Pulse No. 1 |
| EL GRD 2 | Test Panel Grounds |
| EL GRD 3 | |
| EMFA3-O | External Memory Field Selection Bits 0 through 3 |
| EMROK | External Message Request Okay (Granted) |
| ESHCK | External Shift Register Load Clock |
| ETR | Lamp Driver (ETR Fail A or B) |
| ETRACA | ETR Acknowledge System A |
| ETRACB | ETR Acknowledge System B |
| ETRAL | ETR Alarm |
| ETREQKA | ETR Requested and in progress system A (low when true) |
| ETREQKB | ETR Requested and in progress system B (low when true) |
| ETRFLKA | ETR Failed Flag system A (low when true) |
| ETRFLKB | ETR Failed Flag system B (low when true) |
| ETRSTA | Reset due to ETR acknowledge or manual action system A |
| ETRSTB | Reset due to ETR acknowledge or manual action system B |
| EXAD8-1 | External Memory Address Selection Bit Weights 8 through 1 |
| EXMEM | External (CFC) Memory Field |
| FADB8 | Memory Address Bits |
| FADB4 | |
| FADB2 | |
| FADB1 | |
| FADCK | Fault Address Clock |
| FADGT | Fault Address Gate |
| FAWRQ | Fault Address Write Request |
| FBCDN | Fault Buffer Cycle Done |
| FBCST | Fault Buffer Event Timer Control and Start |
| FBCYD | Fault Buffer Event Timer Cycle Done |
| FBDTR | Fault Buffer Data True |
| FBETP | Fault Buffer Event Timer Pause |
| FBICK | Fault Buffer Instruction Clock |
| FBINSJ.K | Fault Buffer Instruction Execution Flag |
| FBR | Fault Buffer |
| FBRCK | Fault Buffer Clock |
| FBRIR | Fault Buffer Instruction Flag |
| FBRIS | Fault Buffer Instruction Flag |
| FBRST1 | Test Mode Data Strobe |
| FBSRK | Fault Buffer Event Timer Start Reset |
| FBSTR | Fault Buffer Data Strobe to BCU (DATA IN) |

-Continued

| Glossary of Terms and Definitions | |
|---|---|
| FBTS3 | Fault Buffer Time Slots |
| FBTST | Fault Buffer Test Enable |
| FBTST1 | Fault Buffer Test Functions |
| FBTST2 | |
| FCTSO3 | Fault Buffer External I/O Controller Time Slot 3 Output |
| FDOSTR | Fault Buffer Data Out Strobe |
| FDTI | I/O Controller Data In Mode |
| FDTICK | Fault Buffer Data Input Clock (External) |
| FDTIN | Data In Flag (Fault Buffer) |
| FDTIR1 | Fault Buffer Input Data Request No. 1 |
| FDTOR6 | Fault Buffer Data Out Requests |
| FDTOT | Data Out Flag (Fault Buffer) |
| FDTWD3 | Bus Input or Output Enable |
| FERSLC | Fault Buffer Data Ready Pulse |
| FERST1 | Fault Error Reset |
| FETCH | Obtain Data from Program Memory |
| FLGRA | Flag Reset system A |
| FLGRB | Flag Reset system B |
| FMWE | Memory Write Enable (Auto Print) |
| FPLU12 | Fault Buffer Pull Up 12 |
| FPLUP1 | Fault Pull Up No. 1 |
| FSRT2J | Fault Start Control FF No. 2 |
| INHBK | Inhibit Bus Start Sequence |
| INICR | Initial States of Input Control Signals (BCU) |
| INITO | Initial States of All Data Lines |
| INMO1-20 | Internal Memory (SFA) Outputs |
| INMEM | Internal Memory Enable |
| INMEM1-20 | Internal Memory (SFA) Inputs |
| INRLK | Auto Stop Interlock |
| INRLK2 | Interlock No. 2 Test Panel Switches |
| INT116 | Initial Conditions of Bits 1-16 |
| INT58 | Initial Conditions of Bits 5-8 |
| INT912 | Initial Conditions of Bits 9-12 |
| INT136 | Initial Conditions of Bits 13-16 |
| INTAC | Interrupt Acknowledge from CPU |
| INTREQ | Interrupt Request |
| INTRLK | Interlock (Auto Stop Switch) from CFC |
| INTROJ | Interrupt Request Flip Flop Q Side |
| INTRS | Interrupt Status |
| IOC1 | Input/Output Control |
| IOC2 | |
| LDFBR | Load Fault Buffer |
| LDSHR | Load Memory Input Output Buffer |
| MCHAN1 | Multiplexed Serial Input Channel No. 1 |
| MCHAN2 | Multiplexed Serial Input Channel No. 2 |
| MEMAD8 | Memory Address Bits Weight 8, 2, 1 |
| D4 | |
| D2 | |
| D1 | |
| MINHB | Memory Inhibit |
| MNONL | Manual on Line Enabled |
| MREQ | Memory Request |
| MTBF | Manual Initiated Time Base Failure |
| MWENB | Memory Write Enable |
| MXTRFJ | Multiple Transfer Detector Flag (high when true) |
| OHRTFK | One Hour Transfer Flag (low when true) |
| PAUSEJ | Q output of PAUSE FF |
| PGM | lamp driver |
| PHRDFA | Processor Hardware Failure Flag system A |
| PHRDFB | Processor Hardware Failure Flag system B |
| PRB | lamp driver |
| PTRAL | lamp driver (Printer Alert Alarm) |
| RCVDTA | Receive Data From FBR A flag |
| RCVDTB | Receive Data From FBR B flag |
| RSC | lamp driver (register sender alarm) |
| RSTFC | Multi Transfer Detector Reset |
| SAONL | System A on Line |
| SBONL | System B on Line |
| SDC | Lamp Driver (Status Detector Alarm) |
| SDNE1 | Serial Data Enable No. 1 |
| SDREA | Send Data Request Enable A |
| SDREB | Send Data Request Enable B |
| SHCLK | Shift Register Clock |
| SHMD1 | Shift Register Mode 1 |
| SHMDCJK | Status Buffer Shift Register Mode FF Q, $\bar{Q}$ outputs |
| SHRO1-20 | Shift Register (I/O Buffer) Outputs |
| SHRCK | Shift Register Load Clock |
| SODEN | Serial Output Data Enable |
| SON | System On Line (tied to ground) |
| SRQGT | Status Request Granted |
| SSTDAO | System Status Update A |
| SSTDBO | System Status Update B |
| SSTUDA | System Status Word Update A |
| SSTUDB | System Status Word Update B |
| SSWDXA | System Status Word shift register output A |
| SSWDXB | System Status Word shift register output B |
| SSWMD | System Status Update Mode |
| STBFRA | Status Buffer serial output A |
| STBFRB | Status Buffer serial output B |
| STDBLA | Status Buffer Disable A |
| STDBLB | Status Buffer Disable B |
| STIN | Start Data In Cycle |
| STOT | Start Data Out Cycle |
| STREQ | Status Buffer Transmission Request |
| STRSTA | System Status Reset A |
| STRSTB | System Status Reset B |
| STSRQ | Status Request |
| SWST | CPU Test Panel Switch Status |
| SYRST | System Reset |
| SYSCK | System Clock (10 MHz) |
| SYST | System Status (from CFC) |
| SXTRF | System Transfer due to ETR fail |
| SYLKO | System Locked on Line |
| SYTRFJ | System Transfer FF output (high when true) |
| TBFLD | Time Base Fail Delay |
| TBFLS | Bit Time Failed Status |
| TBHLT | Time Base Halt From Autostop Control |
| TCACN | Test Call Acknowledge |
| TCFLD | Test Call Failed |
| TCR | Test Call Request driver output |
| TCREQJ | Test Call Request Flag |
| TCRRT | Test Call Request Reset |
| TCRST | Test Call Reset |
| TCTMOK | Test Call Timed Out Flag (low when true) |
| TEST | Instruction Test on CPU Test Panel |
| TMR2S | Two second timer output |
| TRANS | Transfer signal |
| TRANSD | Delayed Transfer Signal |
| TRANS1 | Buffered Transfer Signal |
| TRFRQ | Timed Reset Function Request |
| TRNF1 | Test Routine Function |
| TRNF2 | |
| TSRSTK | Instruction Test Mode Reset $\bar{Q}$ side |
| TSTC | Test Call Fail lamp driver |
| TWRACA | ETR word Access system A |
| TWRACB | ETR word Access system B |
| WREB | Write Enable Switch |
| WRENS | Write Enable Status |
| WREUDK | Write Enable Update $\bar{Q}$ output |
| WTDG | Executive Cycle Timer has time out |
| WTDGT | Executive Cycle Timer Status |

FIGS. 5–50 are detailed schematic representations of the fault detection system shown in FIGS. 2 and 3 which embodies the present invention. The circuits thereshown are comprised of standard 7400 series circuits which are well known in the art. As is well known, this series of devices is readily commercially available and information as to their individual circuit configurations are readily obtainable. Each of the individual logic blocks in the drawings has a mnemonic therein which indicates the particular type of 7400 device. The table below gives each mnemonic representation with its equivalent 7400 series number and a brief description of the type of circuit.

| MNEMONIC | 7400 EQUIV. | DESCRIPTION |
|---|---|---|
| ND1 | 7400 | QUAD 2-NAND |
| ND2 | 7401 | QUAD 2-NAND (OC) |
| NR1 | 7402 | QUAD 2-NOR |
| INV1 | 7404 | HEX INVERTER |
| INV2 | 7405 | HEX INVERTER (OC) |
| IBD1 | 7406 | HEX INVERTER BUFFER (OC) |
| BD1 | 7407 | HEX BUFFER |
| AND1 | 7408 | QUAD 2-AND |
| SMTR1 | 7413 | DUAL 4-NAND (SCHMITT TRIGGER) |
| ND3 | 7420 | DUAL 4-NAND |
| ND4 | 7430 | 8-NAND |
| ND5 | 7438 | QUAD 2-NAND BUFFER (OC) |

-Continued

| MNEMONIC | 7400 EQUIV. | DESCRIPTION |
|---|---|---|
| ND6 | 7440 | DUAL 4-NAND BUFFER |
| AOI1 | 7451 | DUAL 2×2 AND/OR/INVERT |
| AOI2 | 7454 | 4×2 AND/OR/INVERT |
| FF1 | 7474 | DUAL D FLIP-FLOP |
| LTCH1 | 7475 | DUAL 2-BIT LATCH |
| FF2 | 7476 | DUAL JK FLIP-FLOP |
| XOR1 | 7486 | QUAD 2-EXCLUSIVE-OR |
| MEM1 | 7489 | 16×4 RAM |
| CTR1 | 7493 | 1+3 BIT COUNTER |
| SHFT3 | 7496 | 5-BIT SHIFT REG. |
| LTCH2 | 74100 | DUAL 4-BIT LATCH |
| MONO1 | 74121 | MONOSTABLE |
| MONO2 | 74123 | DUAL RETRIGGERABLE MONO |
| MX3 | 74150 | 16 → 1 MULTIPLEXER |
| MX1 | 74153 | DUAL 4 → 1 MULTIPLEXER |
| DEC1 | 74154 | 1/16 DECODER |
| DEC2 | 74155 | ⅛ or DUAL ¼ DECODER |
| MX2 | 74157 | QUAD 2 → 1 MULTIPLEXER |
| SHFT4 | 74164 | 8-BIT SHIFT REG. |
| ALU1 | 74181 | 4-BIT ARITHMETIC & LOGIC UNIT |
| CTR2 | 74193 | 4-BIT UP/DOWN COUNTER |
| SHFT2 | 74198 | 8-BIT SHIFT REG. |

Each input and output lead as shown on FIGS. 5–50 is labeled with the type of signal placed thereon in abbreviated form and reference to the glossary of terms will provide a brief definition of the various abbreviations utilized in the figures. Also, each such lead is labeled to indicate the interconnections of the various circuit diagrams.

Referring now to the detailed circuit diagrams of FIGS. 5–50, FIGS. 5–13 are detailed schematic circuit diagrams of a test panel which may be utilized to gain manual access to the telephone exchange and which provide visual indications as to the condition of the various subsystems of the telephone exchange.

Figure 5:
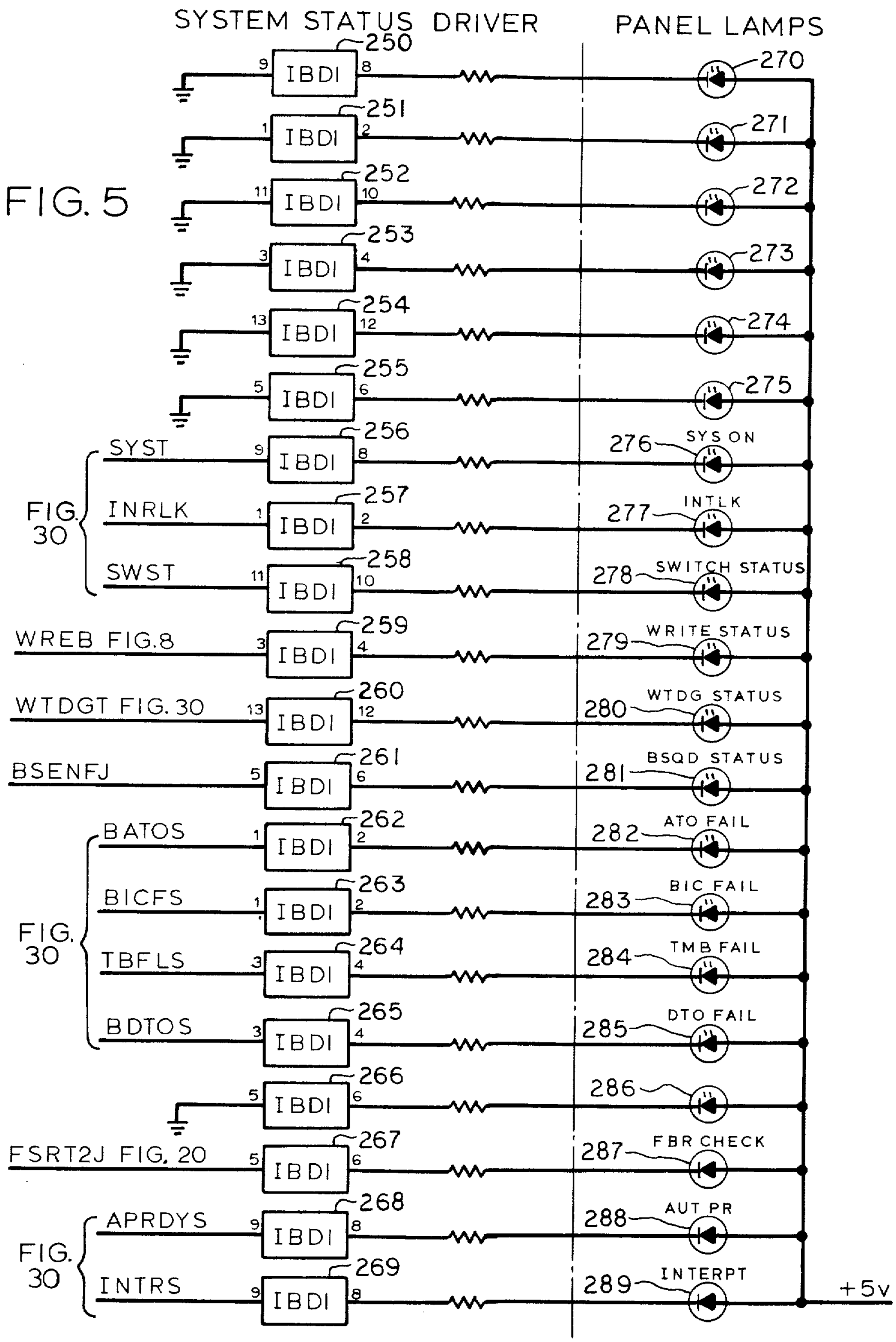
FIGS. 5–13 are detailed schematic circuit diagrams of a test panel which may be utilized to gain manual access to the telephone exchange and which provide visual indications as to the condition of the various subsystems of the telephone exchange.

The circuit of FIG. 5 comprises 7406 open collector HEX INVERTER BUFFERS 250–269 and light emitting diodes 270–289. The test panel circuit of FIG. 5 is the system status display which indicates the condition of the major areas within the central processor. Table 1 lists the functions of the light emitting diodes.

Table 1

| LED | No. | System Status Lamps |
|---|---|---|
| 276 | SYS ON | System on indicates this system is on line and ready to process calls. |
| 277 | INTLK | Interlock indicates all critical switches have been enabled. |
| 278 | SWITCH STATUS | Indicates the system has been made non-operational by one or more following critical switches: STOP, TEST, RESET HALT, AUTO STOP and BSQD DISABLE. |
| 279 | WRITE STATUS | This indicates the CP is able to write into any subsystem. |
| 280 | WTDG STATUS | This indicates the executive cycle timer is operating. |
| 281 | BSQD STATUS | Bus Sequence Detector status indicates an address timeout (ATO) or data timeout (DTO) FAIL signal has generated the appropriate acknowledge signal, preventing a program loop. |
| 282 | ATO FAIL | Address Timeout Failure indicates the appropriate acknowledge signal was not received from the data bus. |
| 283 | BIC FAIL. | Bus Initial Conditions Failure indicates the bus was not clear to accept new commands. |
| 284 | TMB FAIL | Timebase Failure indicates the bit time counter lost its timing bit, placing the CP in an illegal mode. |
| 285 | DTO FAIL | Data Timeout Failure indicates the appropriate acknowledge signal was not received from the data bus. |
| 287 | FBR | This indicator is extinguished after |

Table 1-Continued

| LED | No. | System Status Lamps |
|---|---|---|
| | CHECK | the successful completion of each fault buffer cycle. It will appear continuously lit during normal operation. |
| 288 | AUT PR | Automatic print indicates the teleprinter buffer contains data to be printed out. |
| 289 | INTERPT | Interrupt indicates a CP interrupt has taken place, returning the system address to zero. |

Figure 6:
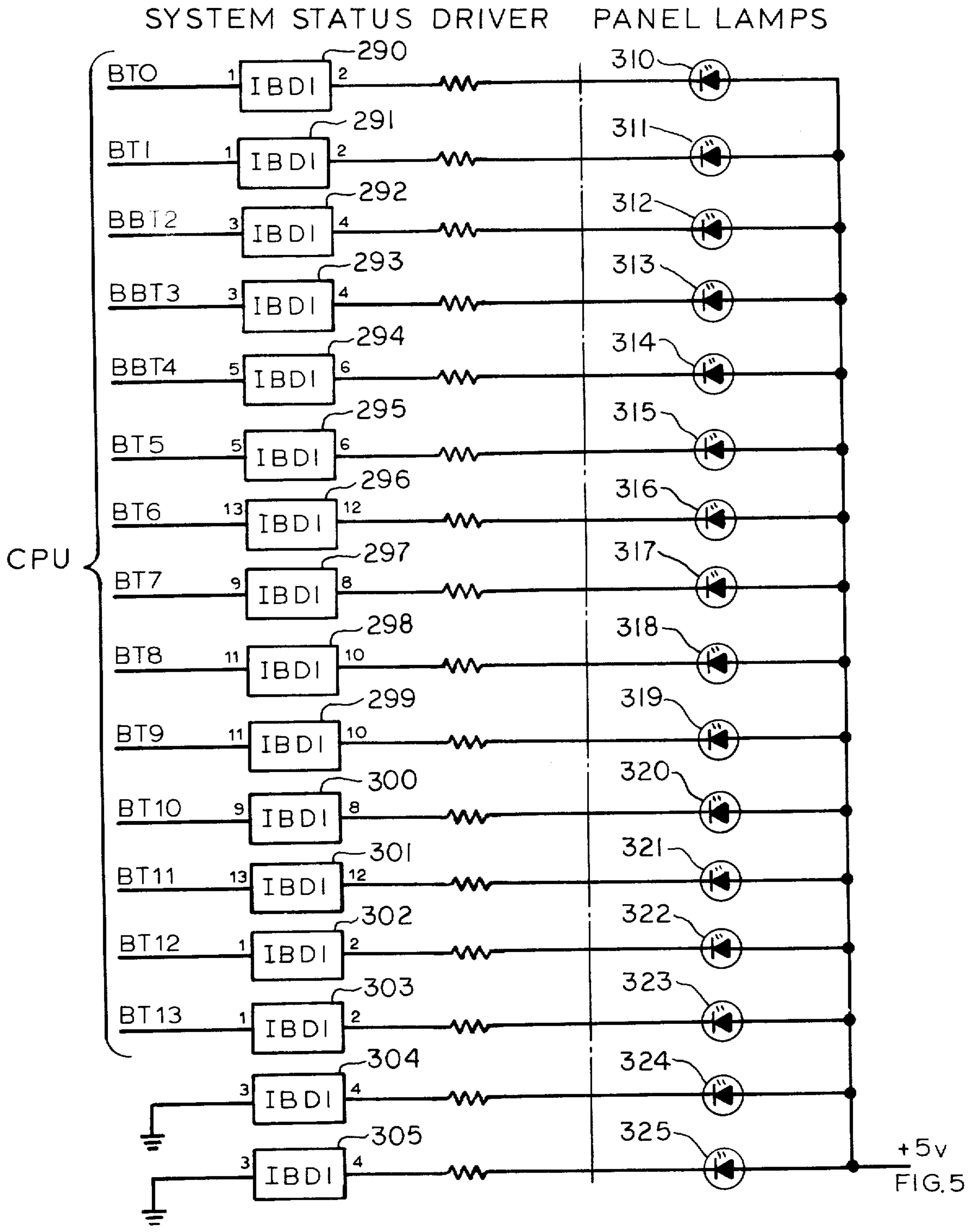

The test panel circuit of FIG. 6 comprises 7406 open collector HEX INVERTER BUFFERS 290–305 and light emitting diodes 310–325. The test panel circuit of FIG. 6 shows the bit time lamps and drivers which monitros the operation of the bit time counter. This display is used when the central processor is being manually stepped through an operational code.

Figure 7:
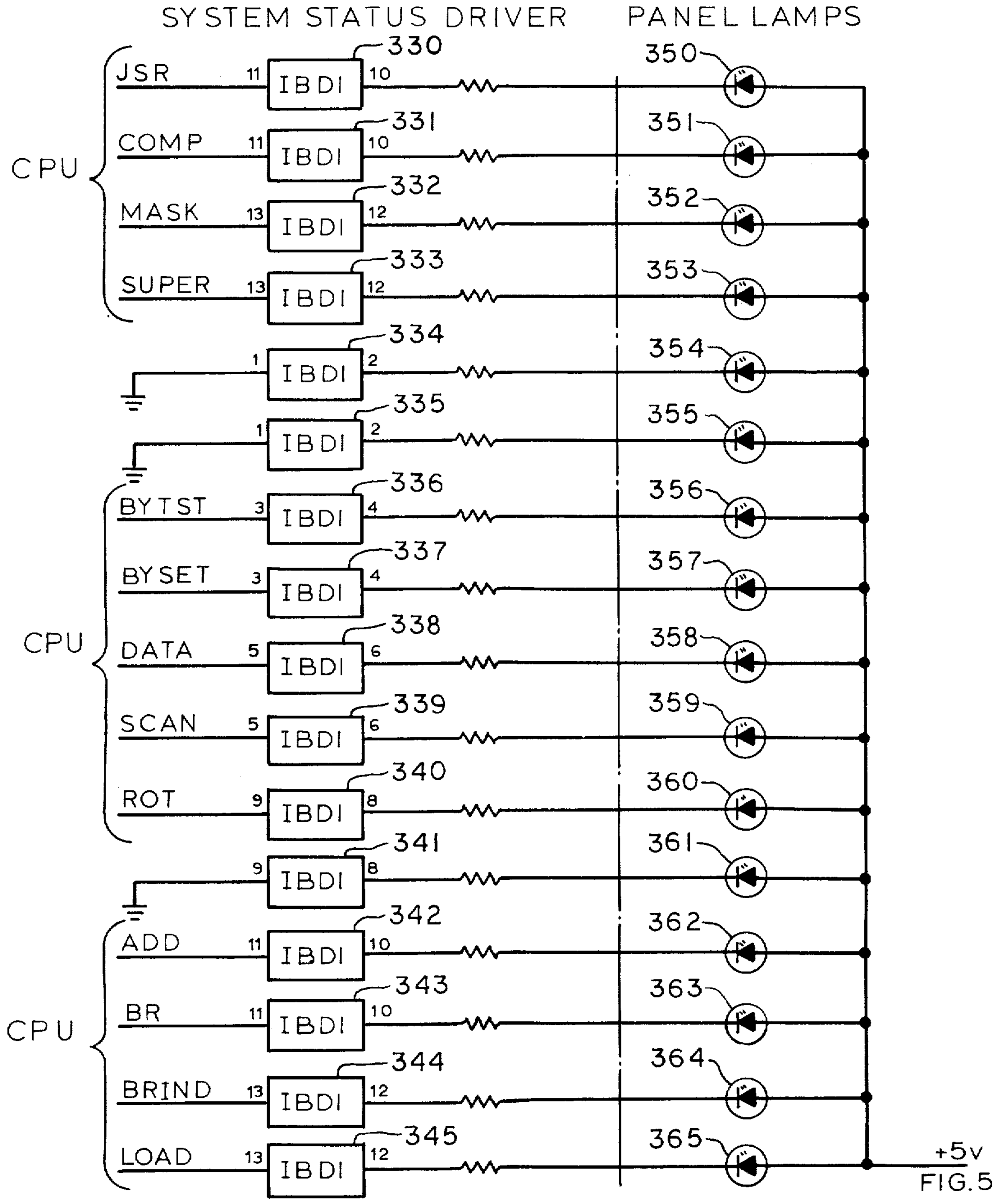

The test panel circuit of FIG. 7 comprises the operational code lamps and drivers and includes 7406 open collector HEX INVERTER BUFFERS 330–345 and light emitting diodes 350–365. It monitors the current operational code that the central processor is executing. This display is used during manual operation of the central processor because the bit time excursions of the operational codes are too fast.

Figure 8:
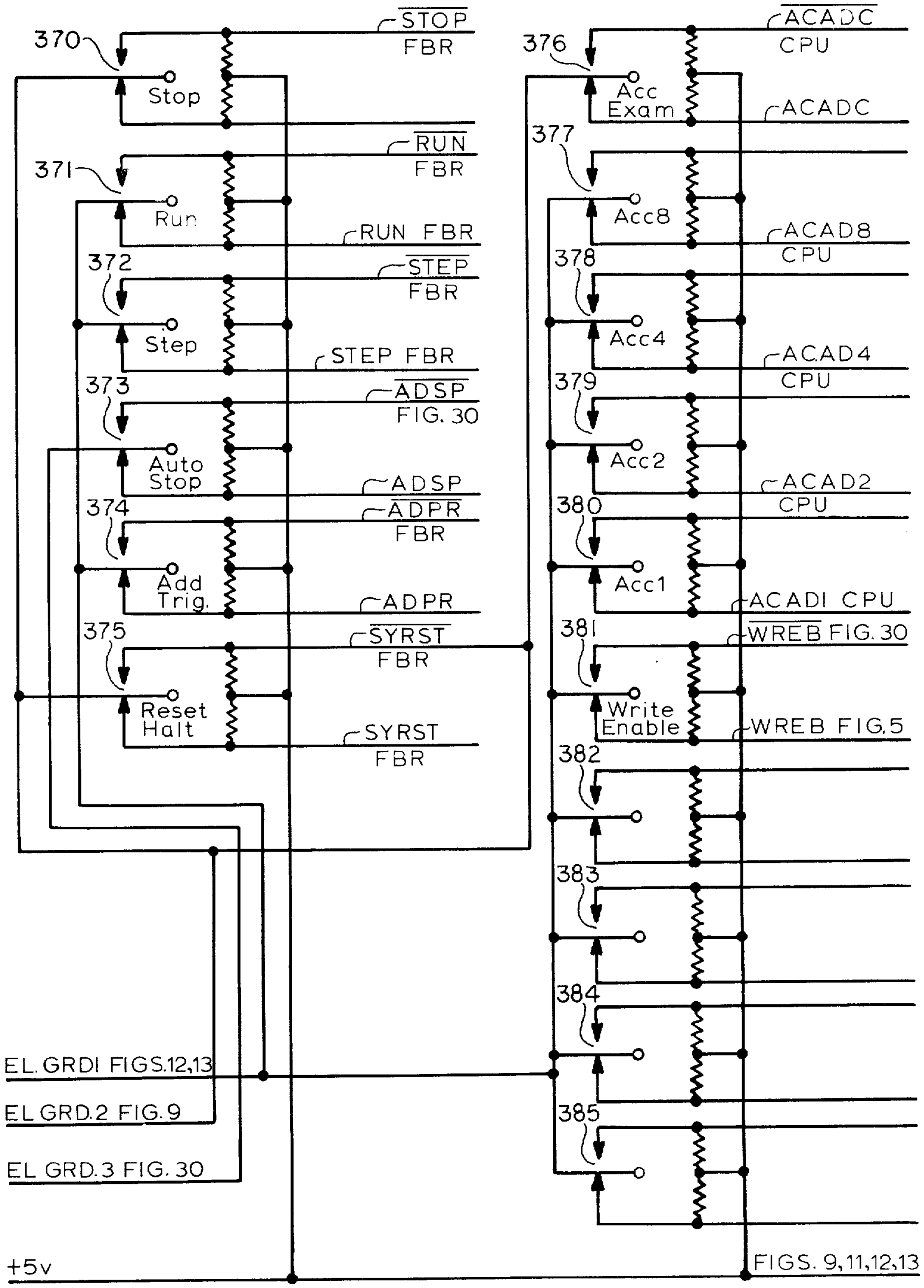

The test panel circuit of FIG. 8 comprises toggle switches 370–385 and comprises the control testing switches of the test panel. The 16 toggle switches control the major functions of the central processor. The function controlled by each of these switches, when operated, is described in Table 2 below.

Table 2

| SWITCH No. | | Control Testing Switches |
|---|---|---|
| 371 | RUN | Run is a spring loaded switch which provides a start pulse, enabling the CPC to drive the CP. |
| 370 | STOP | Stop is a spring loaded switch which provides a cutoff pulse, blocking the CPC from the CP. |
| 372 | STEP | Step is a spring loaded switch which provides the CP a single clock pulse. |
| 375 | RESET HALT | Reset Halt is a spring loaded switch which forces the system to reset to address zero and stop. |
| 373 | AUTO STOP | Automatic stop will stop the CP after the present bus cycle has been completed if the contents of the BAR match the address set on the ADDRESS SELECT SWITCHES. |
| 374 | ADD TRIG | Address Trigger will provide a clock pulse on card connector 16-99 of the CPU module each time the address in the BAR matches that on the ADDRESS SELECT switches. |
| 376 | ACC EXAM | Accumulator Examine allows the contents of the accumulator addressed by switches ACC1 through ACC8 to be displayed by the DATA DISPLAY LEDs if the system is stopped. |
| 377-380 | ACC1 to ACC8 | These switches provide the binary address of the ACC to be examined when switches ACC EXAM and ACC are operated. |
| 381 | WRITE ENABLE | This allows the off line system to write into any subsystem. |

Figure 9:
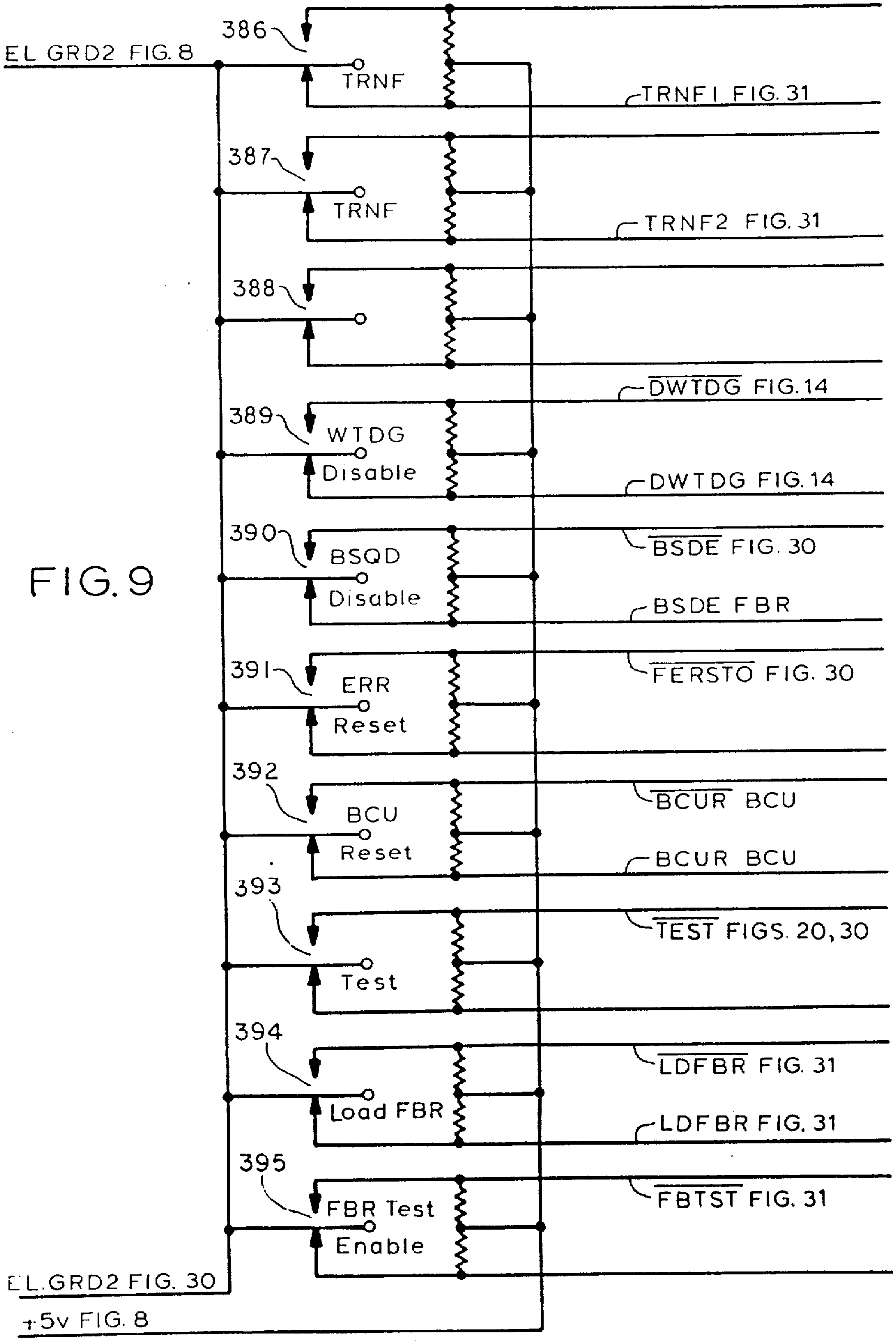

The test panel circuit of FIG. 9 comprises toggle switches 386–395 and comprises the fault buffer switches. It includes ten toggle switches which control various parameters and test routines within the fault buffer for system test purposes. The function controlled by each of these switches, when operated, is described in Table 3 below.

Table 3

| SWITCH No. | | Fault Buffer Switches |
|---|---|---|
| 392 | BCU RESET | Is used to clear the BCU of any data which would interfere with a test routine on a BIC FAIL alarm. Also used in conjunction with RESET HALT to manually reset the system on a TMB FAIL. |
| 393 | TEST | Allows CP to receive data from the 20 DATA INPUT switches. |
| 394 | LOAD FBR | Load Fault Buffer is a spring loaded switch which provides a start pulse for one of the test routines addressed by the TRNF switches. |
| 395 | FBR TEST ENABLE | This switch sets up the fault buffer to accept the test routine addressed by the TRNF switches, but must wait for the start command from the LOAD FBR switch. |
| 396 | TRNF | These two switches address (in binary) the CP Interrupt, Time Base Failure, Address Cycle Start Logic and Data Cycle Start Logic test routines. |
| 389 | WTDG DISABLE | This inhibits the executive cycle timer's ability to interrupt the CP and reset it to address zero. |
| 390 | BSQD DISABLE | Bus Sequence Detector Disable allows the ATO and DTO timing circuits to stop the system when a failure occurs. |
| 391 | ERR RESET | Error reset is used to reset the system after the error has occurred. |

Figure 10:
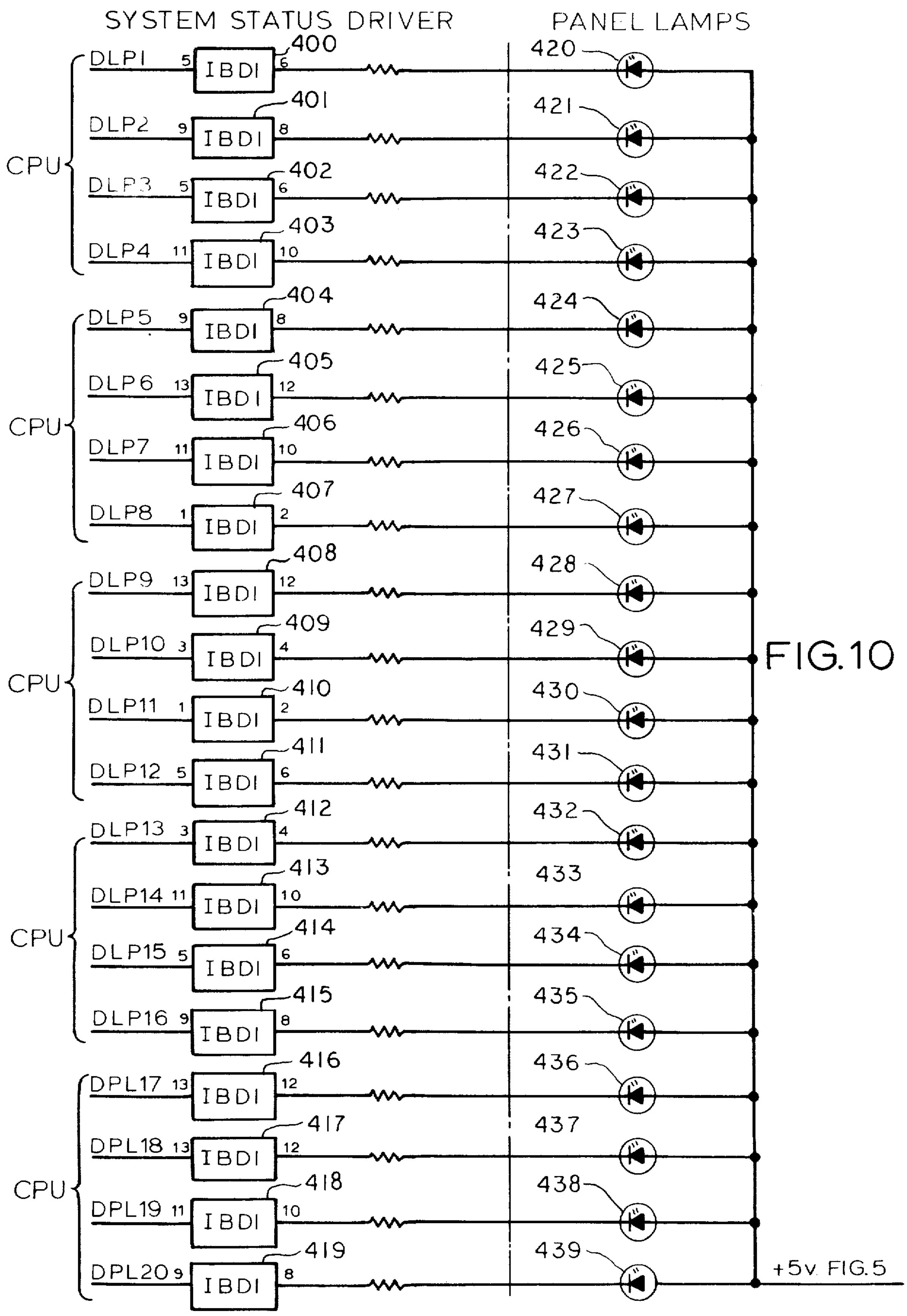

The test panel circuit of FIG. 10 comprises 7406 open collector HEX INVERTER BUFFERS 400–419 and light emitting diodes 420–439. It comprises the central processor data display lamps and shows the binary contents of the stores selected by the appropriate store select switch when the system has been stopped. The accumulator stores must also be addressed by the ACC1–ACC8 switches.

Figure 11:
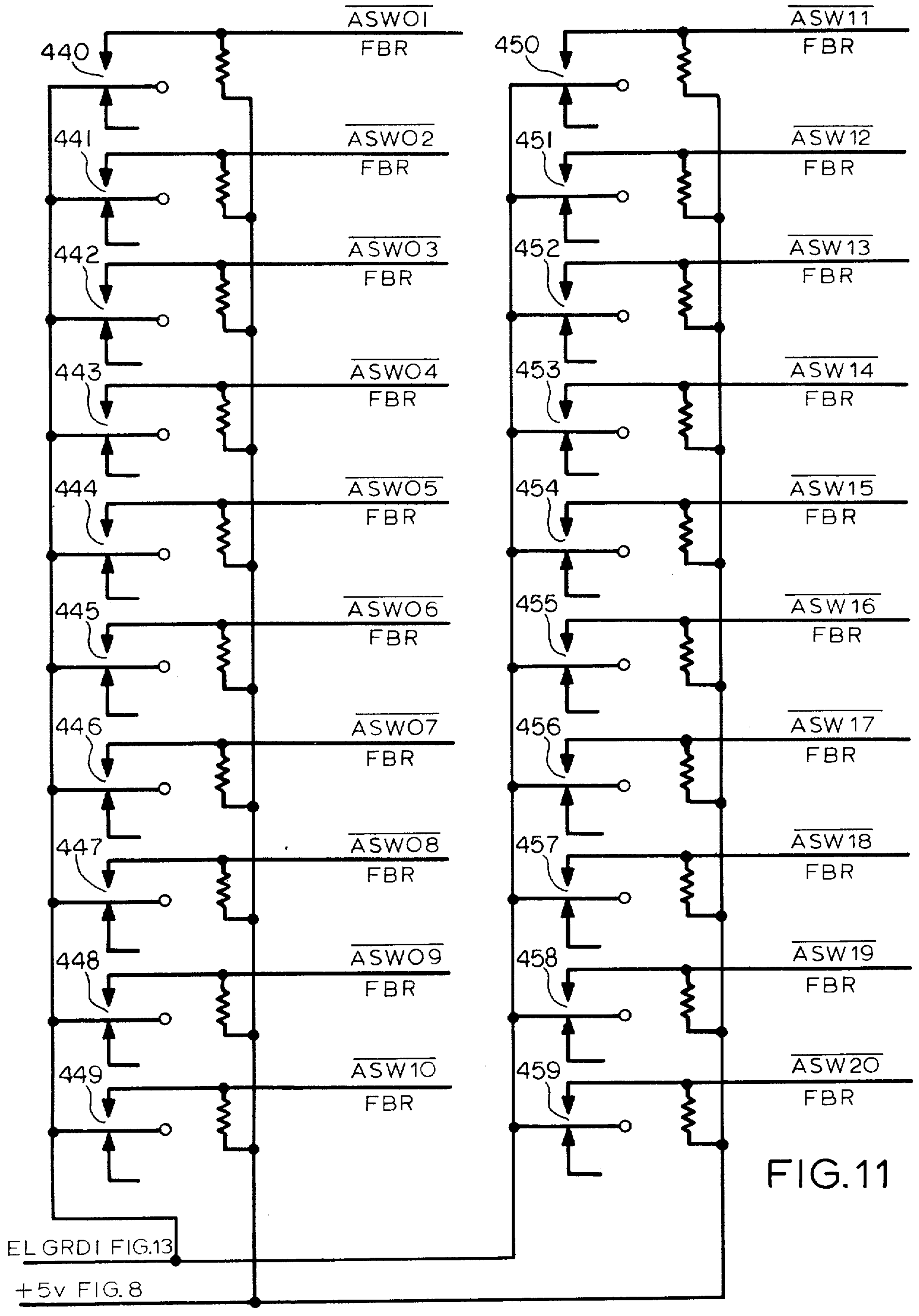

The test panel circuit of FIG. 11 comprises toggle switches 440–459 and is the central processor address select switches. The address select switches 440–459 provide a binary address for the auto stop or address trigger commands.

Figure 12:
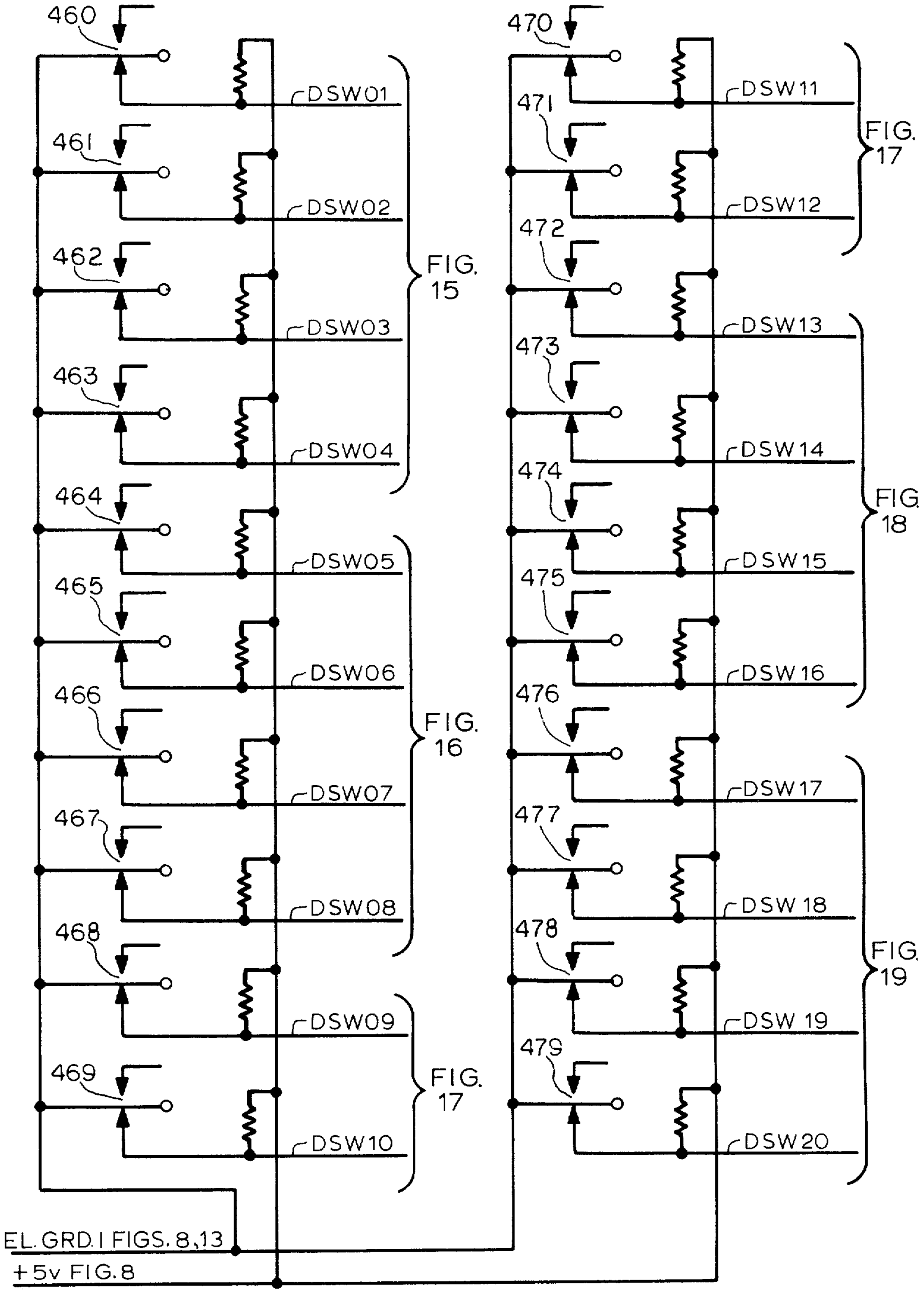

The test panel circuit of FIG. 12 comprises toggle switches 460–479 and is the central processor data input switches. The data input switches 460–479 are used to supply binary input data to the central processor while the TEST switch is operated.

Figure 13:
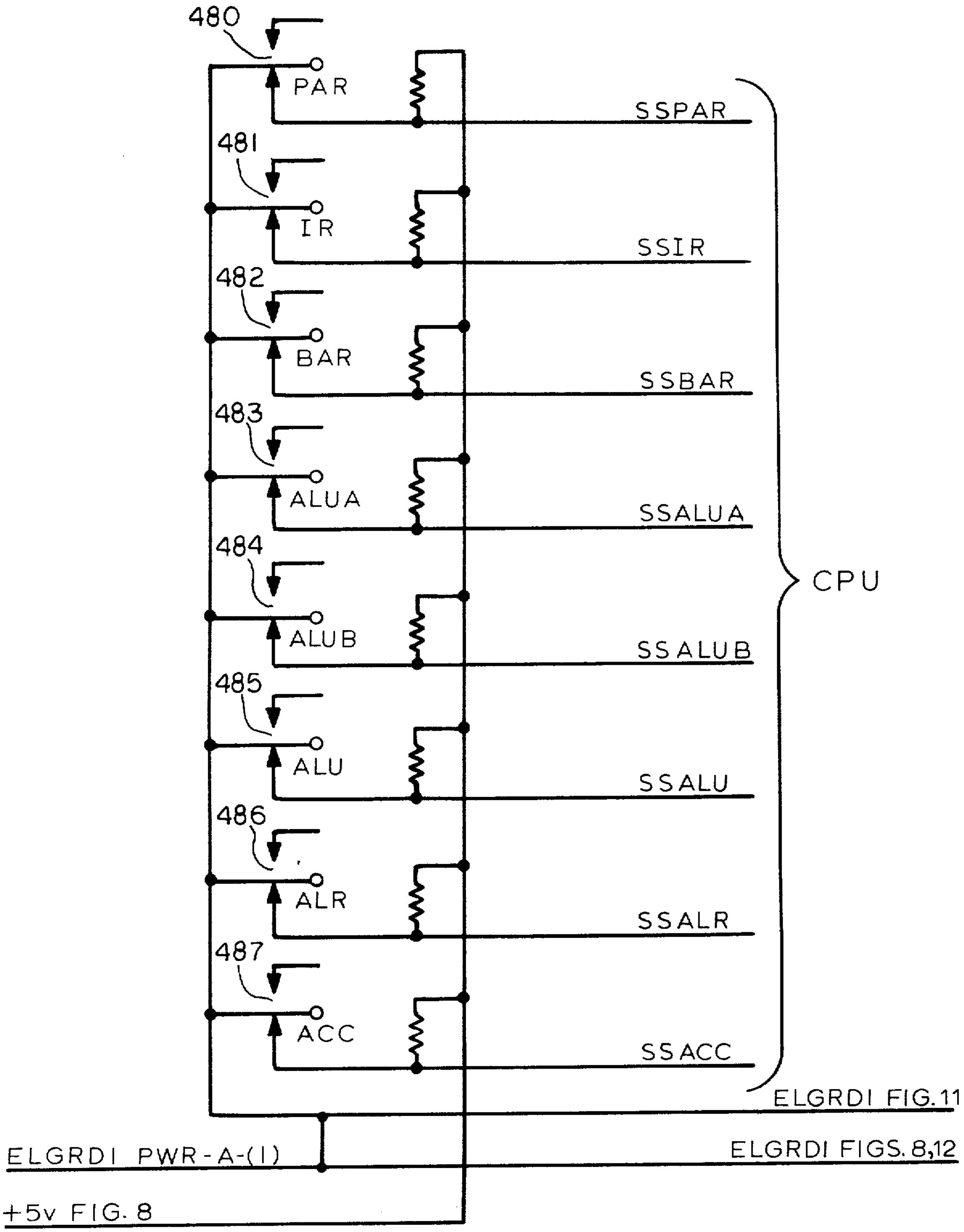

The test panel circuit of FIG. 13 comprises switch 480–487 and is the store select switches. The store select switches 480–487 allow the contents of the program address register, instruction register, bus address register, ALUA, ALUB, arithmetic logic unit, arithmetic logic register or one of the 16 accumulators of the central processor to be displayed when the system has been stopped. To examine an accumulator, it must be addressed by switches ACC1–ACC8. The ACC EXAM switch must also be operated.

Figure 14:
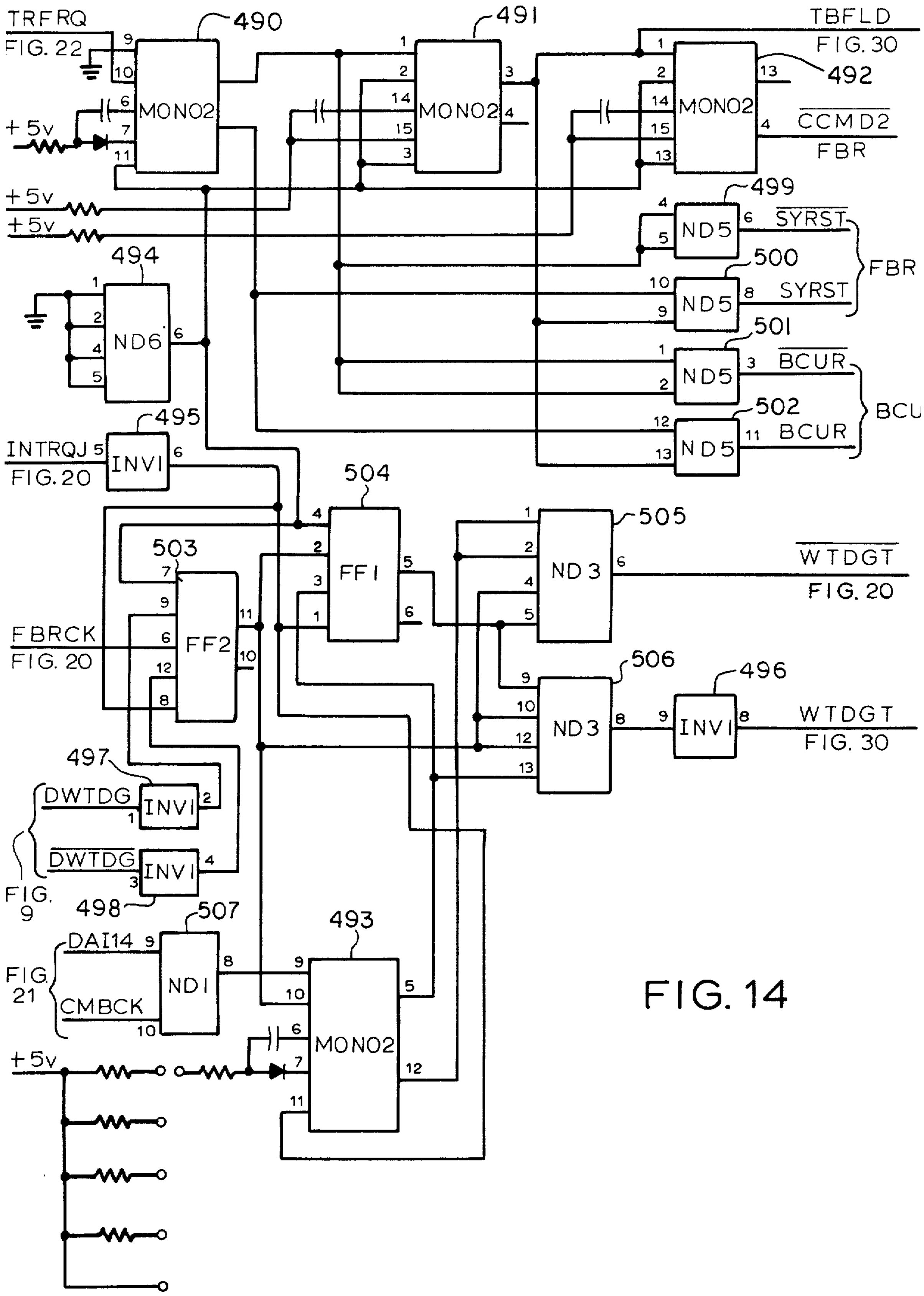
FIG. 14 is a detailed schematic circuit diagram showing the executive cycle timer and a portion of the time base fault detector of FIG. 2.
Figure 15:
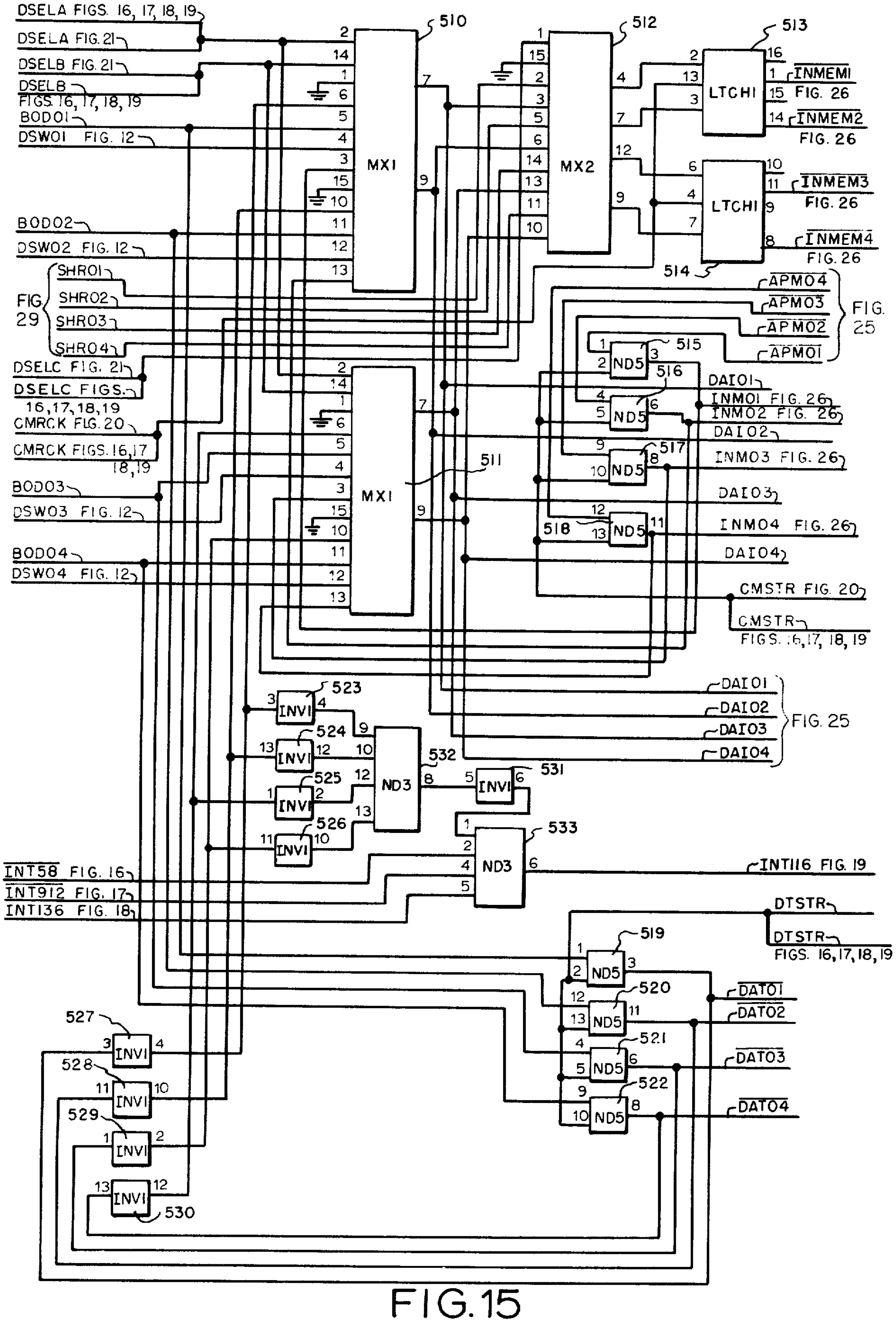
FIGS. 15–19 are detailed schematic circuit diagrams showing the 4-1 multiplexer, 2-1 multiplexer, one word buffer, and the bus initial conditions detector of FIG. 2.

The detailed schematic circuit diagram of FIG. 14 shows the executive cycle timer and a portion of the time base fault detector of FIG. 14 comprises 74123 DUAL RETRIGGERABLE MONOSTABLE MULTIVIBRATORS 490, 491 and 492. The executive cycle timer comprises 74123 DUAL RETRIGGERABLE MONOSTABLE MULTIVIBRATOR 493, 7440 DUAL 4-NAND BUFFER 494, 7404 HEX INVERTERS 495, 496, 497 and 498, 7438 OPEN COLLECTOR QUAD 2-NAND BUFFERS 499–502, 7476 DUAL JK FLIP-FLOP 503, 7474 DUAL D FLIP-FLOP 504, 7420 DUAL 4-NAND gates 505 and 506, and a 7400 QUAD 2-NAND gate 507.

If the central processor is in an undefined state, i.e. no shifting bit, the TRFRQ signal is present. This triggers monostable multivibrator 490 which in turn generates the system reset and bus control unit reset commands. The $\overline{\text{SYRST}}$ and SYRST commands are used to remove the central processor clock pulses to the bit time counter. When monostable multivibrator 490 has timed out, the reset commands are removed and monostable multivibrator 491 is triggered, generating TBFLD which inhibits EL GRD2 on the circuit of FIG. 30. Monostable multivibrator 492 is triggered after monostable multivibrator 491 times out and the CCMD2 signal starts the processor running again, beginning at program address 00000 after having been reset.

The executive cycle timer (monostable multivibrator 493) monitors the length of time the central processor is away from the program's executive cycle to perform test routines. As long as the executive cycle disable switch is not operated, i.e. DWTDG "low," flip-flop 503 will set when FBRCK is received. NAND 507 starts monostable multivibrator 493 timing and thus provides the clock pulse to set flip-flop 504. With all inputs to NAND gate 506 high, WTDGT is high and lights the executive cycle status lamp on the test panel, indicating that the timer is operating. Each executive cycle bit 14 (DAI 14) is set to retrigger the timer. If the retrigger pulse is not received and the timer times out, the $\overline{Q}$ output of monostable multivibrator 493 goes high and NAND gate 505 will have all high inputs. The $\overline{\text{WTDG}}$ signal is produced and generates a central processor interrupt request on the circuit of FIG. 20. This signal (INTRQJ) is inverted and clears the timer as well as flip-flops 504 and 504. Executive cycle disable switch by being operated inhibits the timer's ability to interrupt the central processor and reset the system to address 0. This mode of operation is used in testing where the executive cycle timer would normally interrupt the routine.

FIGS. 15 through 19 are detailed schematic circuit diagrams showing the 4-1 multiplexer, 2-1 multiplexer, one word buffer, and the bus initial conditions detector of FIG. 2 for bits 1–4, 5–8, 9–12, 13–16, and 17–20 respectively. The circuit of FIG. 15 comprises 74123 DUAL 4-1 MULTIPLEXERS 510 and 511, 74157 QUAD 2-1 MULTIPLEXER 512, 7475 DUAL 2-BIT LATCHES 513 and 154, 7438 open collector QUAD 2-NAND BUFFERS 515–522, 7404 HEX INVERTERS 523–531, and 7420 DUAL 4-NAND gate 532.

Figure 16:
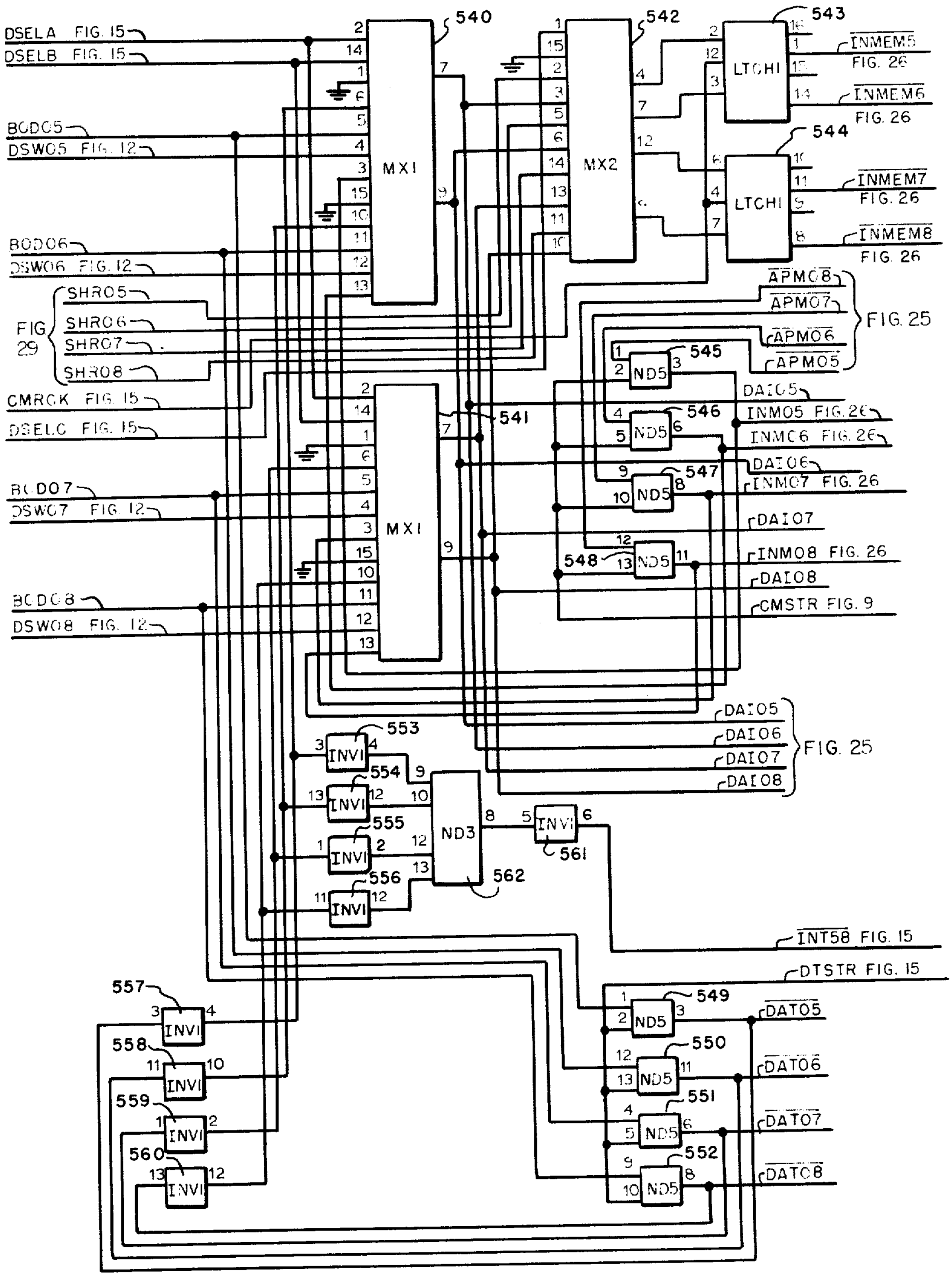

The circuit of FIG. 16 comprises 74153 DUAL 4-1 MULTIPLEXERS 540 and 541, 74157 QUAD 2-1 MULTIPLEXER 542, 7475 DUAL 2-BIT LATCHES 543 and 544, 7438 open collector QUAD 2-NAND BUFFER gates 545–552, 7404 HEX INVERTERS 553–561, and 7420 DUAL 4-NAND gate 562.

Figure 17:
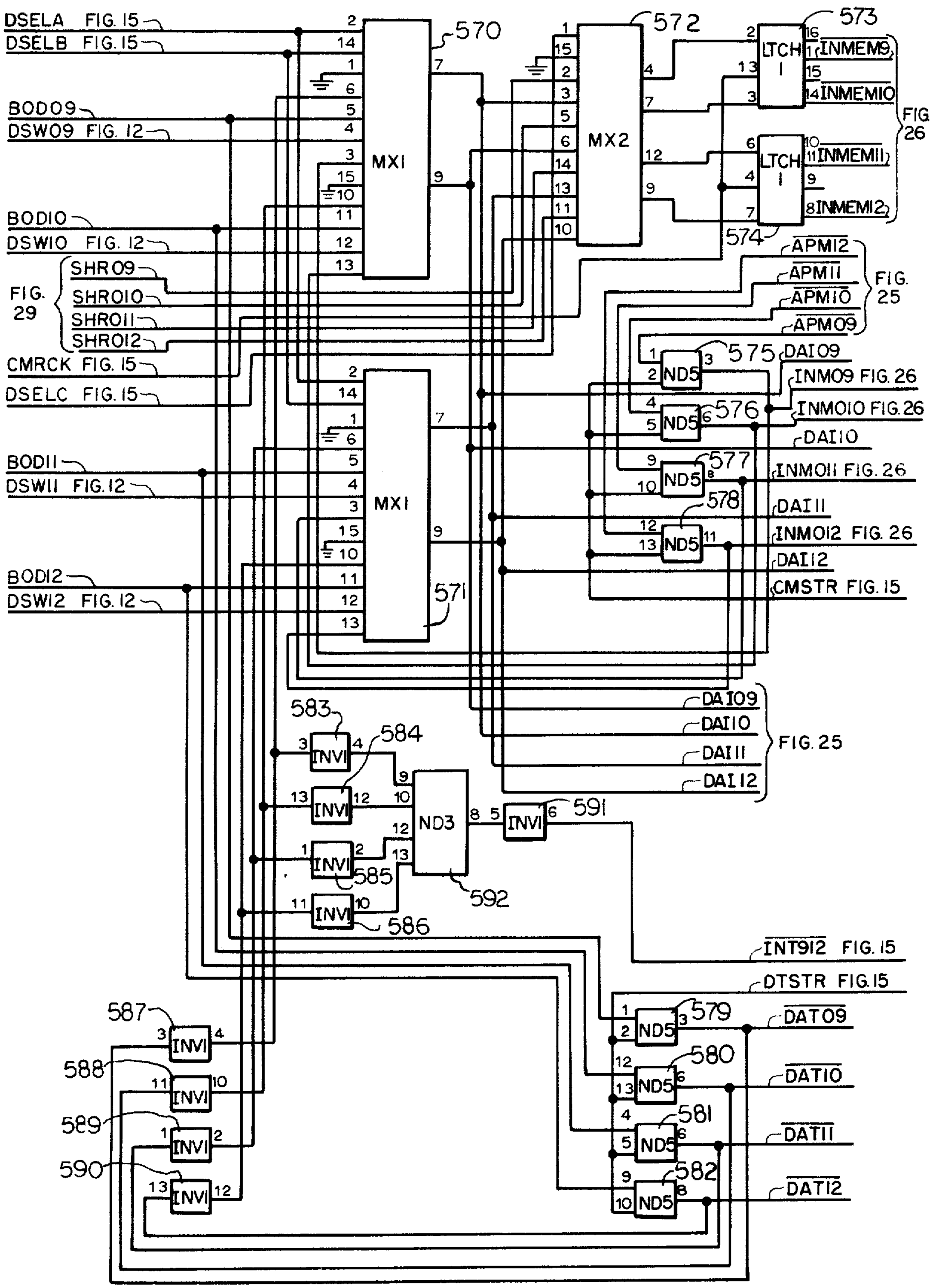

The circuit of FIG. 17 comprises 74153 DUAL 4-1 MULTIPLEXERS 570 and 571, 74157 QUAD 2-1 MULTIPLEXER 572, 7475 DUAL 2-BIT LATCHES 573 and 574, 7438 open collector QUAD 2-NAND BUFFER gates 575–582, 7404 HEX INVERTERS 583–591, and 7420 DUAL 4-NAND gate 592.

Figure 18:
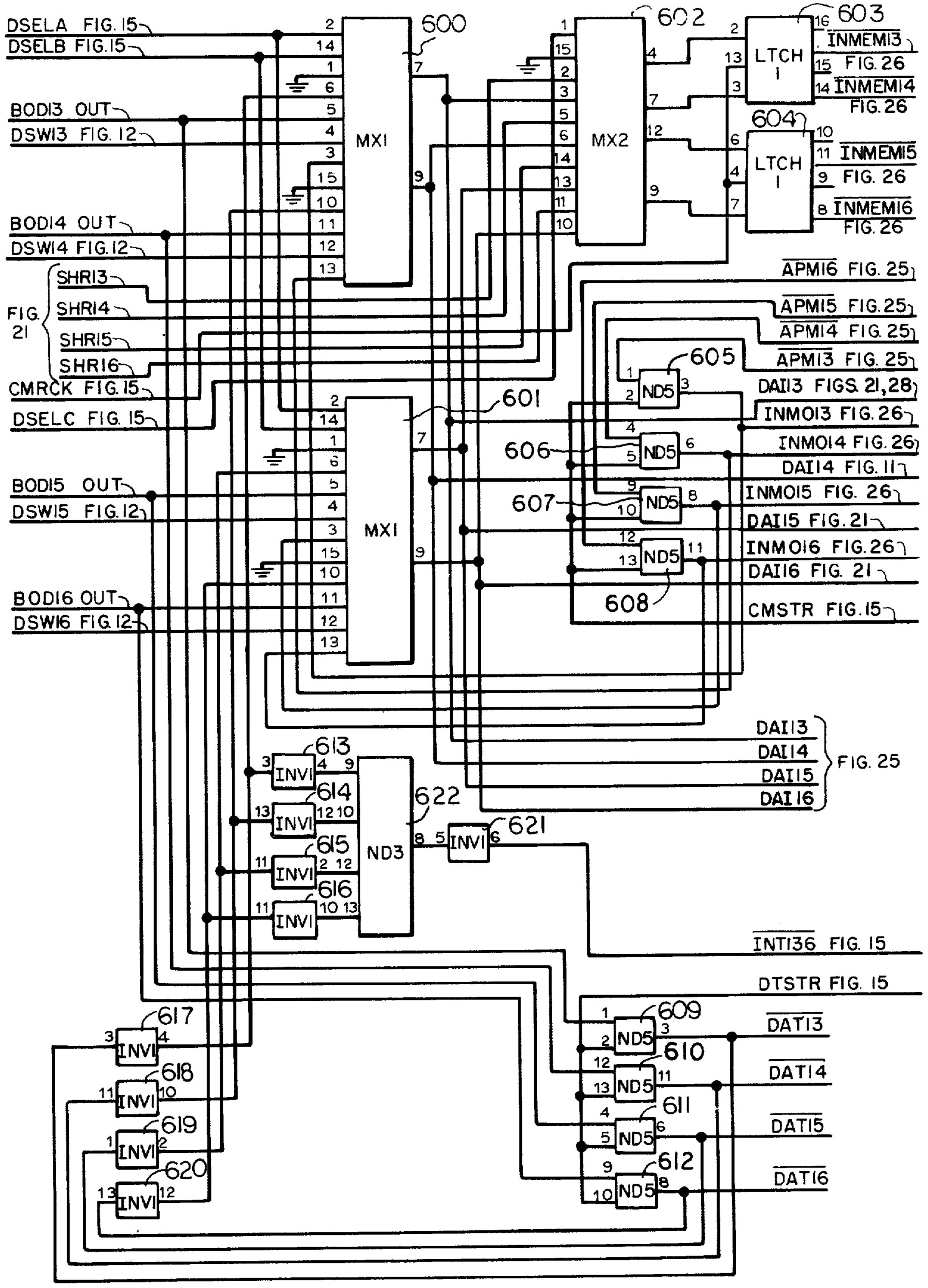

The circuit of FIG. 18 comprises 74153 DUAL 4-1 MULTIPLEXERS 600 and 601, 74157 QUAD 2-1 MULTIPLEXERS 602, 7475 DUAL 2-BIT LATCHES 606 and 604, 7438 open collector QUAD 2-NAND

BUFFER gates 605–612, 7404 HEX INVERTERS 613-621, and 7420 DUAL 4-NAND gate 622.

Figure 19:
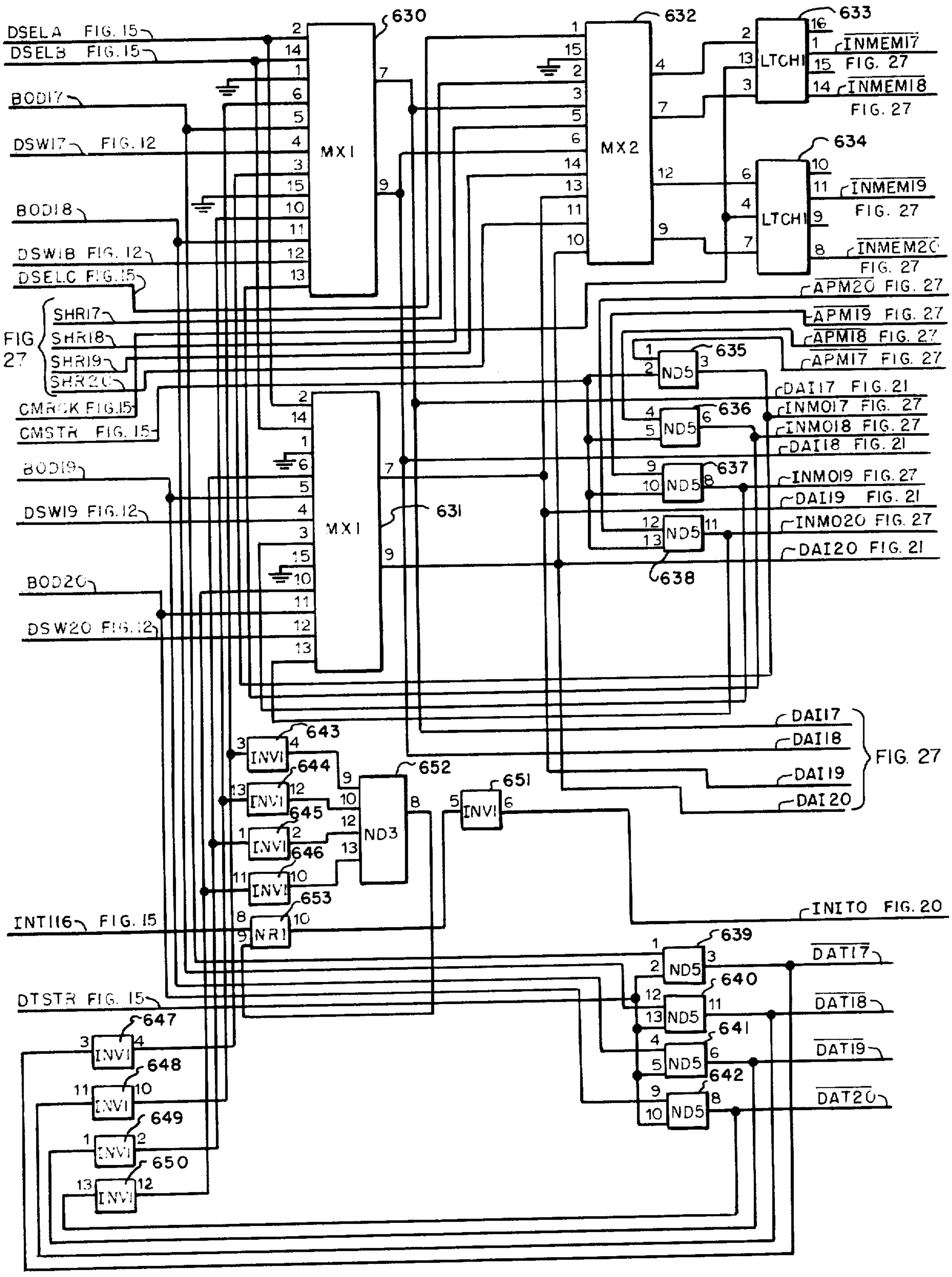

The circuit of FIG. 19 comprises 74153 DUAL 4-1 MULTIPLEXERS 630 and 631, 74157 QUAD 2-1 MULTIPLEXER 632, 7475 DUAL 2-BIT LATCHES 633 and 634, 7438 open collector QUAD 2-NAND BUFFER gates 635–642, 7404 HEX INVERTERS 643-651, 7420 DUAL 4-NAND gate 652, and 7402 QUAD 2-NOR gate 653.

The in/out selector, which consists of 4-1 data selectors, 2-1 data selectors and one word latches, is used to gate information between the central processor and the fault detection system. Multiplexers 510 and 511, 540 and 541, 570 and 571, 600 and 601, and 630 and 631 on FIGS. 15, 16, 17, 18 and 19 respectively act as 4-1 data selectors. They receive their inputs from bus input data, data coming in from the data bus on the $\overline{DATXX}$ leads, bus output data, output from either the bus address register or the arithmetic logic register (BODXX), data switches, otuput from the central processor test panel data switches (DSWXX) and internal memory, output from the autoprint memory (APMXX) or system fault accumulator memory (INMXX). The multiplexers are addressed by DSELA and DSELB from the fault buffer circuit of FIG. 21. The 4-1 data selector output, via the DAIXX leads, are channeled to the A inputs of the arithmetic logic or are stored in the autoprint memory. The outputs also feed the D1 inputs of the 2-1 data selectors, multiplexers 512, 542, 572, 602 and 632. The DO input data is received, via leads SHR01-SHR20, from the parallel outputs of the 20-bit channel shift registers. DSELC is in the addres lead for the 2-1 data selectors. The outputs are taken to the one word latches, latches 513, 514, 543, 544, 573, 574, 603, 604, 633, 634 which are locked by CMRCK. The latch outputs, $\overline{INMEMX}$ are stored in the system fault accumulator memory shown on FIGS. 26 and 27.

When DTSTR is present in an address or a data out cycle, the fault buffer can place the contents of the bus address register of the arithmetic logic register onto the bus. The BODXX leads contain the address from the bus address register during an address cycle and the arithmetic logic register contents during a data out cycle. The data is placed on the $\overline{DATXX}$ leads to the bus via the 519-522, 549-552, 579-582, 609–612 and 639-642 which are enabled by DTSTR.

The sate of the data bus leads ($\overline{DATXX}$) at the start of each bus cycle is indicated by INITO on the circuit of FIG. 19. Before information is placed on the bus, the leads should be high. If any are low, a bus initial condition failure (BICF) message is sent to the configuration controller. The state of the $\overline{DAT01}$–$\overline{DAT16}$ leads is monitored to INT116 on the circuit of FIG. 15. If the initial conditions of these leads is high, the output of NAND gate 533 will be low. This is combined on the circuit of FIG. 19 with the output of NAND gate 652 (bits 17–20) to give the initial condition of all bits (INITO).

Figure 20:
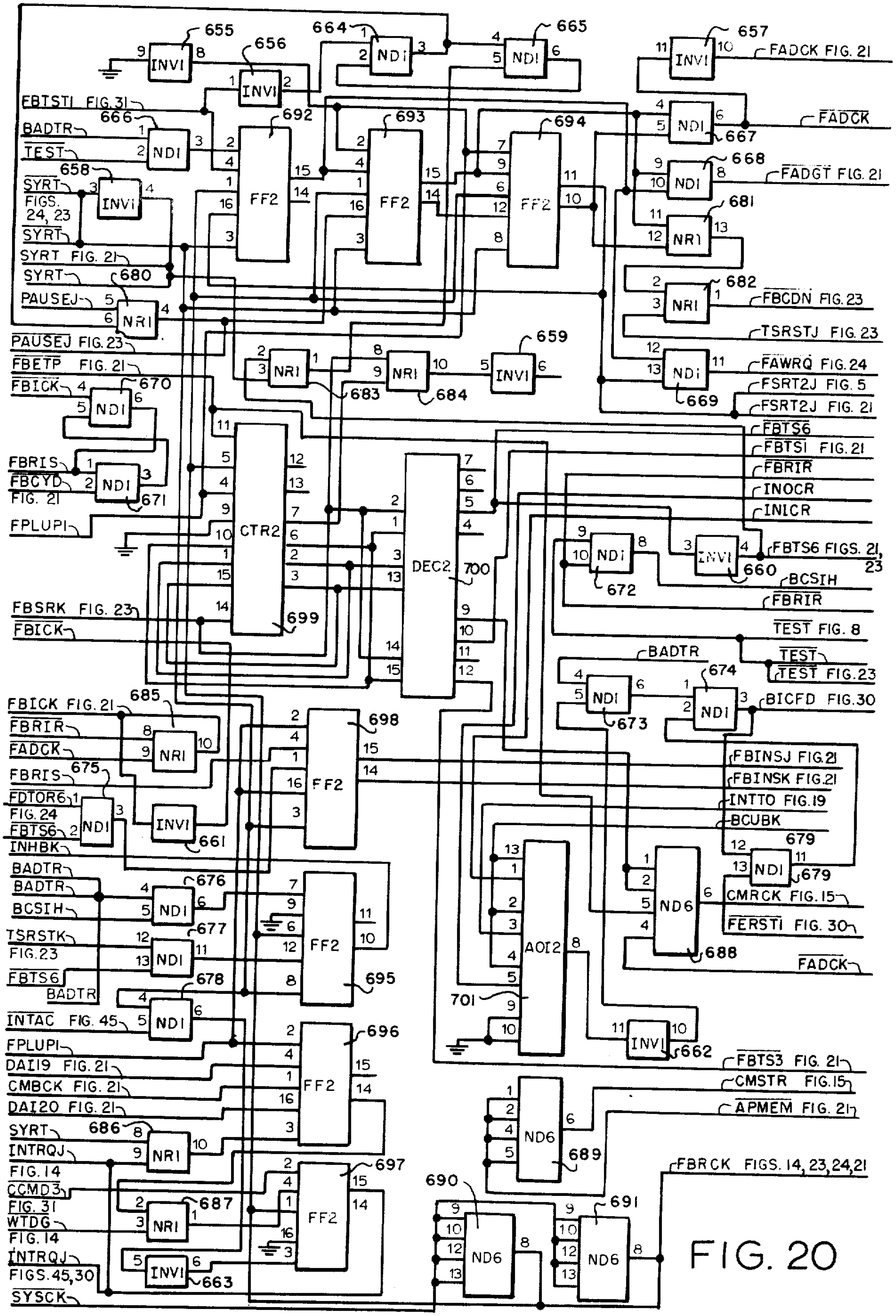
FIG. 20 is a detailed schematic circuit diagram showing the address monitor and storage control logic, the data monitor and storage control logic, the fault buffer cycle control, and the interrupt status of FIG. 2.

FIG. 20 is a detailed schematic circuit diagram showing the address monitor and storage control logic, the data monitor and storage control logic, the fault buffer and cycle control, and interrupt status of FIG. 2. The circuit of FIG. 20 comprises 7404 HEX INVERTERS 655–663, 7400 QUAD 2-NAND gates 664–679, 7402 QUAD 2-NOR gates 680–687, 7440 DUAL 4-NAND BUFFER gates 688–691, 7476 DUAL JK FLIP-FLOPS 692–698, 74192 4-BIT UP/DOWN COUNTER 699, 74155 ⅛ or DUAL ¼ DECODER 700, and 7454 4×2 AND/OR/INVERT gate 701.

This circuit provides the logic circuitry for the normal timing cycle of the fault buffer. This cycle occurs at the beginning of each data bus cycle when the fault buffer receives the BADTR signal from the bus control unit. During this cycle the contents of the bus address register are stored in location FFF10 of the system fault accumulator memory and the date being sent or received by the central processor is stored in location FFF11. When a bus cycle makes a reference to a fault detection address (FFFXX), only the address (plus address contents) is stored, not the data.

Three control flip-flops, flip-flops, 692, 693 and 694 determine the cycling process as outlined below in Table 4.

Table 4

| Signal Received | FF692 | FF693 | FF694 | Events |
|---|---|---|---|---|
| | 0 | 0 | 0 | Idle |
| BADTR . $\overline{TEST}$ | 1 | 0 | 0 | |
| FBRCK | 1 | 1 | 0 | $\overline{FADCK}$ and $\overline{FADGT}$ |
| FBRCK | 1 | 1 | 1 | $\overline{FAWRQ}$ |
| $\overline{FBRCK}$ | 0 | 1 | 1 | Pause state |
| $\overline{PAUSEJ}$ . FBRCK | 0 | 0 | 1 | $\overline{FBCDN}$ |
| $\overline{FBRCK}$ | | | | |

Figure 31:
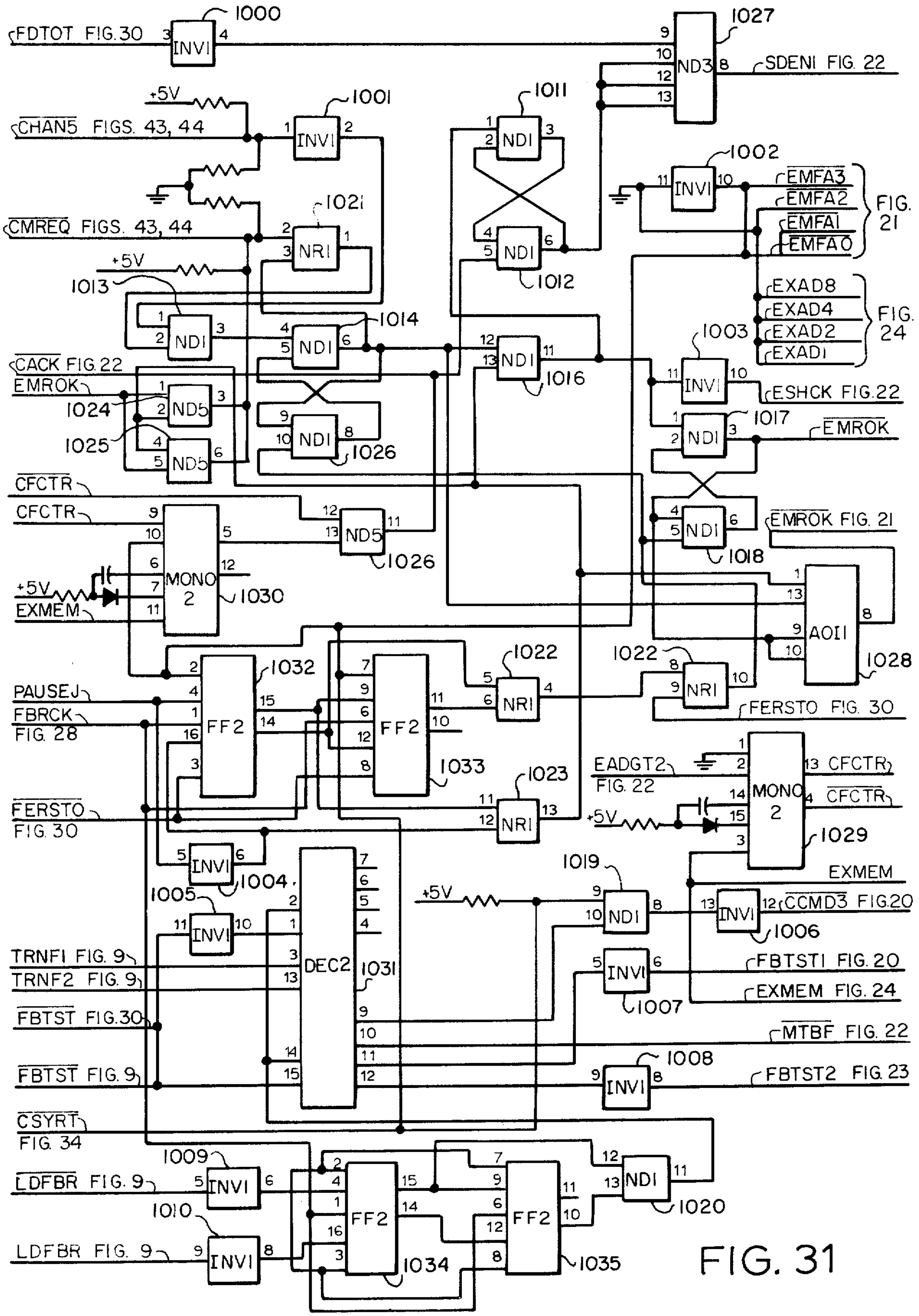
FIG. 31 is a detailed schematic circuit diagram showing the status buffer of FIG. 2 and the fault buffer test logic associated with the test panel circuits of FIGS. 5–13.

If the address cycle logic is to be tested manually from the central processor test panel, the TRNF switches on FIG. 31 will be set for the address cycle start logic test, FBTST1 will be true, placing a high on the J input of flip-flop 692. The flip-flop sets when a FBRCK pulse is received, starting the timing cycle. When flip-flop 694 sets, the high on its J input lights the FBR check light emitting diode (FIG. 5), indicating that the address cycle has functioned properly. This light is extinguished when flip-flop 694 resets at the end of a successful data cycle.

The timing sequence remains in state 011 for the duration of the bus cycle. When the data is present on the bus the BDTRDY signal generated on FIG. 23 generates FBSRK, starting the time slot counter 699 which generates the signals required to store the data in address FFF11. The counter has 7 time slots, FBTS0-FBTS6. The 2Y outputs of decoder 700 are enabled by count 0–3. At FBTS0, CMRCK is generated and clocks the data into the one word latch of the I/0 selector. The data may be data from or to the central processor. At FBTS1, either a data or a data in transaction is requested, $\overline{FDTOR1}$ or $\overline{FDTIR1}$ which are obtained from the circuit of FIG. 21. The data in the one word latch is written into address FFF11. If communication is being made with the configuration controller, the counter will pause at FBTS3 until an acknowledge signal, $\overline{CACK}$, received on the circuit of FIG. 24 from the configuration controller. The $\overline{FBTS3}$ signal generates $\overline{FBETP}$ on the circuit of FIG. 21, causing counter 699 to be loaded with the output of FBTS3. Thus the counting stops until $\overline{CACK}$ removes FBDTR (FIG. 24) which in turn $\overline{FBETP}$, allowing the counter to resume counting up. At FBTS6, FBSRK on FIG. 23 goes high clearing counter 699 and thus stopping the timing cycle. When the $\overline{PAUSEJ}$ command is removed, flip-flop 693 resets, generating $\overline{FBCDN}$ via NOR gate 681 and NOR gate 682. On the next FBRCK flip-flop 694 resets, returning all control flip-flops to the idle state.

When a fault detection address, FFFXX, is presented to the bus systems, the $\overline{FBRIR}$ signal is generated and produces the BCSIH signal via NAND gate 672. This signal is combined via NAND gate 676, with BADTR, presetting flip-flop 695 and thus generating INHBK via the $\overline{Q}$ output. This signal inhibits BCENB on the bus control unit, preventing the bus control unit from starting. $\overline{FBRIR}$ also generataes $\overline{FBICK}$ via NOR gate 685 and inverter 661, setting the latch comprising NAND gates 670 and 671. The high on FBRIS sets flip-flop 698 when $\overline{FDTOR6}$ generates the clock pulse. FBICK clocks bits 13-20 of the address into the storage latches on the circuit of FIG. 21. At FBTS6, flip-flop 695 and 698 are reset.

If the command output buffer is accessed (address FFF30), CMBCK provides the clock pulse for flip-flop 696. The state of bits 19 and 20 determines when it sets and resets. If the J and K inputs of flip-flop 696 are both zeros, the flip-flop will do nothing. If the J input is 0 and the K input is 1, the flip-flop will reset the interrupt. If the J input is 1 and the K input is 0 the flop-flop will set the interrupt and if both the J and the K inputs are ones the flip-flop will complement the interrupt. If flop-flop 696 is set and the executive cycle timer times out, the $\overline{Q}$ output is combined via NOR gae 687 with $\overline{WTDG}$, setting flip-flop 697 and thus generating the central processor interrupt command, INTRQJ. Whe the TRNF console switches are set for the central processor interrupt mechanism test, the $\overline{CCND3}$ signal is received from the circuit of FIG. 31 and presets flip-flop 697.

If any of the data bus leads are at a low level before information has been placed on them, either INOCR, INICR, or INITO will be high. Since the BCUB flip-flop of the bus control unit will not be set yet, BCUBK is also high, thus enabliing and/or/invert gate 701 and generating BICFD.

Figure 21:
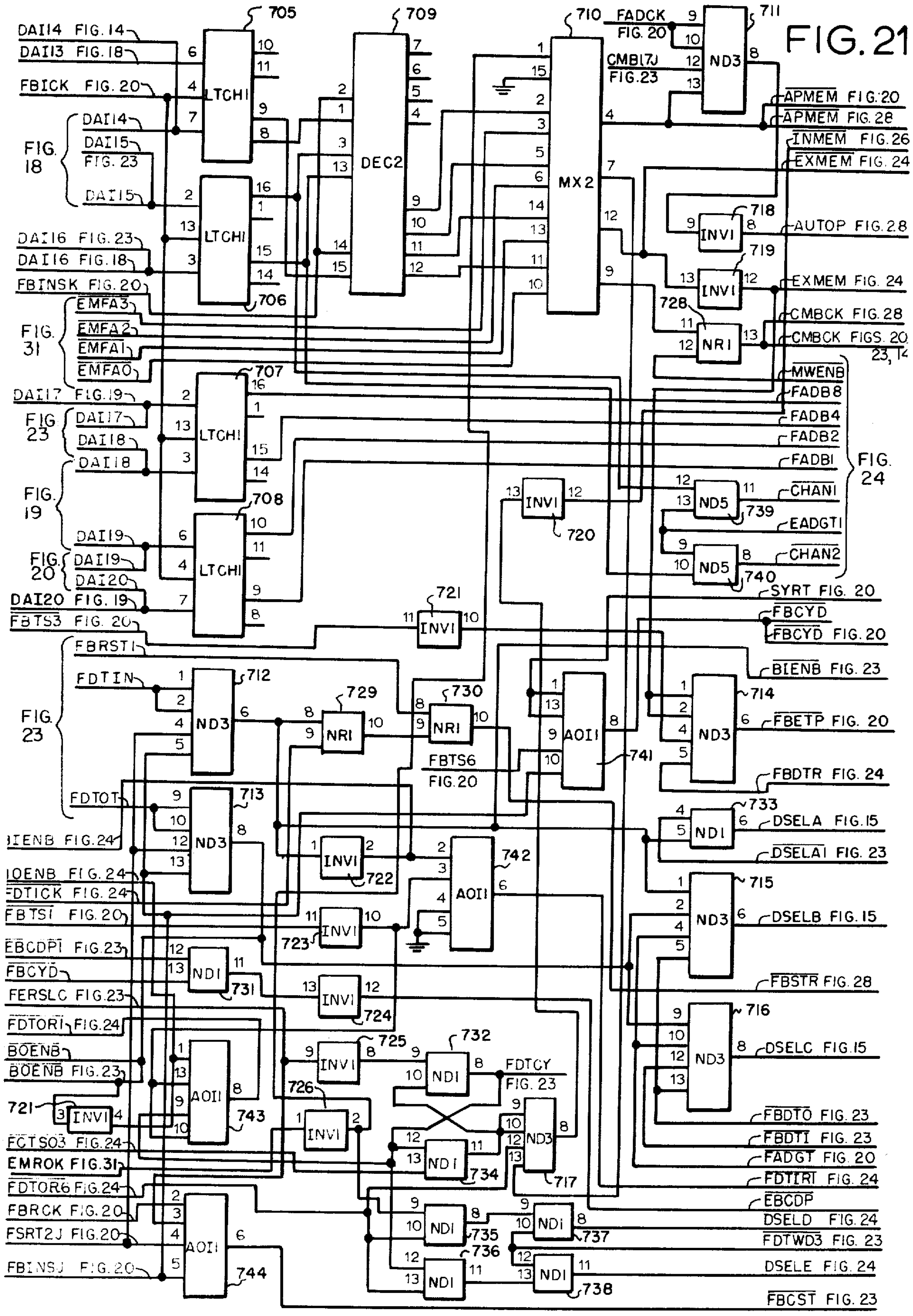
FIG. 21 is a detailed schematic circuit diagram showing the fault buffer memory field decoder and a portion of the command output buffer of FIG. 2.

Referring now to FIG. 21, there is shown a detailed schematic circuit diagram of the fault buffer memory field decoder and a portion of the command output buffer of FIG. 2. The circuit of FIG. 21 comprises 7475 DUAL 2-BIT LATCHES 705–708, 74155 ⅛ or DUAL ¼ DECODER 709, 74157 QUAD 2-1 MULTIPLEXER 710, 7420 DUAL 4-NAND gates 711–717, 7404 HEX INVERTERS 718–727, 7402 QUAD 2-NOR gates 728–730, 7400 QUAD 2-NAND gates 731–738, 7438 open collector QUAD 2-NAND BUFFER gates 739 and 740, and 7451 DUAL 2×2 AND/OR/INVERT gates 741–744.

When a fault detection address, FFFXX, is presented to the bus system, FBICK is generated on the circuit of FIG. 20 and clocks bits 13–20 of the address into latches 705–708. Decoding of the 10 bits via decoder 709 and multiplexer 710 selects the memory field to be accessed. The units digit, via leads FADB8-FADB1, selects the storage area (1 out of 16) within the selected memory field. During the fault buffer prestart cycle, the bus address register contents of the central processor stored in the system fault accumulator memory location FFF10 are required if a fault is detected. The $\overline{EMFA3}$-$\overline{EMFA0}$ leads, which are tied to the D1 inputs 745–747 of multiplexer 710 are strapped to 1011 to select $\overline{INMEM}$ when the multiplexer is addressed by the inverted $\overline{EMROK}$ signal from the circuit of FIG. 31. When the autoprint enable flag is set, CMB17J and FADCK generate AUTOP via NAND gate 711, beginning the autoprint control sequence on the circuit of FIG. 28.

Figure 23:
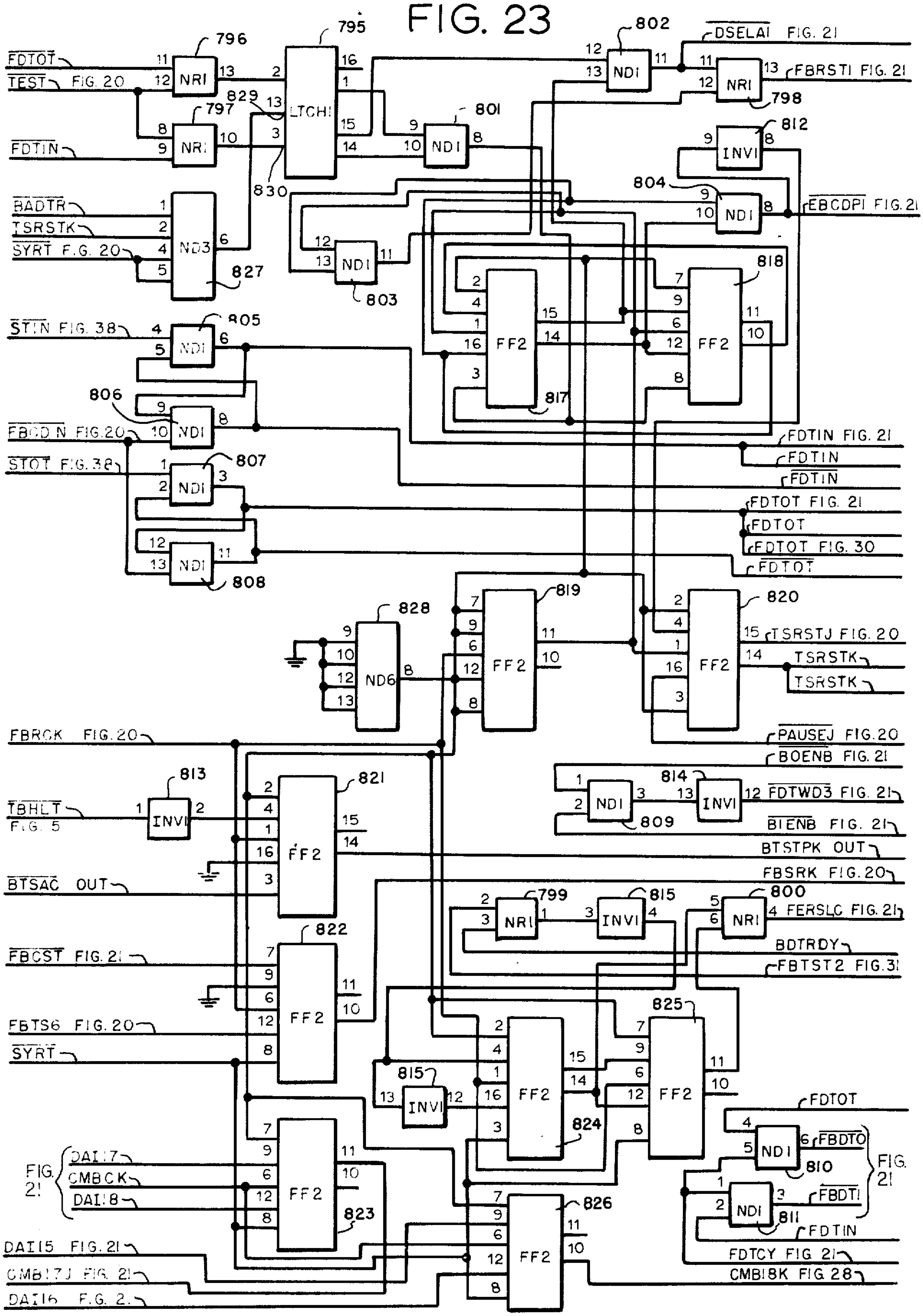
FIG. 23 is a detailed schematic circuit diagram showing the instruction test control logic, the address monitor, and the data monitor of FIG. 2.

When the data is present on the bus, the BDTRDY signal on the circuit of FIG. 23 generates FERSLC which sets the latch comprising NAND gates 732 and 734, causing FDTCY to go true. FERSLC is also used, via the and/or/invert gate 744 to produce $\overline{FBCST}$ and in turn FBSRK on the circuit of FIG. 23 which enables the time slot counter of FIG. 20. At time slot 1, either a data in or a data out transaction is requested. For a data in cycle, FDTIN generates $\overline{BIENB}$ via NAND gate 712. The inverted $\overline{BIENB}$ and $\overline{FBTS1}$ signals are combined via and/or/invert gate 742, to produce $\overline{FDTIR1}$ which is used to set flip-flop 864 on the circuit of FIG. 24. When $\overline{BIENB}$ is true, DSELA and DSELB are both high, selecting data from the autoprint memory or the system fault accumulator memory to be routed through the data selectors of circuit of FIG. 15. If the cycle is data out, FDTOT generates $\overline{BOENB}$ via NAND gate 713. The inverted $\overline{BOENB}$ and $\overline{FBTS1}$ signals are combined via the and/or/invert gate 743, to product $\overline{FDTOR1}$ which is required to set flip-flop 863 of FIG. 24. The $\overline{BOENB}$ signal forces highs on the data selector address leads DSELB and DSELC. At time slot 3, NAND gate 714 is enabled if the configuration controller is being accessed, i.e. EXMEM true. The $\overline{FEBTP}$ signal producd stops the time slot counter of FIG. 20 until $\overline{CACK}$ from the configuration controller removes FBDTR and in turn, $\overline{FEBTP}$. At time slot 6, and/or/invert gate 741 is enabled on the leading edge of FBTS6, before it resets FBINS on FIG. 20, thus removing FBINSJ. The $\overline{FBCYD}$ signal from and/or/invert gate 741 generates $\overline{EBCDP}$ via NAND gate 731 and inverter 724. This resets the pause flip-flop and the bus control unit, allowing the bus control unit to operate again.

When either $\overline{BIENB}$ or $\overline{BOENB}$ is true, $\overline{FDTWD3}$ on the circuit of FIG. 23 goes low. This signal causes DSELD and DSELE to go high, selecting the FADB8-FADB1 address leads for the autoprint memory or system fault accumulator memory storage areas of FIG. 24. In the prestart cycle when address FFF10 must be accessed to obtain the bus address register contents, the inverted $\overline{EMROK}$ signal causes DSELD to go high. Since FDTCY and $\overline{FDTWD3}$ are false, DSELE will be low. This combination of DSELD and DSELE selects the EXAD8 through EXAD1 address leads which strap to 0000 on FIG. 24.

Figure 24:
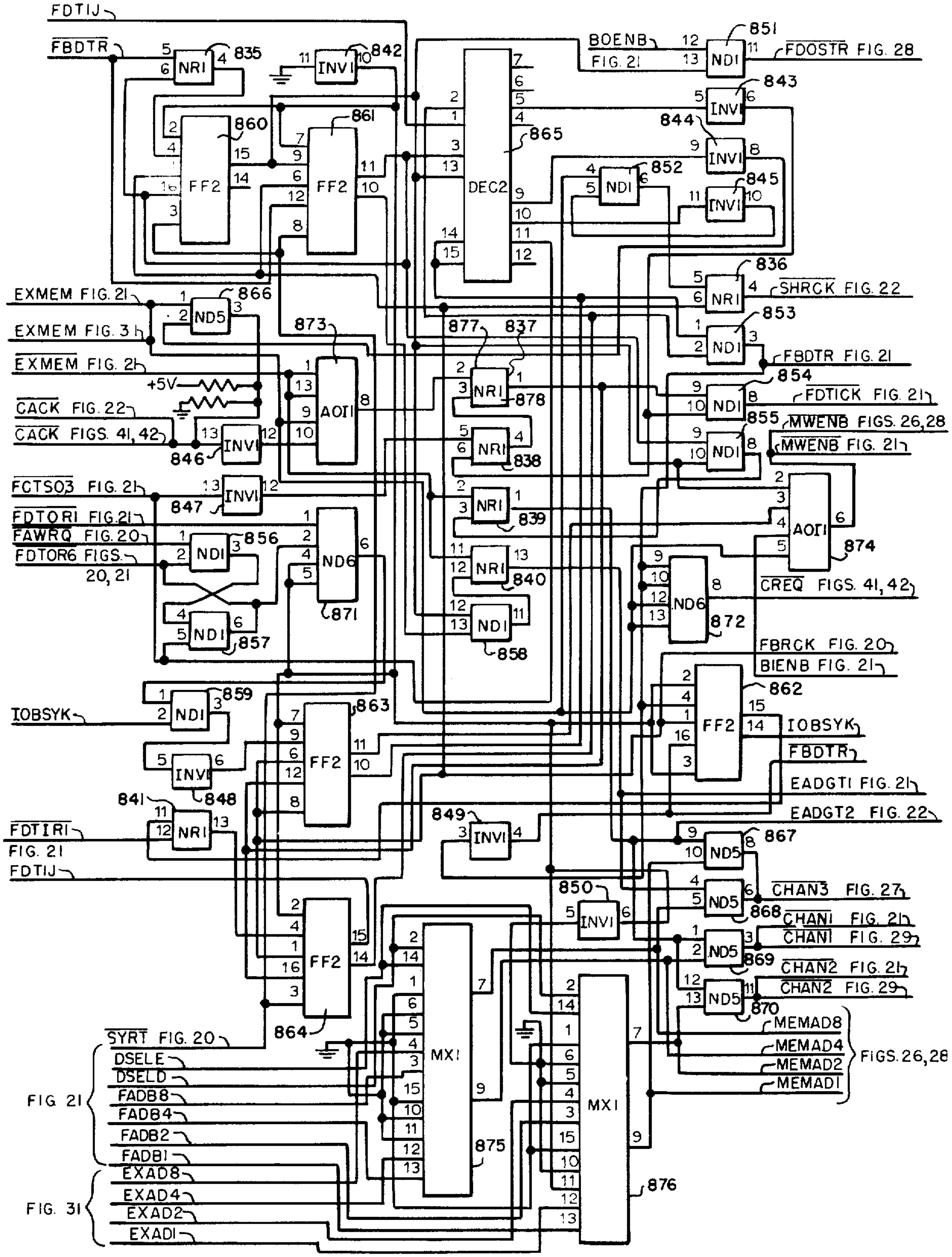
FIG. 24 is a detailed schematic circuit diagram showing the data I/O control, the 4-1 address multiplexer, the address drivers, and the external I/O control of FIG. 2.

The $\overline{CHAN1}$ and $\overline{CHAN2}$ leads are used to transmit the address to the configuration controller and are discussed with the external I/O controller of FIG. 24.

Figure 22:
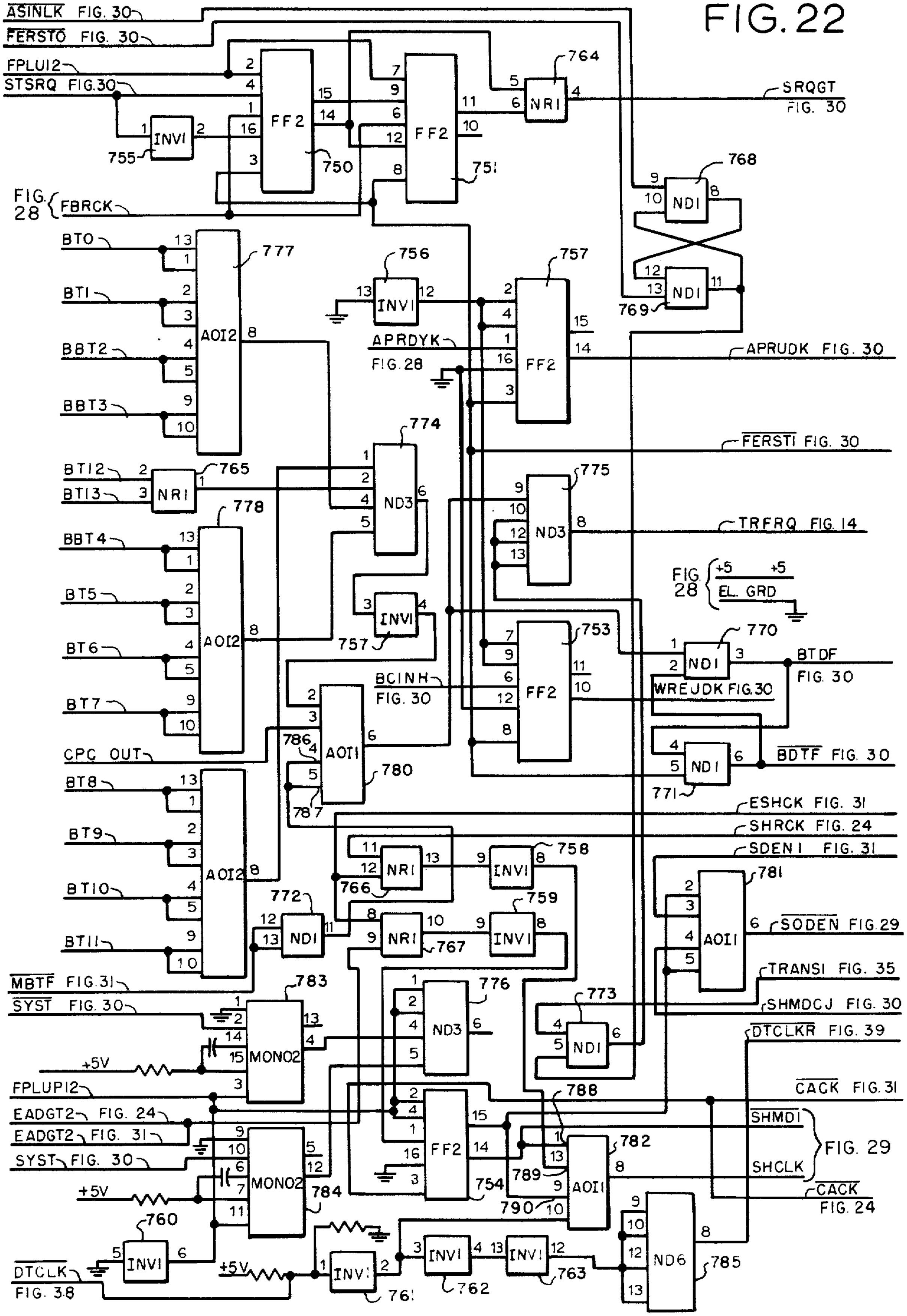
FIG. 22 is a detailed schematic circuit diagram showing the remainder of the time base fault detector, a portion of the status buffer, and a portion of the I/O buffer shift register of FIG. 2.

Referring now to the circuit diagram of FIG. 22, there is shown a detailed schematic representation of the remainder of the time base fault detector, a portion of the status buffer, and a portion of the I/O buffer shift register of FIG. 2, 7476 DUAL JK FLIP-FLOPS 750–754, 7404 HEX INVERTERS 755–763, 7402 QUAD 2-NOR gates 764–767, 7400 QUAD 2-NAND gates 763–773, 7420 DUAL 4-NAND gates 774–776, 7454 4×2 AND/OR/INVERT gates 777-779, 745[illegible] DUAL 2×2 AND/OR/INVERT gates 780–782, 7412[illegible] DUAL RETRIGGERABLE MONOSTABLES 783 an[illegible] 784, and DUAL 4-NAND BUFFER gate 785.

Flip-flops 750 and 751 form in part of the stat[illegible] buffer logic and will be described later in relation to th[illegible] circuit of FIG. 30.

The central processor bit time counter uses a shi[illegible] register to shift a bit to define the present bit time sta[illegible]

of the central processor. If a 1 is not present on any of the shift register outputs, the central processor will be in an undefined state and the outputs of and/or/invert gate 777, NOR gate 765, and/or/invert 778, and and-/or/invert gate 779 will all be high. The low output from NAND gate 774 is used to generate TRFRQ and BTDF. The timed reset request (TRFRQ) is inhibited when the on line system is auto stopped since $\overline{ASINLK}$ signal sets the latch comprising NAND gates 768 and 769 and the output forces the output of NAND gate 773 to go high. This is transferred to NAND gate 775, placing a low on TRFRQ. The BTDF signal is also true when the time base failure test is manually initiated on the test panel. In this case, $\overline{MTBF}$ generates BTDF via 786 and 787 of and/or/invert 780.

Figure 27:
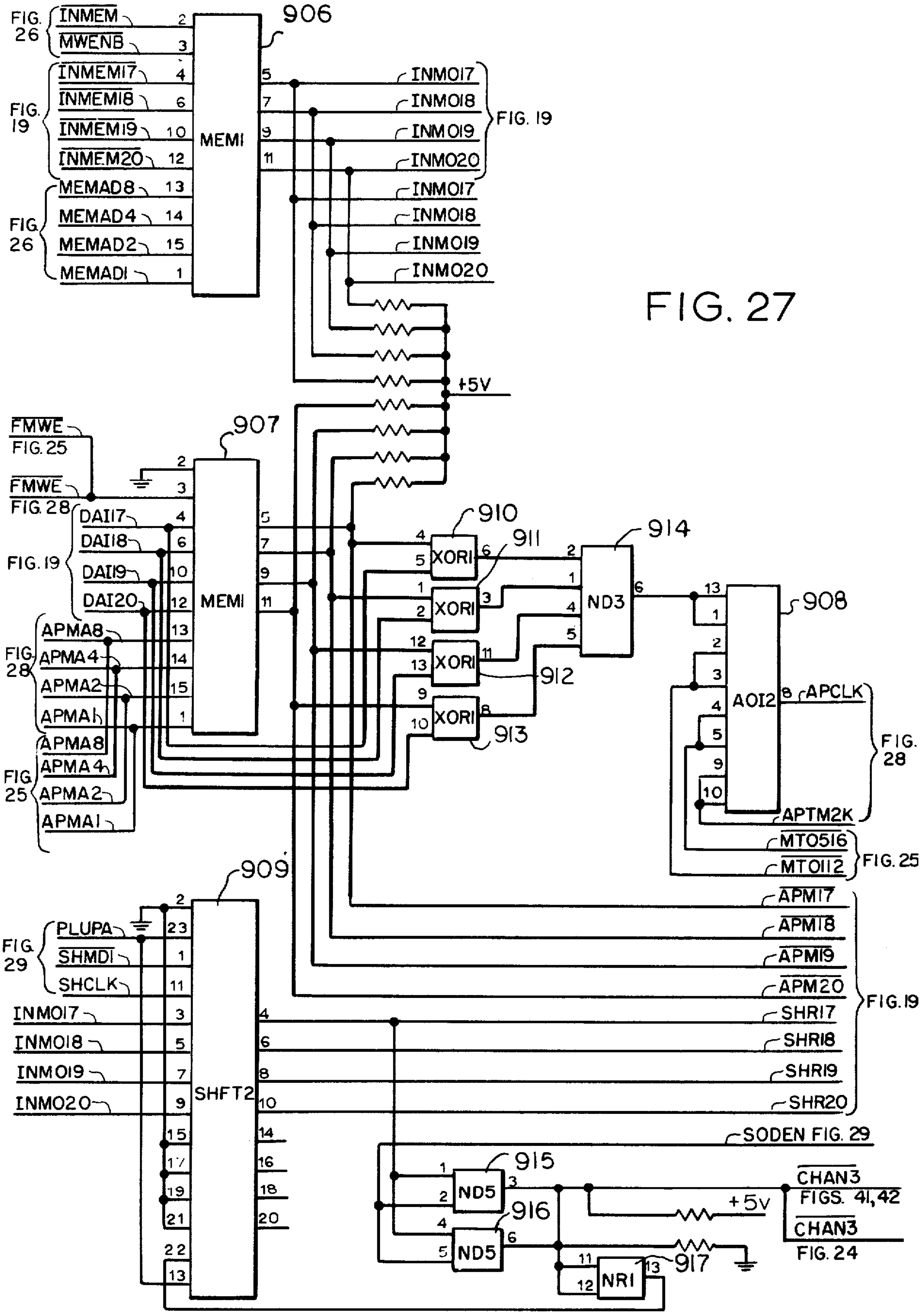
FIG. 27 is a detailed schematic circuit diagram showing the system fault accumulator memory for bits 17–20, the autoprint memory and comparator for bits 17–20 and the I/O buffer shift register for bits 17–20.
Figure 29:
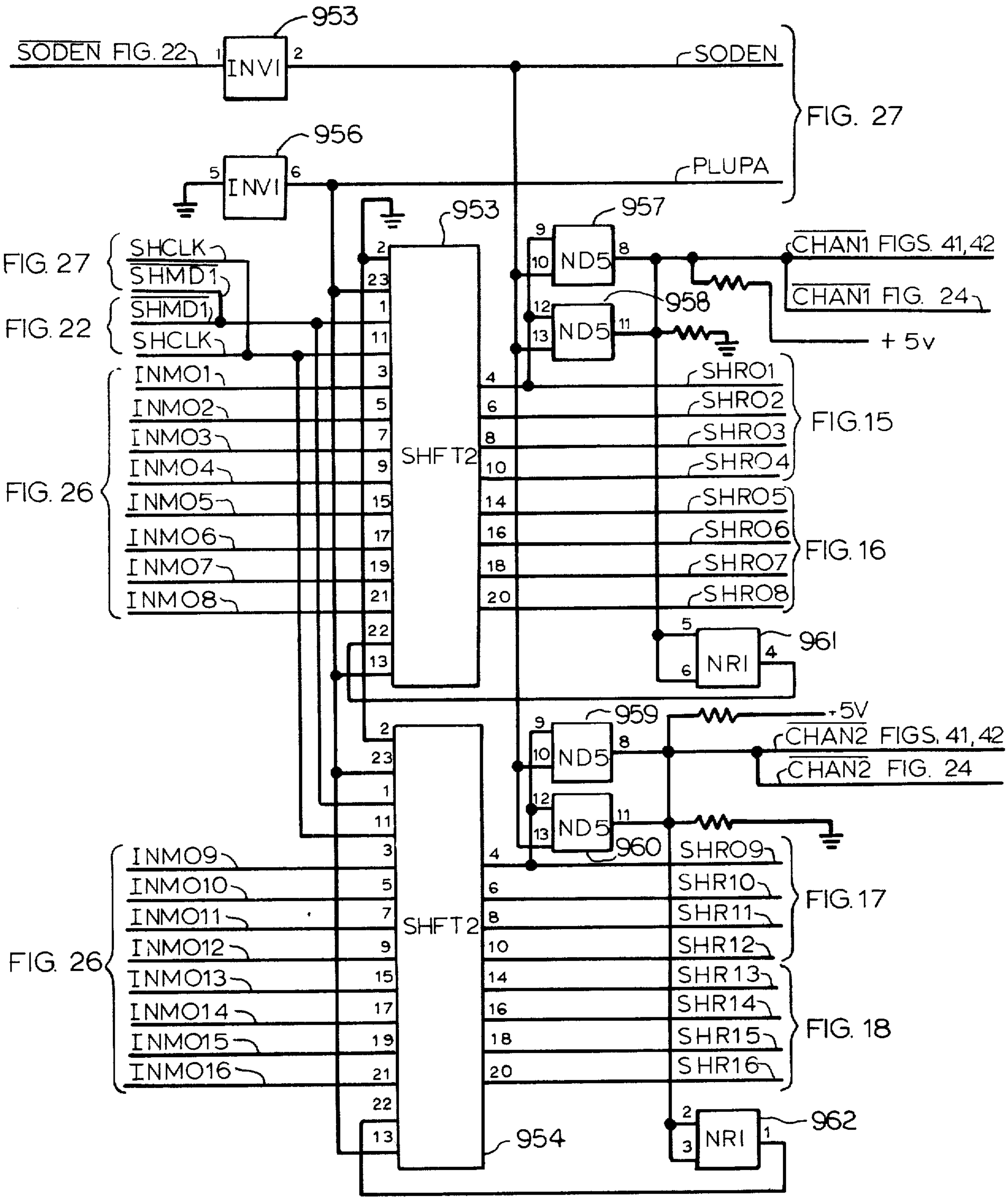
FIG. 29 is a detailed schematic circuit diagram showing the I/O buffer shift register for bits 5–20 and external data receivers and drivers of FIG. 2.

When data is being sent from the fault buffer to the configuration controller the selected data memory content is loaded into the shift registers 909, 953, and 954 of FIGS. 27 and 29 in parallel and then shifted out serially. The ESHCK signal via NOR gate 766 and inverter 758 enables input 788 and 789 of and/or/invert gate 782 generating the load pulse (SHCLK) before flip-flop 754 sets. Since flip-flop 754 has a permanent high on its J input, it sets on the trailing edge of the clock pulse provided by ESHCK via NOR gate 767 and inverter 759. The $\overline{Q}$ output, $\overline{SHMD1}$ places the shift registers in the shift mode. When the $\overline{DTCLK}$ pulses are received from the configuration controller, inputs 790 and 791 of and/or/invert gate 782 are enabled, outputting 8 pulses (SHCLK) to serially shift the data out to the configuration controller. With flip-flop 754 set and SDEN 1 true since it is a data out cycle, $\overline{SODEN}$ from and/or/invert gate 781 enables the data to be sent out on channels 1, 2 and 3. The $\overline{DTCLK}$ pulses are returned to the configuration controller via $\overline{DTCLKR}$ to shift the data into the configuration controller's shift registers. When the configuration controller has received all the data it sends out an acknowledge signal ($\overline{CACK}$) which clears flip-flop 754.

If data from the configuration controller is requested by the fault buffer, it is placed on the data paths in synchronism with the 8 clock pulses sent by the configuration controller, $\overline{DTCLK}$. At the end of the clocking sequence the configuration controller generates an acknowledge ($\overline{CACK}$) indicating the end of the transmission.

FIG. 23 is a detailed schematic circuit diagram showing the instruction test control logic, the address monitor, and the data monitor of FIG. 2. It comprises 7475 DUAL 2-BIT LATCH 795, 7402 QUAD 2-NOR gates 796–798, 7400 QUAD 2-NAND gates 801–808, 7404 HEX INVERTER 812, 7476 DUAL JK FLIP-FLOPS 817 and 818, and 7420 DUAL 4-NAND gate 827 comprising the instruction test control logic portion of FIG. 23 and 7402 QUAD 2-NOR gates 799 and 800, 7400 QUAD 2-NAND gates 809–811, 7404 HEX INVERTERS 813–815, 7476 DUAL JK FLIP-FLOPS 819–826 and 7440 DUAL 4-NAND BUFFER gate 828 comprising the address monitor and the date monitor portions of FIG. 23.

In order to test the central processor's instruction processing in each operational code and bit time, the central processor is placed in the TEST mode. In this mode an accumulator may be loaded from the data input switches on the TEST panel. The system is reset to bit time 0 by operating the reset halt at step switches. Reset half generates $\overline{SYRT}$ which, via NAND gate 827 places a high on the clock lead 829 of latch 795. When the test switch is operated, the central processor can receive input data from the 20 data input TEST panel switches. The $\overline{STIN}$ command sets the latch comprising NAND gates 805 and 806 generating $\overline{FDTIN}$ which is combined via NOR gate 297 with $\overline{TEST}$, to place a high on input 830 of latch 795. Since the clock lead is high the data is transferred to the Q2 output. Flip-flop 819 converts the 10 megahertz FBRCK to a 5 megahertz clock which sets flip-flop 817 since the J input is normally high. With flip-flop 817 set, both inputs to NAND gate 802 are high generating $\overline{DSELA1}$ which places a high on DSELA on FIG. 21 to route the data switches to the DA1 lines (FIGS. 15–19). Flip-flop 818 sets on the clock pulse after flip-flop 817 sets. The Q output conditions flip-flop 817 to reset on the next clock pulse and also enables NAND gate 803. The output of NAND gate 803 goes low on the leading edge of the next 5 megahertz clock pulses, generating FBRST1 via NOR gate 798. When flip-flop 817 is reset while flip-flop 818 is still set, $\overline{EBCDP1}$ goes true, causing flip-flop 820 to set on the next clock pulse. The TSRSTJ signal generates $\overline{FDCDN}$ which resets the latch comprising NAND gates 805 and 806, thus removing $\overline{FDTIN}$.

When a $\overline{STOT}$ command is received from the central processor, the latch comprising NAND gates 807 and 808 sets, generating $\overline{FDTOT}$. This is removed when $\overline{FBCDN}$ is received.

When an address match occurs during an autostop function, $\overline{TBHLT}$ is generated and used to set flip-flop 821. The $\overline{Q}$ output BTSTPK) removes the $\overline{CPC}$ pulses to the bit time counter and generates $\overline{BTSAC}$ which clears flip-flop 821.

The BDTRDY signal from the bus control unit, indicating that data is present on the bus, sets flip-flop 824 via NOR gate 799 and inverter 815. Before flip-flop 825 sets on the next FBRCK, NOR gate 800 has both inputs low so FERSLC is true. This generates $\overline{FBCST}$ on FIG. 21 which presets flip-flop 822. The low on FBSRK enables the time slot counter on FIG. 20. Flip-flop 822 remains set until time slot 6 of the memory cycle. FBTS6 resets the flip-flop, placing a high on FBSRK to clear the counter of FIG. 20.

The command output buffer, accessed at address FFF30, controls the autoprint and central processor interrupt functions. Bits 15 and 16 are stored by flip-flop 826, bits 17 and 18 by flip-flop 823, and bit 19 and 20 by flip-flop 696 of FIG. 20. These flip-flops select the autoprint mode, autoprint enable function and central processor interrupt function, respectively. Table 5 below respresents the required inputs.

Table 5

| Function | Command Output Buffer Functions Inputs to flip-flops 823, 826, 696 J K 0 0 | J K 0 1 | J K 1 0 | J K 1 1 |
|---|---|---|---|---|
| Autoprint Mode (Bits 15 * 16) | Do Nothing | Auto-print Mode A | Auto-print Mode B | Complement |
| Autoprint | Do Nothing | Reset Auto-print Enable | Set Auto-print Enable | Complement Auto print enable |
| CP Inter- | Do Nothing | Reset | Set | Complement |

Table 5-Continued

| Function | Command Output Buffer Functions Inputs to flip-flops 823, 826, 696 J K | | | |
|---|---|---|---|---|
| | J K | J K | J K | J K |
| | 0 0 | 0 1 | 1 0 | 1 1 |
| rupt (Bits 19 and 20) | | Inter-rupt | Inter-rupt | Inter-rupt |

Referring now to FIG. 24, there is shown a detailed schematic circuit diagram of a data I/O control, the 4-1 address multiplexer, the address drivers and the external I/O control of FIG. 2. It comprises 7402 QUAD 2-NOR gates 835–841, 7404 HEX INVERTERS 842–850, 7400 QUAD 2-NAND gates 851–859, 7476 DUAL JK FLIP-FLOPS 860–864, 74155 ⅛ or DUAL ¼ DECODER 865, 7438 open collector QUAD 2-NAND BUFFER gates 866–870, 7440 DUAL 4-NAND BUFFER gates 871–872, 7451 DUAL 2×2 AND/OR/INVERT gates 873 and 874 and 74153 DUAL 4-1 MULTIPLEXERS 875 and 876.

The external in/out controller is used to control the exchange of information between the central processor and the fault detection system. The basic timing cycle is controlled by 5 flip-flops. Two of these, flip-flops 863 and 864 are referred to as requesting flip-flops, one used for data out cycles and the data in cycles. Flip-flops 860 and 861 form a shift counter which define predetermined events depending upon the state of the Q outputs. If both Q outputs are zeros, the event defined is an idle state, if the Q output of flip-flop 860 is 1 and the Q output of flip-flop 861 is 0 a write data into memory is defined. If both Q outputs are ones, a maintained write enable event is defined, if the Q output of flip-flop 860 is 0 and the Q output of flip-flop 861 is 1 a removed write enable is defined and if both Q outputs are 0 again the event defined is an idle event. This runs through the sequence of events which are defined by the Q outputs of flip-flops 860–861.

Flip-flop 862 is used to deactive the inputs to flip-flop 863 and flip-flop 864 100 nanoseconds after one of them has been set, and keeps inactive for 100 nanoseconds after the flip-flop has reset. This prevents any change of state of the requesting flip-flops until the data transaction is completed. There are two types of data transactions, fixed length memory cycle and variable length memory cycle.

In the fixed length memory cycle the central processor accesses internal memory, the system fault accumulator memory or the autoprint memory or the command output buffer. No acknowledge signals from the device is required.

System fault accumulator memory and autoprint memory are addressed by bits 15 and 16 via the INMEM and APMEM leads, respectively. The storage area within the memory is specified by bits 17–20, i.e., leads FADB8 through FADB1. These leads are tied to the multiplexers 875 and 876. The multiplexer outputs are fed through the random access memory or autoprint memory via the MEMAD8 through MEMAD1 leads. During the prestart cycle, DSELD is high and DSELE is low selecting the inputs to the multiplexers. These input leads are tied to leads EXAD8 through EXAD1 which are strapped to 0000 to select system fault accumulator memory address 0 to obtain the bus address register address from the previous bus cycle.

In a data out cycle, when the central processor is sending data to the fault detection system, the FDTOR1 command at time slot 1 of the normal timing cycle forces a high output from NAND gate 871. This is used via NAND gate 859 and inverter 848 to set flip-flop 863 when it is clocked with FBRCK pulse. The Q̄ output of flip-flop 863 enables the 2Y outputs of decoders 865. Since flip-flops 860 and 861 has not been set yet, the decoder address leads (A1 and A2) select the 2Y0 output. The Q̄ output of flip-flop 863 also generates FBDTR via NAND gate 853. This signal is used to set flip-flop 862 on the next FBRCK, thus disabling the J input of flip-flop 863 via IOBSYK. The inverted FBDTR signal causes flip-flop 860 to set also on the second clock pulse. When flip-flop 860 sets, the MWENB signal is produced via and/or/invert gate 874 and the 2Y1 output of decoder 865 is selected. While MWENB is true, the data is written into memory. On the third FBRCK, flip-flop 861 sets, selecting output 2Y3 of decoder 865. When flip-flop 860 resets on the next FBRCK, MWENB is removed and 2Y0 output of the decoder is selected resetting the latch comprising NAND gates 856 and 857. Since external memory is not being accessed, the A1 and B1 inputs of and/or/invert gate 873 are high. Therefore, input 877 of NOR gate 837 is low. There is also a low at input 878 since FCTS03 is inverted by inverter 847 and NOR gate 838. The output of NOR gate 837 places a high on the K lead of flip-flop 863 causing it to reset on the next FBRCK. This removes FBDTR and thus on the next clock pulse flip-flops 862 and 861 reset ending the memory cycle.

A data in cycle refers to the central processor requesting data from the fault detection system. This cycle is similar to the data out cycle using flip-flop 864 instead of flip-flop 863. The FDTIR1 signal is used to set flip-flop 864 which enables the 1Y output of decoder 865. Instead of MWENB, FDTICK is asserted at FCTSI3.

When the central processor is communicating with external memory, the memory cycle is not terminated until an acknowledge signal is received from the configuration controller so the cycle is of variable length.

The address FFF2X is presented to the configuration controller via CHAN1, CHAN2, and CHAN3. The 6 bits, bits 15-20, are transmitted in two 3-bit groups. Bits 15, 16 and 17 are sent to this configuration controller when EADGT1 enables NAND gates 739 and 740 of FIG. 21 and NAND gate 868. EADGT2 goes true via NAND gate 858 and NOR gate 839. This enables channel 1, 2 and 3 to transmit the remaining 3 bits of the address via NAND gates 868, 869 and 870.

A data out cycle to the configuration controller is indicated by CACK signal occuring at the beginning of the memory cycle. When flip-flop 863 is set by FDTOR1 and before flip-flops 860 and 861 are set, the 2Y0 output of decoder 865 is selected. Since EXEM is true, both inputs to NAND gate 866 are high and the CACK is sent to the configuration controller. At the same time, CREQ is sent to the configuration controller via NAND gate 872 since FBDTR goes true when flip-flop 863 sets. The FDTR signal causes flip-flops 862 and 860 to set on the second FBRCK as for the internal memory cycle. When flip-flop 860 sets MWENB goes true via and/or/invert gate 74. With flip-flop 860 set, the 2Y1 output of decoder 865 is selected generating SHRCK via inverter gate 45, NAND gate 852, and NOR gate 836. This enables the 20 bit channel shift registers to be loaded with data to be sent to the configuration controller. On the third FBRCK, flip-flop 861 sets, selecting output 2Y3 of decoder 865. When flip-flop 860 resets on the next FBRCK, the 2Y0 output is selected. After the configuration controller has received the data, it sends back an acknowledge signal $\overline{\text{CACK}}$. The inverted $\overline{\text{CACK}}$ signal along with EXMEM enables the A2 and B2 inputs of and/or/invert gate 873. The low output is combined via NOR gate 837 with the low from NOR gate 838 as a result of $\overline{\text{FCTS03}}$, to place a high on the K input of flip-flop 863. When flip-flop 863 resetrs on the next FBRCK, FBDTR is removed so $\overline{\text{CREQ}}$ is removed and flip-flops 862 and 861 reset on the next clock pulse, ending the memory cycle.

In a data in cycle, data is transmitted from the configuration controller to the fault buffer. The data passes through, but is not stored in, the system fault accumulator memory. When BIENB is generated at the beginning of the bus cycle, the A2 and B2 inputs of and/or/invert gate 874 are enabled, since EXMEM is true. The $\overline{\text{MWENB}}$ command produced places the system fault accumulator memory chips in the exhibit state since $\overline{\text{INMEM}}$ is false. The data from the configuration controller is complemented at the output of the data memories. $\overline{\text{MWENB}}$ stays true throughout the data in cycle. Otherwise this cycle is similar to the data out cycle, using flip-flop 864 and 1Y outputs of decoder 865. The $\overline{\text{FBTICK}}$ signal goes true during FCTS13, after the $\overline{\text{CACK}}$ signal from the configuration controller enables NAND gate 845 via and/or/invert gate 873 and NOR gate 837.

Figure 25:
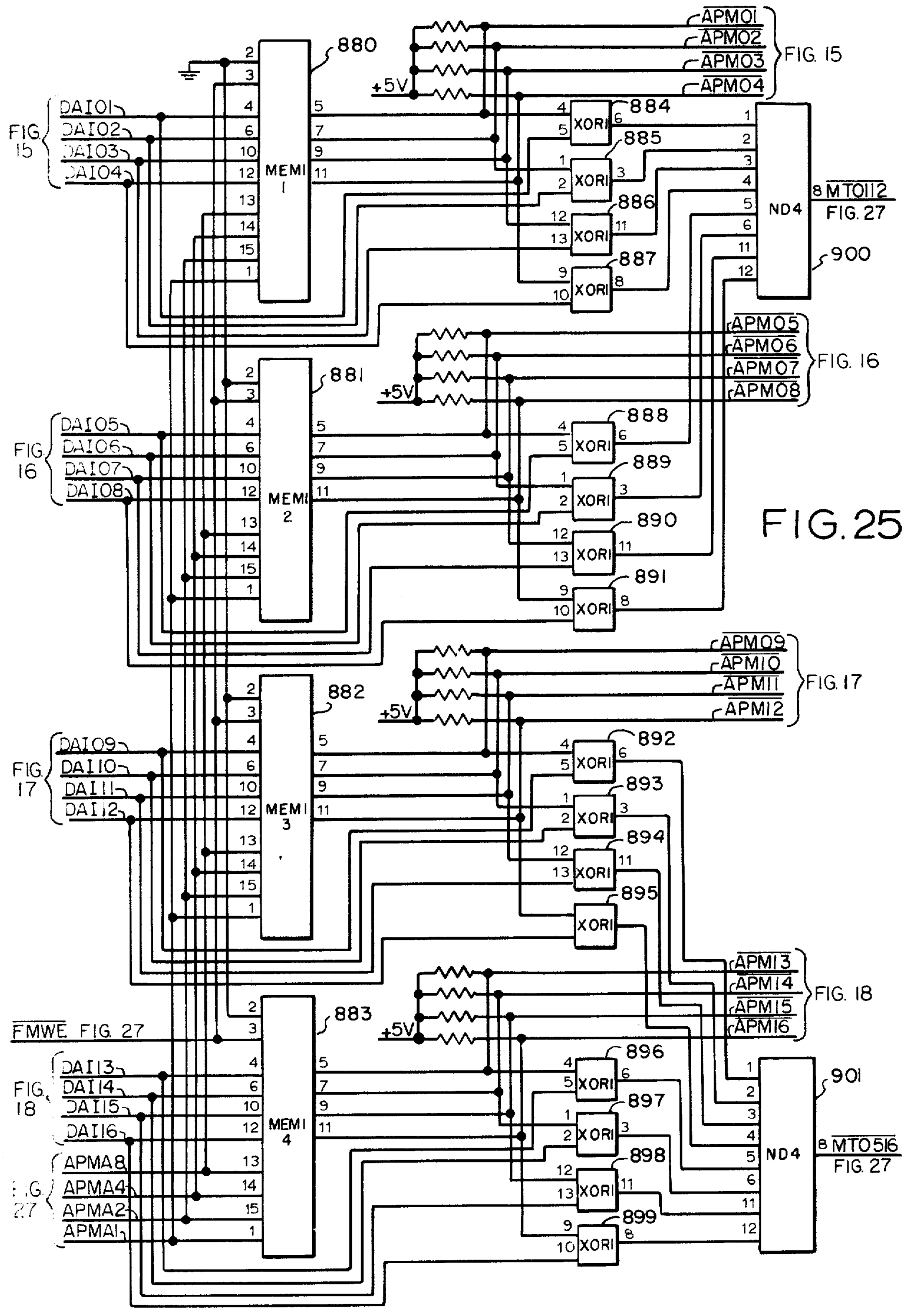
FIG. 25 is a detailed schematic circuit diagram showing the autoprint memory for bits 1–16 and the comparator of FIG. 2.

FIG. 25 is a detailed schematic circuit diagram showing the autoprint memory bits 1-16 and a comparator of FIG. 2. It comprises 7489 16×4 random access memories 880–883, 7486 QUAD 2-EXCLUSIVE OR gates 884-899 and 7430 8-NAND gates 900 and 901.

Storage areas for the first 16 bits of the autopint memory are provided by random access memories 880–883. Bits 17–20 are stored in random access memory 907 bits of FIG. 27.

When the autoprint program switch is operated, the address is set up on the data switch selection console switches are stored in the autoprint memory. The XA console switches contain the selected program memory address for mode A or a mode B autoprint. This address is stored in location 1 (FFF01) of the autoprint memory. The XB switches contain the selected subsystem device addresses for mode B. This address is stored in memory location 2 (FFF02). During the bus cycle, the bus address register contents are presented to the random access memory chips on the DAIXX lines. This address is not stored in the memory since $\overline{\text{FMWE}}$ is not present at this time. The APMA8-APMA1 leads specify the memory location whose contents are to be read out of the random access memory. The address is inverted at the outputs and compared with the bus address register address via the exclusive OR gates. If the address is matched, the NAND gates are enabled and/or/invert gate 908 of FIG. 27 has all low inputs for 100 nanoseconds while APTM2K is low generating APCLK. In mode A, APCLK selects memory locations 3 (FF03) for storing the contents of the address at which the match occurred. This address is outputted to the I/O selector via the $\overline{\text{APMXX}}$ leads to generate a print output under program control. In mode B, address 3 is not generated until the second bus cycle when a match occurred between the device address (XB switches) and the bus address register content. Then this match occurs, APCLK is produced and the contents of the device address are stored in location FFF03. The data is outputeed on the APM access lines to be printed out under program control.

Figure 26:
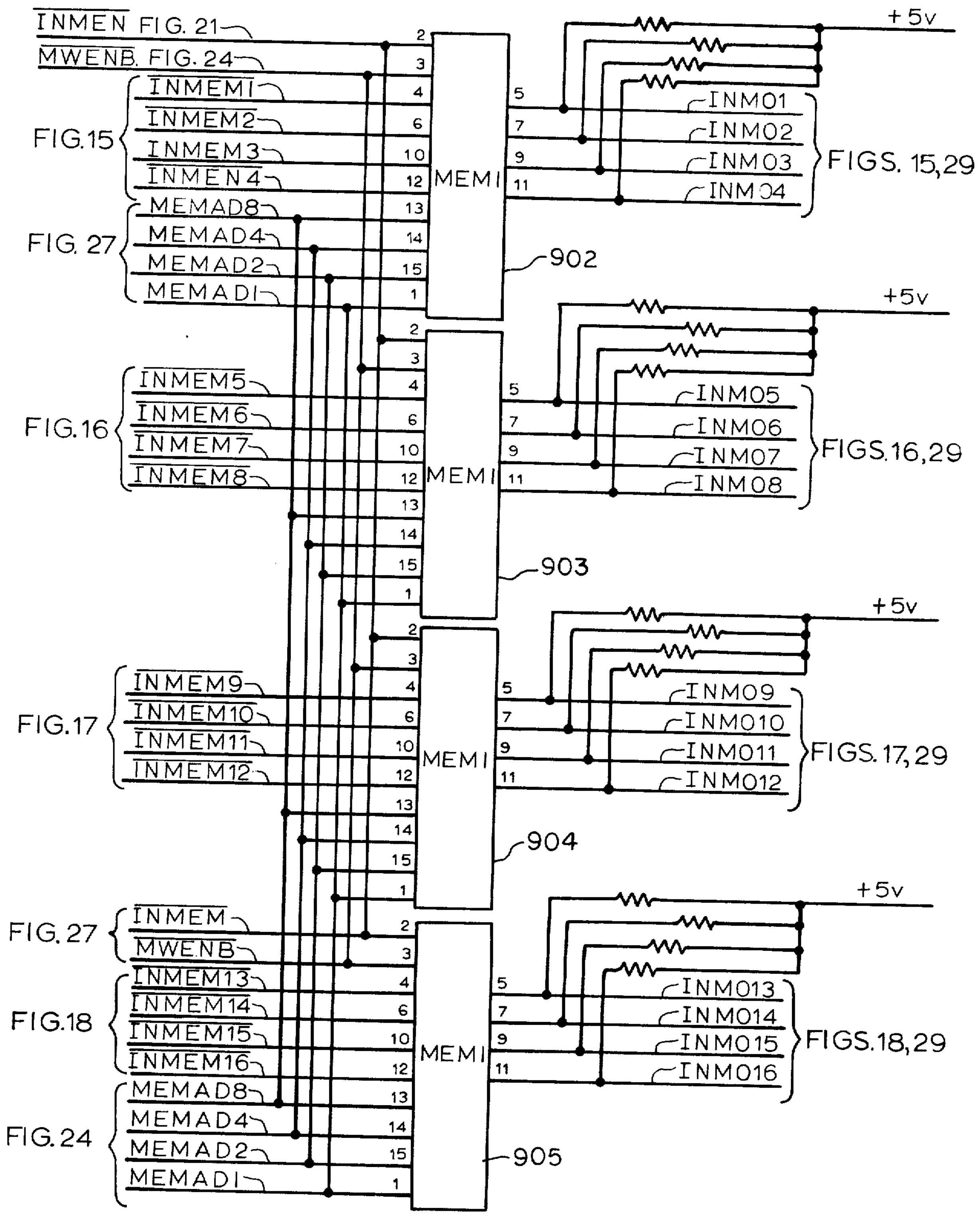
FIG. 26 is a detailed schematic circuit diagram showing the system fault accumulator memory for bits 1–16.

FIG. 26 is a detailed schematic circuit diagram showing the system fault accumulator memory for bits 1-16 of FIG. 2. It comprises 7489 16×4 random access memories 902-905. Storage areas for bits 1–16 of the system fault accumulator memory are provided by random access memory 902–905 and bits 17–20 are stored by random access memory 906 of FIG. 27. Each random access memory provides 15 storage areas (O-F).

When the system fault accumulator memory is selected, $\overline{\text{INMEM}}$ is true. With $\overline{\text{MWENB}}$ also low, the data on the $\overline{\text{INMEMX}}$ leads from the one word latches can be written into the storage area addressed by the MEMAD8-MEMAD1 leads. When the data is read out of the memory, it goes to the data selector or is transmitted to the configuration controller via the 20 bit channel.

FIG. 27 is a detailed schematic circuit diagram showing the system fault accumulator memory bits 17–20, the autoprint memory and comparator bits 17–20 and the I/O buffer shift register bits 17–20. It comprises 7489 16×4 random access memories 906 and 907, 74198 8-BIT SHIFT REGISTER 909, 7454 4×2 AND/OR/INVERT gate 908, 7486 QUAD 2-EXCLUSIVE OR gates 910–913, 7420 DUAL 4-NAND gate 914, 7438 open collector QUAD 2-NAND BUFFER gates 915 and 916 and 7402 QUAD 2-NOR gate 917. Discussion of this figure will be deferred until the next figure is discussed in conjunction with it.

Figure 28:
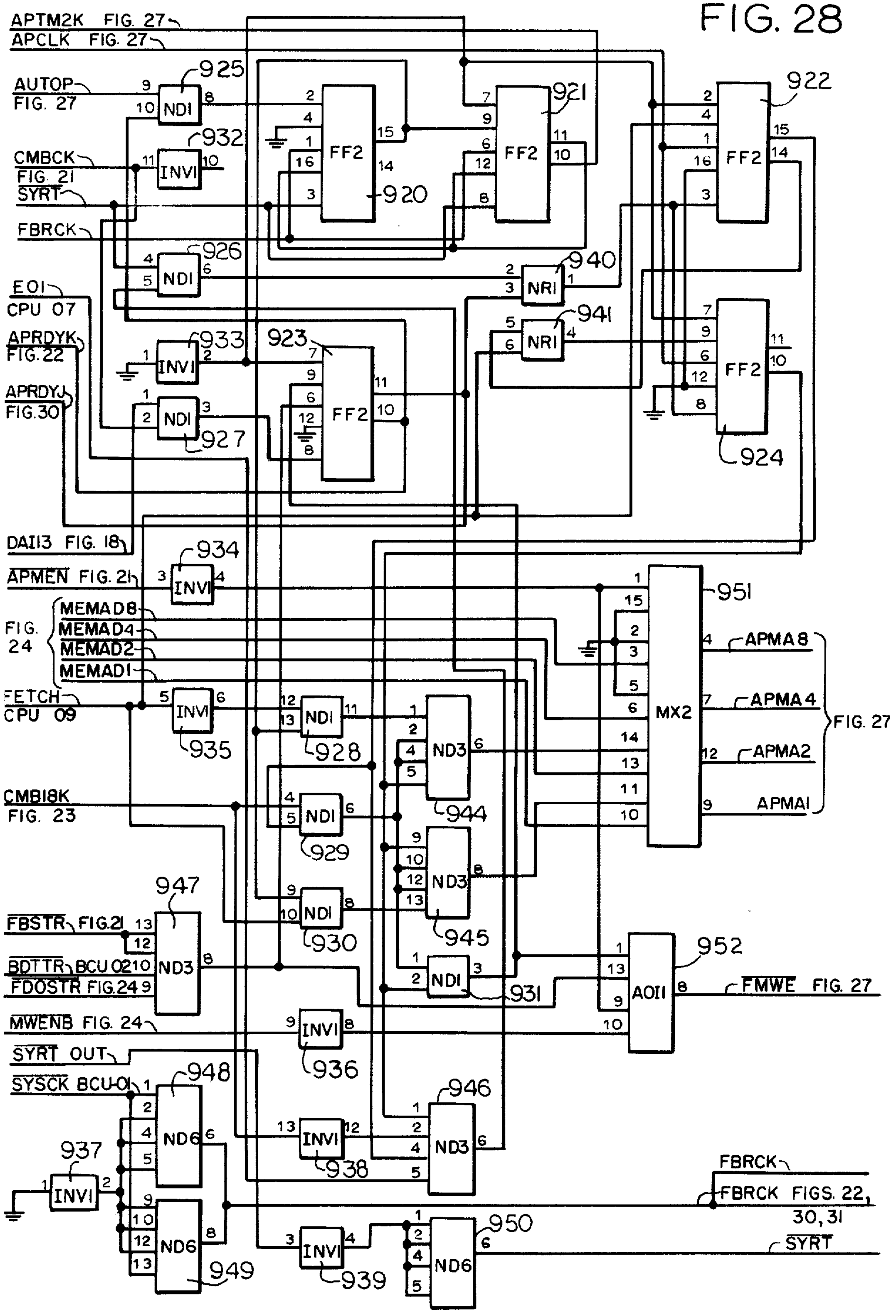
FIG. 28 is a detailed schematic circuit diagram showing the autoprint control of FIG. 2.

FIG. 28 is a detailed schematic circuit diagram showing the autoprint control of FIG. 2. It comprises 7476 DUAL JK FLIP-FLOPS 920–924, 7400 QUAD 2-NAND gates 925–931, 7404 HEX INVERTERS 932–939, 7402 QUAD 2-NOR gates 940 and 941, 7420 DUAL 4-NAND gates 944–947, 7440 DUAL 4-NAND BUFFER gates 948–950, 74157 QUAD 2-1 MULTIPLEXER and 7451 DUAL 2×2 AND/OR/INVERT gate 952.

The function of the autoprint routine is to trigger a print out when a specified address in the main program is reached by the central processor. There are two modes of operation, mode A which deals with the printing of the contents of the specified program address and mode B which deals with the printing of the contents of a device address when the predetermined program address is accessed. Two flip-flops 920 and 921 generate timing signals to read information from the autoprint memory and compare it with the information present on the DAI lines at that time. This function may be performed once or twice depending on which autoprint mode is requested.

When the autoprint program switch is operated it is detected by software and a system status word is checked to determine if the autoprint ready flag is set. This flag is set by hardware when an address match is found. If no autoprint ready flag is set, the data on the XA and XB console switches is stored in the autoprint memory. The program address on the XA switches is stored in locations 0001 and the device address or zeros on the XB switches, in location 0010. Then the autoprint mode is set, depending on XB. If XB is 0, bit 16 of the command output buffer is set to indicate mode A. If XB contains a device address, bit 15 is set, indicating mode B.

The autoprint control sequence begins when AUTOP goes true as a result of FADCK and the autoprint enable flag being set, i.e., bit 17 of the command output buffer. See Table 5. With bit 17 set, CMB17J is high. The AUTOP command present and flip-flop 923 not set causes flip-flop 920 to set. The Q output of flip-flop 920 enables NAND gates 28 and 930 which are used to generate the appropriate address on the APMA8-APMA1 leads. During the FETCH cycle, NAND gate 930 is enabled, generating address 0001 via NAND gate 945 and the 4DO input on multiplexer 951. When FETCH is not true, NAND gate 928 is enabled, generating address 0010 via NAND gate 944 and the 3D0 input of multiplexer 951.

Flip-flop 921 sets on a next FBRCK after flip-flop 920 sets. Since flip-flops reset on the following FBRCK, APTM2K is low for only 100 ns. During this period of time, APCLK is produced if there is an address match when the address stored in either location 0001 or 0010 is compared the circuits of FIGS. 25 and 27 with the address on the DAI lines (contents of the bus address register). APCLK sets flip-flop 922 or flip-flop 924 depending on the state of FETCH. When FETCH is true, flip-flop 922 sets. For mode A, bit 15 of the command output buffer is reset and bit 16 is set, so CMB18K is high (FIG. 23). Therefore, the output of NAND gate 929 will go low after flip-flop 922 sets, generating address 0011 on APMA8-APMA1. The contents of the address that the match occurred on are stored in location 3 of the autoprint memory when $\overline{FMWE}$ enables the random access memories (FIGS. 25 and 27). The output of NAND gate 947 goes high when one of its inputs goes low ($\overline{BDITR}$) if the data is coming from the bus, $\overline{FDSTR}$ for data from the fault buffer or configuration controller to the central processor, i.e. data in, or $\overline{FDOSTR}$ for data from the processor to the fault buffer or configuration controller, i.e., data out. Since NAND gate 931 also has a high input, $\overline{FMWE}$ is generated via the A1 and B1 outputs of the and/or/inverter gate 952. In mode B, flip-flop 922 sets when a match exists between the program address and the bus address register contents, and FETCH is true. Since bit 15 of the command output buffer is set and bit 16 is rest, CMB18K is low. Therefore, NAND gate 829 is disabled so address 0011 is not generated and thus the contents of the program address are not stored. The device address, stored in location 2 of the autoprint memory, is not compared with the bus address register contents until AUTOP goes true again on the next bus cycle. When FETCH is false and flip-flop 922 is set, the high output of NOR gate 941 along with APCLK when the match occurs, sets flip-flop 924. The $\overline{Q}$ output of flip-flop 924 generates address 0011 on PAMA8 through APMA1 and, via NAND gate 931, places a high on the A1 input of and/or/invert gate 952. With B1 also high, $\overline{FMWE}$ is true and the data is stored in location 3.

In either mode of operation, after the data has been stored in location 3, flip-flop 923 sets since the output of NAND gate 931 is high. APRDYJ is used to clear flip-flop 922 and flip-flop 924. It is also used on the circuit of FIG. 30 to set the APRDY flat (bit 3 of the system status word) and to light the AUTPR test panel lamp indicating that the autoprint memory contains data to be printer out. At the end of the instruction cycle, the E01 signal will be present and if flip-flop 924 has not been set, NAND gate 946 will be enabled, clearing flip-flop 922.

FIG. 29 is a detailed schematic circuit diagram showing the I/O buffer shift register bits 5–20 and external data and receiver drivers of FIG. 2. It comprises 74198 8-BIT SHIFT REGISTERS 953 and 954, 7404 HEX INVERTERS 955 and 956, 7438 open collector QUAD 2-NAND BUFFER gates 957–960 and 7402 QUAD 2-NOR gates 961 and 962.

The bidirectional 20 bit channels between the fault buffer and the configuration controller actually consists of 3 channels, channels 1 and 2 shown on FIG. 29 (shift registers 953 and 954 respectively) and channel 3 on the circuit of FIG. 27 (shift register 909). This 20 bit channel is used to transmit information to and from the configuration controller. The 20 bit words are transmitted in 3, 8 bit segments. The third channel uses only 4 bits as data, the remaining 4 bits always being 0.

To establish communication on this bus, the fault buffer transmits a 6 bit address and a direction of data flow indication (in or out) to the configuration controller. The address is sent on $\overline{CHAN1}$, $\overline{CHAN\ 2}$, and $\overline{CHAN3}$ in two 3 bit segments originating on the circuits of FIGS. 21 and 24. A data out cycle is indicated at the configuration controller if it receives a $\overline{CACK}$ signal from the circuits of FIG. 24.

If data is being sent from the fault buffer it is obtained from the system fault accumulator memory and loaded into the shift registers when the FBRCK generates a load pulse on SHCLK. During the load mode, the S1 and S2 inputs are both high. After the data has been loaded in parallel, the $\overline{SHMD1}$ signals sets the shift registers to the shift up mode. Eight clock pulses on SHCLK, generated by the configuration controller, serially shift the data out of the fault buffer to the configuration controller via $\overline{CHAN1}$, $\overline{CHAN2}$ and $\overline{CHAN3}$. The NAND gate drivers are enabled by the inverted $\overline{SODEN}$.

When the data is being received by the fault buffer, it is presented serially to the shift register via the SINU inputs and is shifted up by the 8 SHCLK pulses generated by the configuration controller. The NOR gates receive the data from the configuration controller on $\overline{CHAN1}$, $\overline{CHAN2}$, and $\overline{CHAN3}$. The data outputted on the SHRXX lines is fed in parallel to the I/O selector to be sent via the DIA lines to the CPU.

Figure 30:
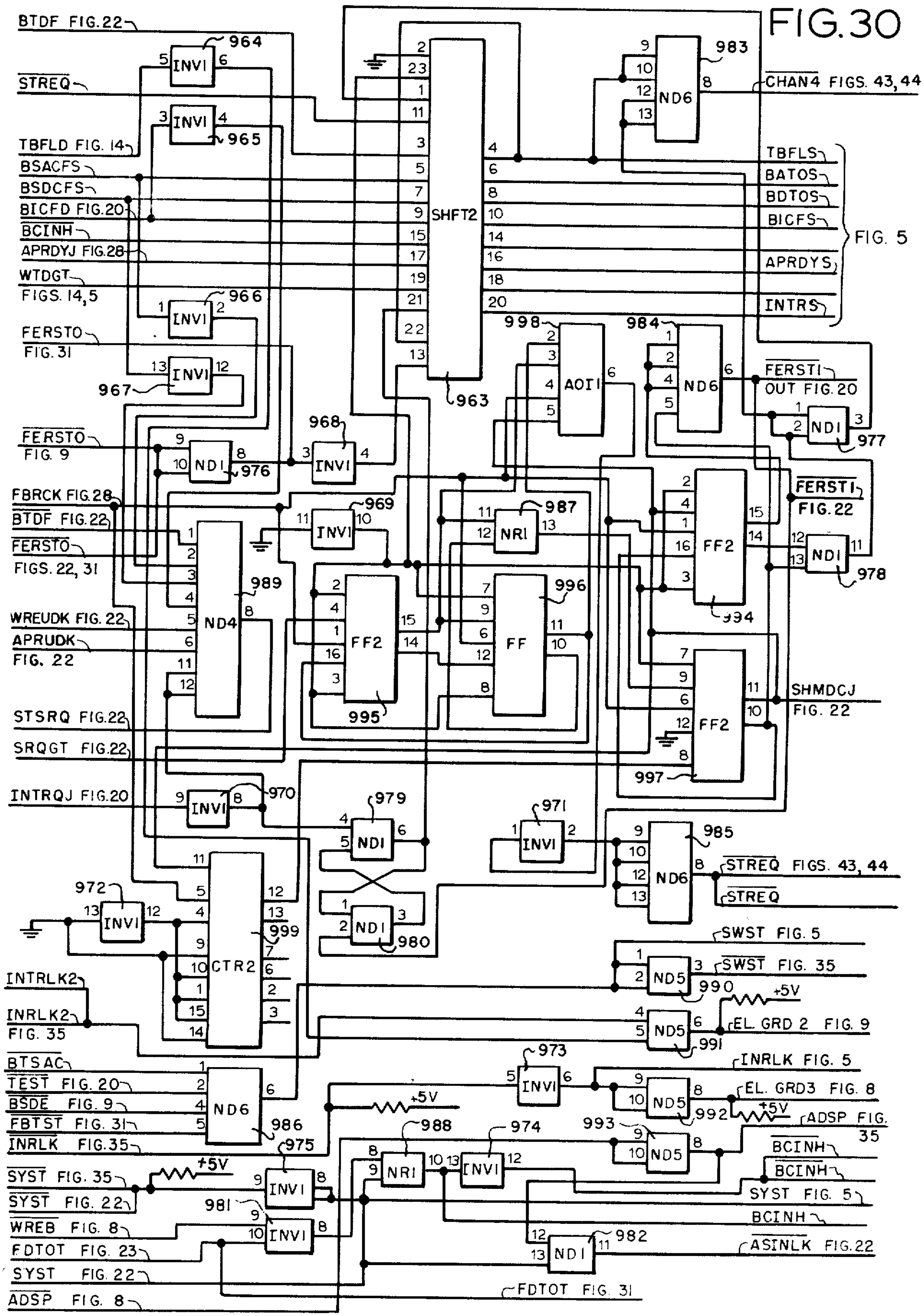
FIG. 30 is a detailed schematic circuit diagram showing the status buffer and a portion of the interlocking and system transfer control of FIG. 2.

FIG. 30 is a detailed schematic circuit diagram showing the status buffer and a portion of the interlocking and system transfer control of FIG. 2. It comprises 74198 8-BIT SHIFT REGISTER 963, 7404 HEX INVERTER 964–975, 7400 QUAD 2-NAND gate 976–982, 7440 DUAL 4-NAND BUFFER gates 983–986, 7402 QUAD 2-NOR gates 987 and 988, 7430 8-NAND gate 989, 7438 open collector QUAD 2-NAND BUFFER gates 990-993, 7476 DUAL JK FLIP-FLOPS 994–997, 7451 DUAL 2×2 AND/OR/INVERT gate 998 and 74193 4-BIT UP/DOWN COUNTER 999.

Logic for the status buffer and the central processor interlock is shown on FIG. 30. Flip-flop 750 and 751 of FIG. 22 also form a part of the status buffer logic.

The purpose of the status buffer is to receive fault indications and status changes and to transmit this information on an 8 bit serial data path (channel 4) to the configuration controller to be placed in the system status word. The cycle begins when any one of the erro conditions at the inputs 2 NAND gate 989 goes true (low), generating STSRQ which sets flip-flop 750 when it is clocked by a FBRCK pulse. With flip-flop 750 set and flip-flop 751 reset. SRQGT is provided via NOR gate 764. Since flip-flop 751 sets on the next FBRCK, SRQGT is present for only 100 nanoseconds. The same clock pulse that removes SRQGT sets flip-flop 995. When flip-flop 996 sets on the next FBRCK, the A1 and B1 inputs of and/or/invert gate 998 are enabled producing a 100 nanosecond clock pulse, $\overline{STREQ}$, to shift register 963. When flip-flop 995 resets on the next $\overline{FBRCK}$, it causes a transition from low to high on $\overline{STREQ}$, allowing the shift register to be loaded with the data present on input leads. This load pulse is also sent to the configuration controller to indicate the beginning of a data transmission. With flip-flop 995 reset and flip-flop 996 still set, NOR gate 987 places a high on the J input of flip-flop 997. This flip-flop sets on the next FDRCK, at the same time that flip-flop 996 resets. The $\overline{Q}$ output of flip-flop 997 is used, via NAND gates 978 and 977 to place shift register 963 in the shift up mode and to enable NAND gate 983. The Q output along with FBRCK pulses, generates 850 nanosecond clock pulses, $\overline{STREQ}$ to shift the data out of the shift register 953 and into the configuration controller status buffer shift register. When flip-flop 997 sets, the LOAD signal is removed from counter 999 and it counts up from 7-F. At each $\overline{STREQ}$ pulse, a bit of data is shifted out on $\overline{CHAN4}$ after being inverted by NAND gate 983. When counter 999 reaches a count of F, the carry output clears flip-flop 997, preventing any further clock pulses and setting the counter to the LOAD mode. With flip-flop 997 reset, NAND gate 984 has all high inputs since flip-flop 994 was set on the FBRCK after flip-flop 997 was set. The output of NAND gate 984, $\overline{FERST1}$, resets all error flags, including the one that began the status buffer cycle. Thus, the STSRQ signal is removed and the cycle is ended.

The interlock control circuitry at the bottom of FIG. 30 insures that the central processor test panel of the on line system is inoperative and that an auto stop can be performed on the on line system. The auto stop function is controlled by $\overline{INRLK}$ from the circuit of FIG. 35. If no critical switch is on the off line test panel are operated, $\overline{INRLK}$ for the on line system is true. Since $\overline{SYST}$ is low for the on line system, the inverted $\overline{ADSP}$ and $\overline{SYST}$ signals via NAND gate 82 generate $\overline{ASINLK}$ which inhibits the reset request, TRFRQ, (FIG. 22). The $\overline{TBFLD}$ and the INRLK2 signals control the ELGRD2 output to the test panel. if INRLK2 is false or the time base fails, NAND gate 991 will have a high output and ELGRD2 will be inhibited. In the case of a time base failure, the TBFLD signal is generated after the system has been reset for 12 miliseconds. With ELGRD2 inhibited, the $\overline{SYRST}$ and SYRST commands are removed (FIGS. 8 and 9), allowing the flip-flop associated with the reset halt and the bus control unit reset switches to be reset, removing the time base error.

When ELGRD2 is inhibited by INRLK being false, the following test panel switches shown on FIGS. 8 and 9 are disabled: Reset halt, stop, ACCEXAM, TRNF (1 and 2), WTDG disable, BSQD disable, ERR reset, BCU reset, TEST, LOAD FDR, and FDR Test enable. Since INRLK2 is not normally true for the on line system, the test panel of the on line system is disabled unless the manual on line switch is operated. The switch status lamp (SWST) will be lite if NAND gate 986 has a low input due to any of the following switches being operated: STOP, reset halt, auto stop, TEST, BSQD disable, and FBR test enable. If the off line system attempts to write onto the bus, the BCINH signal comes true inhibiting this data out cycle. With the write enable switch operated, $\overline{WREB}$ is high. Since FDTOT is present and $\overline{SYST}$ for the off line system is high, both inputs to NOR gate 988 are low generating $\overline{BCINH}$. If the write enable switch is operated, a low on $\overline{WREB}$ forces the output of NAND gate 981 to go high and thus the output of NOR gate 988 goes low removing BCINH so the BCU can access the bus. When the FDTOT command is not present, the BCINH signal is not present. The on line system is always able to access the bus. The BCINH signal cannot be present because the output of NOR gate 988 must be low since $\overline{SYST}$ for the on line system is low.

FIG. 31 is a detailed schematic circuit diagram showing the status buffer of FIG. 2 and the fault buffer test logic associated with the test panel circuits of FIGS. 5–13. It comprises 7404 HEX INVERTER 1000–1010, 7400 QUAD 2-NAND gates 1011–1020, 7402 QUAD 2-NOR gates 1021–1023, 7438 open collector QUAD 2-NAND BUFFER gates 1024–1026, 7420 DUAL 4-NAND gates 1027, 7451 DUAL 2×2 AND/OR/INVERT gate 1028, 74123 DUAL RETRIGGERABLE MONOSTABLES 129 and 130, 74155 1/8 or DUAL 1/4 DECODER 1031, and 7476 DUAL JK FLIP FLOPS 1032–1035.

The upper half of this figure illustrates the logic of the fault buffer prestart cycle which begins when the status buffer receives a fault indication. To obtain the program address at which the fault occurred, the configuration controller requires the bus address register contents before they are changed by the upcoming bus cycle. Therefore, the contents of the system fault accumulator location FFF10 must be obtained before the BADTR signal is set from the bus control unit. When a fault indication is received by the status buffer, a $\overline{STREQ}$ pulse is sent to the configuration controller to indicate the beginning of the data transfer action. The configuration controller returns a $\overline{CMREQ}$ signal. The permanent grouond on $\overline{CHAN5}$ and the $\overline{CMREQ}$ signals are combined to set the latch comprising NAND gates 1014 and 1015. At the beginning of each bus cycle when the PAUSE flip-flop within the bus control unit sets, a pulse appears at the J input of flip-flop 1032 and is inverted by inverter 1004. Before flip-flop 1032 sets, the output of NOR gate 1023 goes high. The 100 nanosecond pulse produced samples the state of the latch comprising NAND gates 1014 and 1015. If the latch is set, the inverted output from NAND gate 1016 generates ESHCK and also sets the latch comprising NAND gates 1017 and 1018, generating $\overline{EMROK}$ via and/or/invert gate 1028. ESHCK is used on the circuit of FIG. 22 to produce the shift register loaded pulse and $\overline{ESHCK}$ sets the latch comprising NAND gates 1011 and 1012 generating SDEN1. This signal will also be produced by FDTOT. The $\overline{EMFA3}$ through $\overline{EMAF0}$ leads are strapped to 1011 to select memory field 1 (INMEM) when addressed on circuit of FIG. 21 with the inverted $\overline{EMROK}$ signal. The $\overline{EXAD8}$ through $\overline{EXAD1}$ leads are strapped to ground to select memory address 0 of the system fault accumulator memory when the required bus address register contents are stored. When the data has been loaded into the I/O shift buffer, a signal is sent to the configuration controller on the $\overline{CMREQ}$ line, via NAND gates 1024 and 1025. When flip-flop 1032 sets, the output of NOR gate 1022 goes high until flip-flop 1033 sets on the next FBRCK. The 100 nanoseconds pulse produced resets the latch comprising NAND gate 1017 and 1018 removing $\overline{EMROK}$.

The lower half of the figure provides the fault buffer test logic used to decode the test panels TRNF switches and run a series of systems checks within the central processor. The test routine functions addressed by the TRNF switches (TRNF1 and TRNF2) are defined as follows: 00-test the central processor interrupt mechanism; 01-test the time base failure mechanism; 10 - test the address cycle start control logic; and 11 - test the data cycle start control logic. The buffer test enable switch by being operated ($\overline{FBTST}$) places a low logic level on the 2G2 lead of decoder 1031, enabling the 2Y output lead. One output is selected by the TRNF1 and TRNF2 address leads which defines the test routine functions. The decoder is strobed on its G1 leads when the load FDR switch ($\overline{LDFBR}$) is operated, setting flip-flop 1034.

Figure 32:
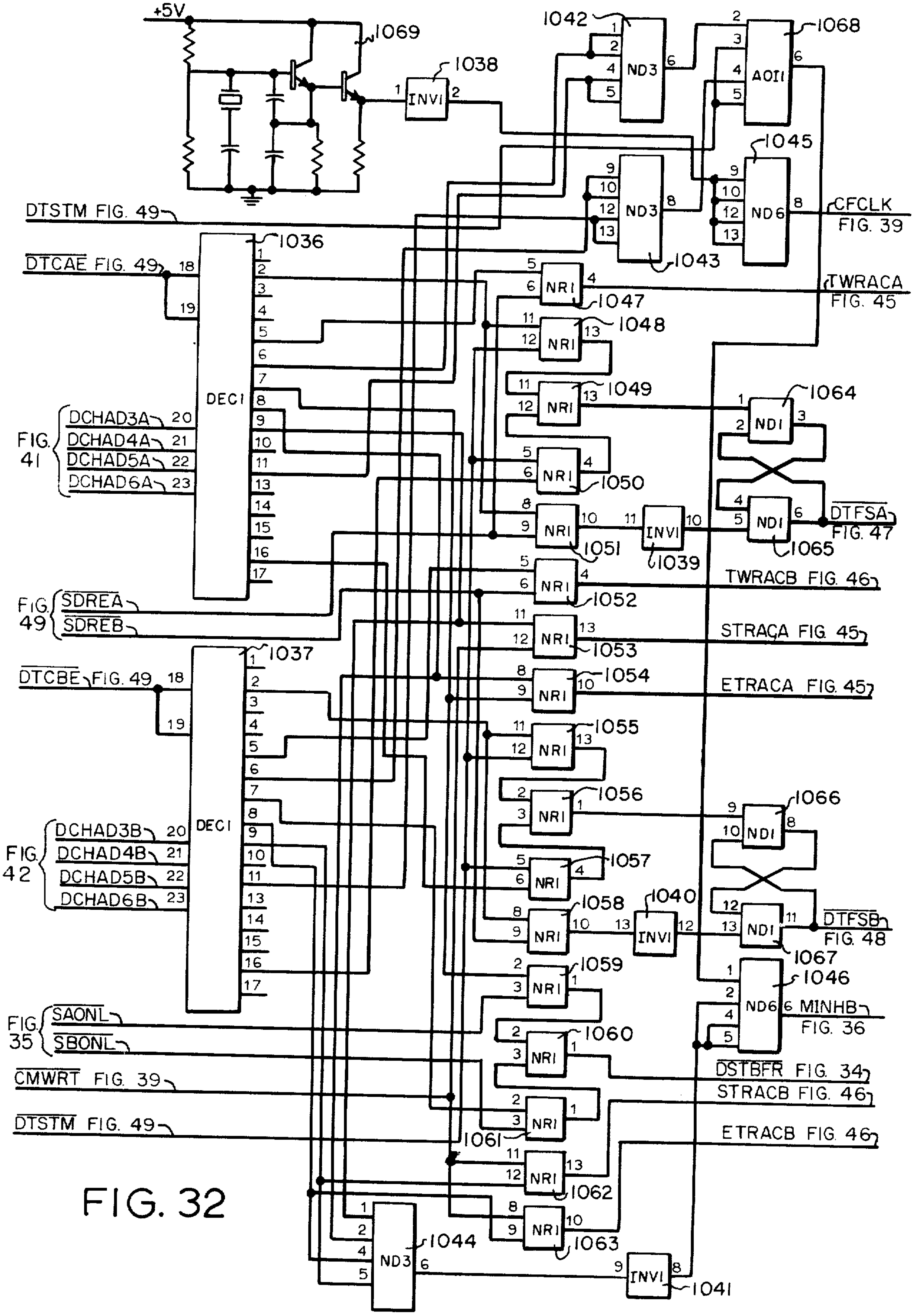
FIG. 32 is a detailed schematic circuit diagram showing the one of 16 decoders and the function decoders of FIG. 3.

Referring now to FIG. 32, there is shown a detailed schematic circuit diagrm of the one of 16 decoders and the function decoders of FIG. 3. It comprises a 10 megahertz clock 1069, 74154 1/16 DECODER 136 and 137, HEX INVERTERS 1038–1041, 7420 DUAL 4-NAND gates 1042–1044, 7440 DUAL 4-NAND BUFFER gates 1045 and 1046, 7402 QUAD 2-NOR gates 1047–1063, 7400 QUAD 2-NAND gates 1064–1067, and 7451 DUAL 2×2 AND/OR/INVERT gate 1068.

The configuration controller uses a discrete circuit 10 megahertz crystal controlled clock 1069. Its output labeled CFCLK at the output of NAND gate 1045 is used to derive other clocks to control the configuration controller timeing.

Both systems of the configuration controller use identical addresses for accessing their own or other stores. The bit 17–20 of system B's address are complemented by hardware. Decoders 1036 and 1037 decode the random access memory addresses from the systems A and B respectively into various control signals before any complementing takes place. These control signals are generated as follows: DTSTBF - data for alarm status buffer is true if data is to be stored in the on line systems address FFF26; $\overline{DTFSA}$ - data for system A is true when data is to be stored in systems A's address FFF21; $\overline{DTFSB}$ - data for system B is true when data is to be stored in system B's address FFF21; ETRACA - ETR acknowledge system A is true every time this system attempts to store data in FFF27; ETRACB - ETR acknowledge system B is true every time this system attempts to store data in FFF27; MINHB - Memory inhibit is true when either system accesses FFF25, FFF27, FFF28, or FFF20, preventing them from writing into these addresses; TWRACA - ETR preset word access system A is true when system A's address FFF24 is accessed; and TWRACB -ETR preset word access system B is true when system B's address FFF24 is accessed.

Figure 33:
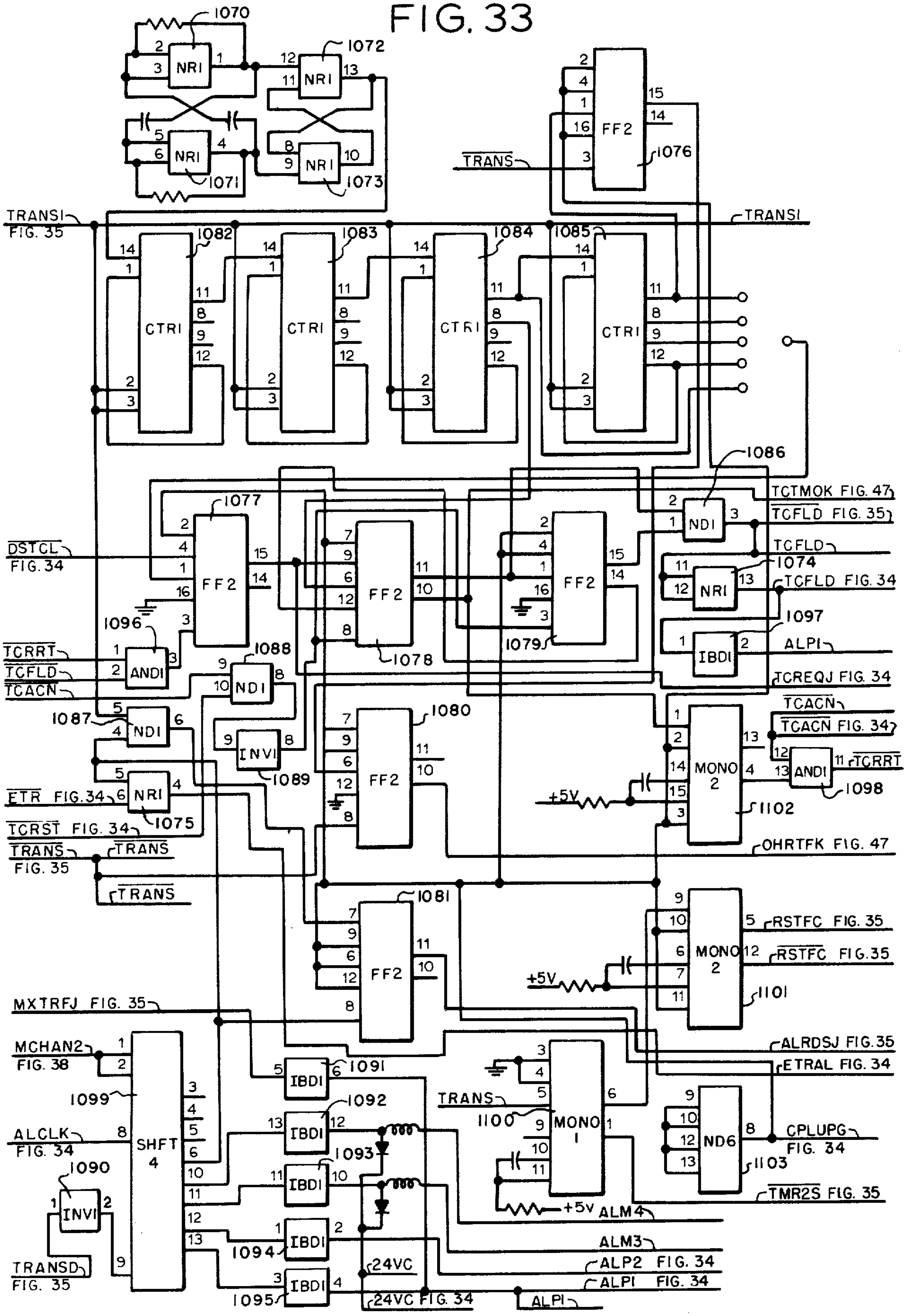
FIG. 33 is a detailed schematic circuit diagram showing the test call logic, the free running one hour clock, the one hour transfer, a portion of the processor alarm and status buffer, and the alarm drivers of FIG. 3.

FIG. 33 is a detailed schematic circuit diagram showing the test call logic, the free running 1 hour clock, the 1 hour transfer, a portion of the processor alarm and status buffer, and the alarm drivers of FIG. 3. It comprises 7402 QUAD 2-NOR gates 1070–1075, 7476 DUAL JK FLIP-FLOPS 1076–1081, 7493 1+3 BIT COUNTERS 1082-1085, 7400 QUAD 2-NAND gates 1086–1088, 7404 HEX INVERTERS 1089 and 1090, 7406 open collector HEX INVERTER BUFFERS 1091–1095, 7408 QUAD 2-AND gates 1096–1098, 74164 8-BIT SHIFT REGISTER 1099, 74121 MONOSTABLE 1100, 74123 DUAL RETRIGGERABLE MONOSTABLES 1101 and 1102, and 7400 DUAL 4-NAND BUFFER gate 1103.

The test call is a dedicated line to line connection initiated on a timed basis to check the office's ability to process calls. The request is generated by a strap timer counter 1085 having the time option of 2, 4, 8, 16 or 32 minutes. When the appropriate Q lead of counter 1085 goes low, it clocks the test call request flip-flop 1077 to the set state which in turn operates the TCR relay in a console, if the disable test call switch has not been operated. This causes the preassigned originating line circuit to call for service. A special program routine will recognize this call for service as the call processor routiner originator and will handle this call on a direct line basis. When the terminating line circuit receives ringing current, it operates realy TCD in the console. This relay provides answer supervision, operating the test call acknowledge (TCA) relay associated with the originating line circuit. This signal returns to the configuration controller via filters 1105 through 1115, 7407 hex buffer 1121, and 7408 quad 2-AND gates 1116–1120 of FIG. 34 to clear flip-flop 1077. The test call is allowed 1 minute for successful completion.

If 1 minute elapses before the test call acknowledge signal is received, flip-flop 1078 is set by the Q 4 output leads of counter 1084. This causes a forced acknowledge condition resetting flip-flop 1077. 1 minute later, counter 1084 resets flip-flop 1078, setting the test call failed flip-flop 1079. When the next test call is generated, the previously explained events will apply. If the call is successful, all of the flip-flops will be cleared. If it is not, flip-flop 1078 will be set, producing TCFLD via NAND gate 1086. This will initiate a system transfer. Therefore, this portion of the configuration controller, counts the number of consecutive failures by the system to complete the test call in order to cause the transfers.

During normal operation, a system transfer takes place every hour. Flip-flop 1076 is used as a frequency divider that clocks flip-flop 1080 after 1 hour has elapsed. Flip-flop 1080 set raises the 1 hour transfer flag in the system status word. The actual system transfer is caused when the software recognizes this fact by simply failing to acknowledge the next extended test routine. Any alarms associated with the extended test routine are inhibited during the 1 hour transfer.

The processor alarm status word bits 9–16 (FFF26) is stored in shift register 1099 as well as the random access memory to allow the appropriate alarm lamp to be lite. When bit 13 of FFF26 is set, it allows flip-flop 1081 to be set during the 1 hour transfer clearing 5th register 1099 via monostable 1101 if the software is unable to update the processor alarm status word after the transfer. Bits 1–8 of FFF26 are stored in shift register 122 of FIG. 34. Monostable 1100 is a 2 second timer used by the multiple transfer decoder on FIg. 35. Monostable 1101 resets the system transfer counter in this circuit after two seconds have elapsed.

Figure 34:
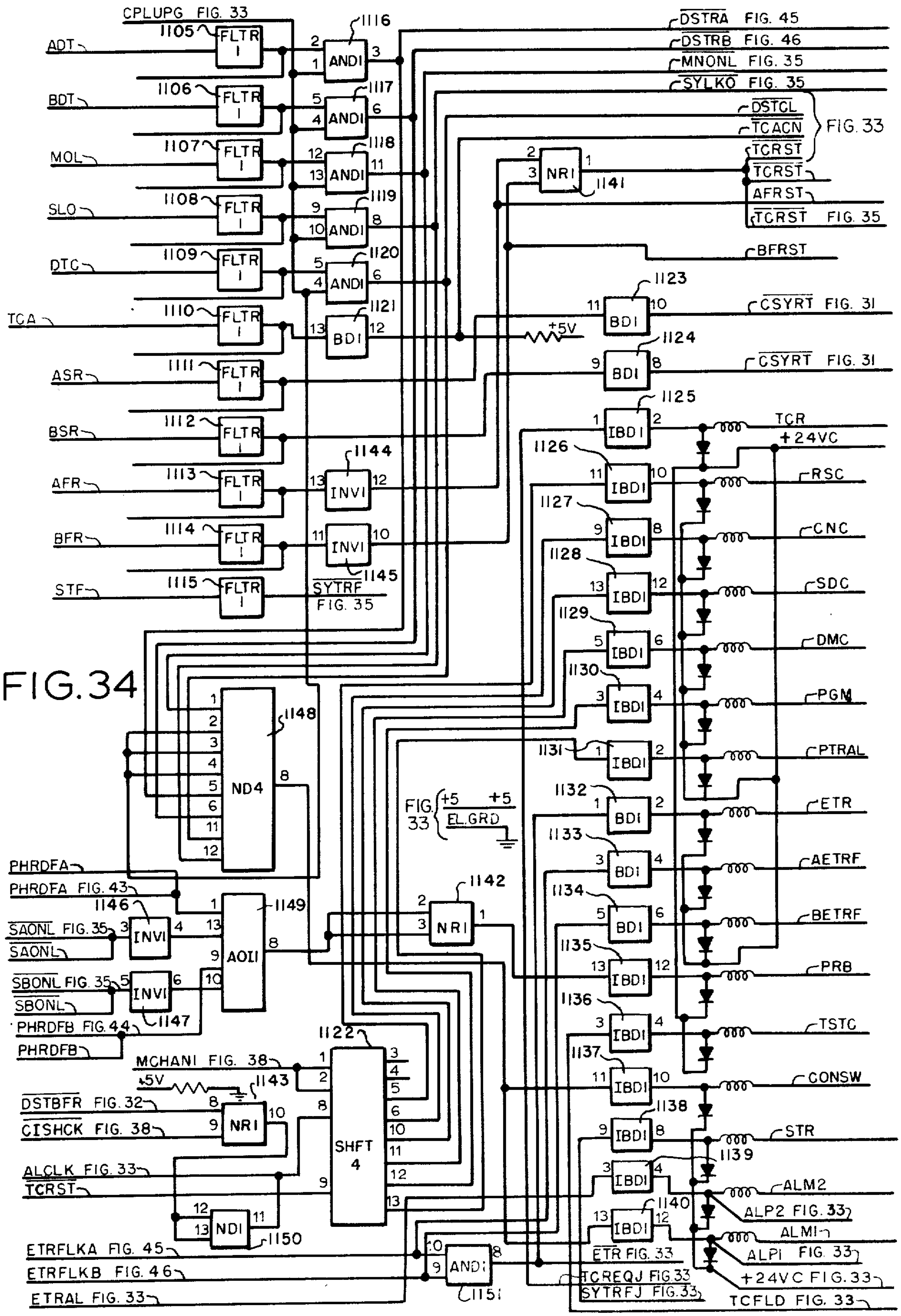
FIG. 34 is a detailed schematic circuit diagram showing the lamp drivers, the status portion of the process alarm and status buffer and the switch filters of FIG. 3.

FIG. 34 is a detailed schematic circuit diagram showing the lamp drivers, the status portion of the process alarm and status buffer and the switch filters of FIG. 3. It comprises filters 1105–1115, 7408 QUAD 2-AND gates 1116–1120, 7407 HEX BUFFER 1121, 74164 8-BIT SHIFT REGISTER 1122, 7406 open collector HEX INVERTER BUFFERS 1125, 1126, 1127, 1128, 1129, 1130, 1131, 1135, 1136, 1137, 1138, 1139, 1140, 7407 HEX BUFFERS 1123, 1124, 1132, 1133, 1134. 7402 QUAD 2-NOR gates 1141–1143, 7404 HEX INVERTERS 1144–1147, 7430 8-NAND gate 1148, 7451 DUAL 2×2 AND/OR/INVERT gate 1149, 7400 QUAD 2-NAND gate 1150, and 7404 QUAD 2-AND gate 1151.

Filters 1105–1115 interface the 50 volts from the console switches with the logic levels. Buffers 1126 to 1137 interface the TTL levels with 1A correeds which operate various lamps on the console. NAND gate 1148 allows the console switch alarm to be lite when any of the switches connected to filter 1109 to filter 1105 are operated. The processor alarm status word bits 1–8 (FFF26) is stored in shift register 1122 as well as the random access memory to allow the appropriate alarm lamps to be lite. Shift register 1122 can only be manually cleared by the system A or system B fault reset switches. If the PHRDF latch of the on line system is set, and/or/invert gate 1149 allows the central processor bus subsystem alarm to be lit.

Figure 35:
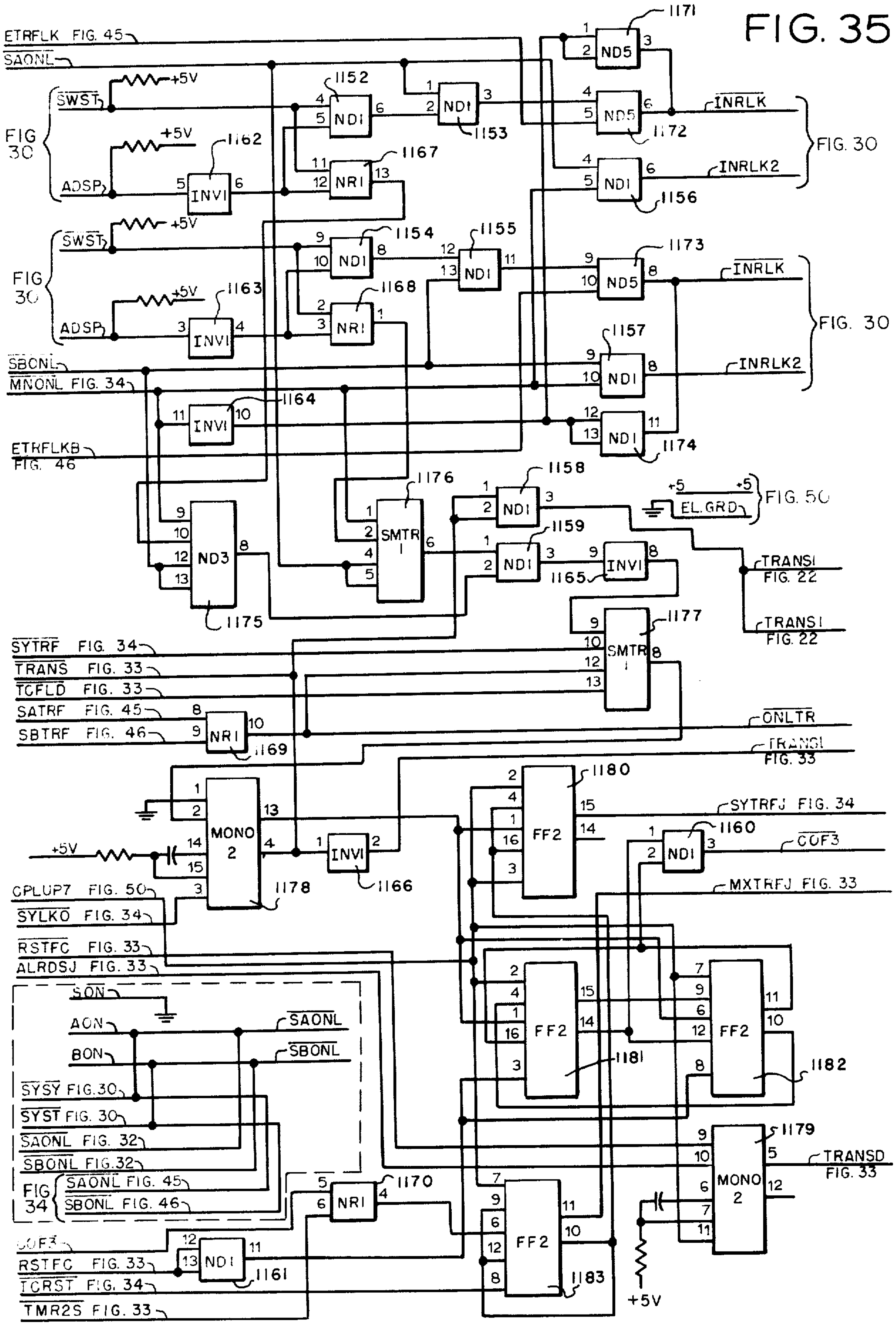
FIG. 35 is a detailed schematic circuit diagram showing the interlock control, transfer control and the multi-transfer detector of FIG. 3.

FIG. 35 is a detailed schematic circuit diagram showing the interlock control, transfer control and the multitransfer detector of FIG. 3. It comprises 7400 QUAD 2-NAND gates 1152 through 1161, 7404 HEX INVERTERS 1162–1166, 7402 QUAD 2-NOR gates 1167–1170, 7438 open collector QUAD 2-NAND BUFFER gates 1171–1174, 7420 DUAL 4-NAND gate 1175, 7413 DUAL 4-NAND SCHMITT TRIGGERS 1176 ad 1177, 74123 DUAL RETRIGGERABLE MONOSTABLES 1178 and 1179, and 7476 DUAL JK FLIP-FLOPS 1180–1183.

There are critical switches located on the central processor test panel which could cause fail conditions when operated. These switches are: reset halt; stop; ACC EXAM; TRNF1 and TRNF2; WTDG disable; BSDQ disable; ERR reset; BCU reset; test; LOAD FDR; and FDR test enable. To prevent these switches from interfering with the normal office service, an interlock control circuit disables the above switches on the test panel on the line system, but allows the autostop function to force a system transfer, provided the off line system has not failed or has not been stopped. IF $\overline{\text{INRLK}}$ of the on line system is false, it removes electronic ground disabling the autostop switch. This signal will be true if the off line system is operable, the manual on line switch is operated or the on line system transfers off line. INRLK2 of the on line system is normally false, removing electronic ground 2 disabling the switches listed above. A time base fail delay signal can also disable this electronic ground. INRLK2 will be true if the manual on line switch is operated but a system is off line.

When the on line systems autostop switch is operated, $\overline{\text{SWST}}$ will go through when the processor is stopped by a match between the bus address register and the address select switches. Both ADST and $\overline{\text{SWST}}$ being true it will initiate a system transfer. If the test call fails, the on line system is autostopped or fails its extended test routine, or if the system transfer switch is operated, monostable 1178 will provide a signal for clocking flip-flop 1180, the multitransfer counter flip-flop 1182 and 1183 and the 2 second timer monostable 1100 of FIG. 33. Flip-flop 1180 by being set operates the system transfer relays via IBD1-17, placing system B on line. Provided flip-flop 1183 remains reset, flip-flop 1180 will toggle each time monostable 1178 provides its signal, initiating its signal, initiating a system transfer. If there are 3 system transfers within a predetermined time of 2 seconds, $\overline{\text{COF3}}$ will go through, setting flip-flop 1183 when monostable 1100 resets ($\overline{\text{TMR2S}}$) (goes false), inhibiting any further transfers. After 2 seconds have elapsed, RFTFC will clear the multitransfer counter flip-flop 1182 and 1183 if fewer than three transfers have taken place. Monostable 1179 will fire 2 seconds after a 1 hour transfer, clearing shift register 1122 of FIG. 34 if the software is unable to update the processor alarm status word after the transfer.

Figure 36:
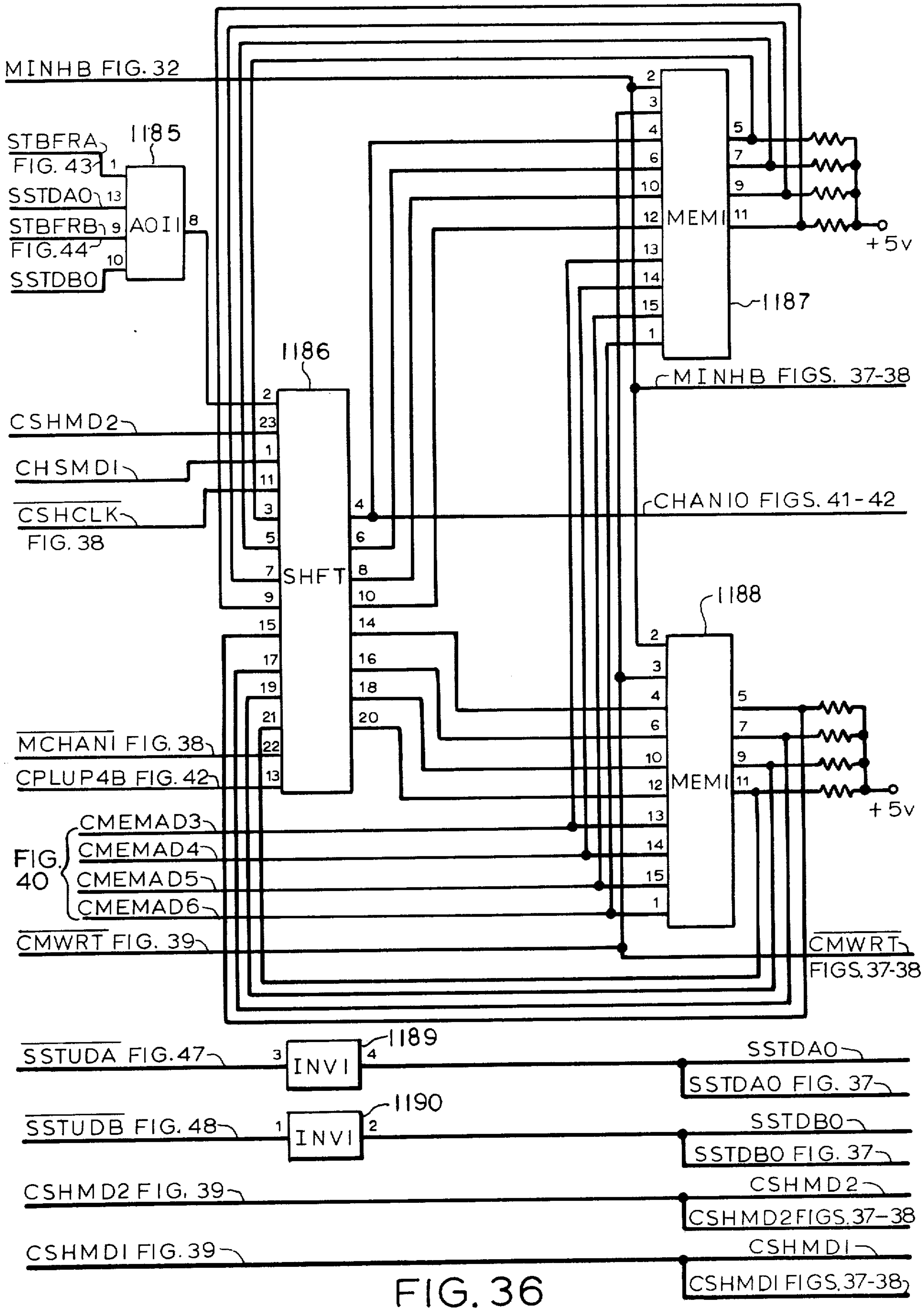
FIG. 36 is a detailed schematic circuit diagram showing the 20 bit random access memory and memory input output buffer for bits 1–8.
Figure 37:
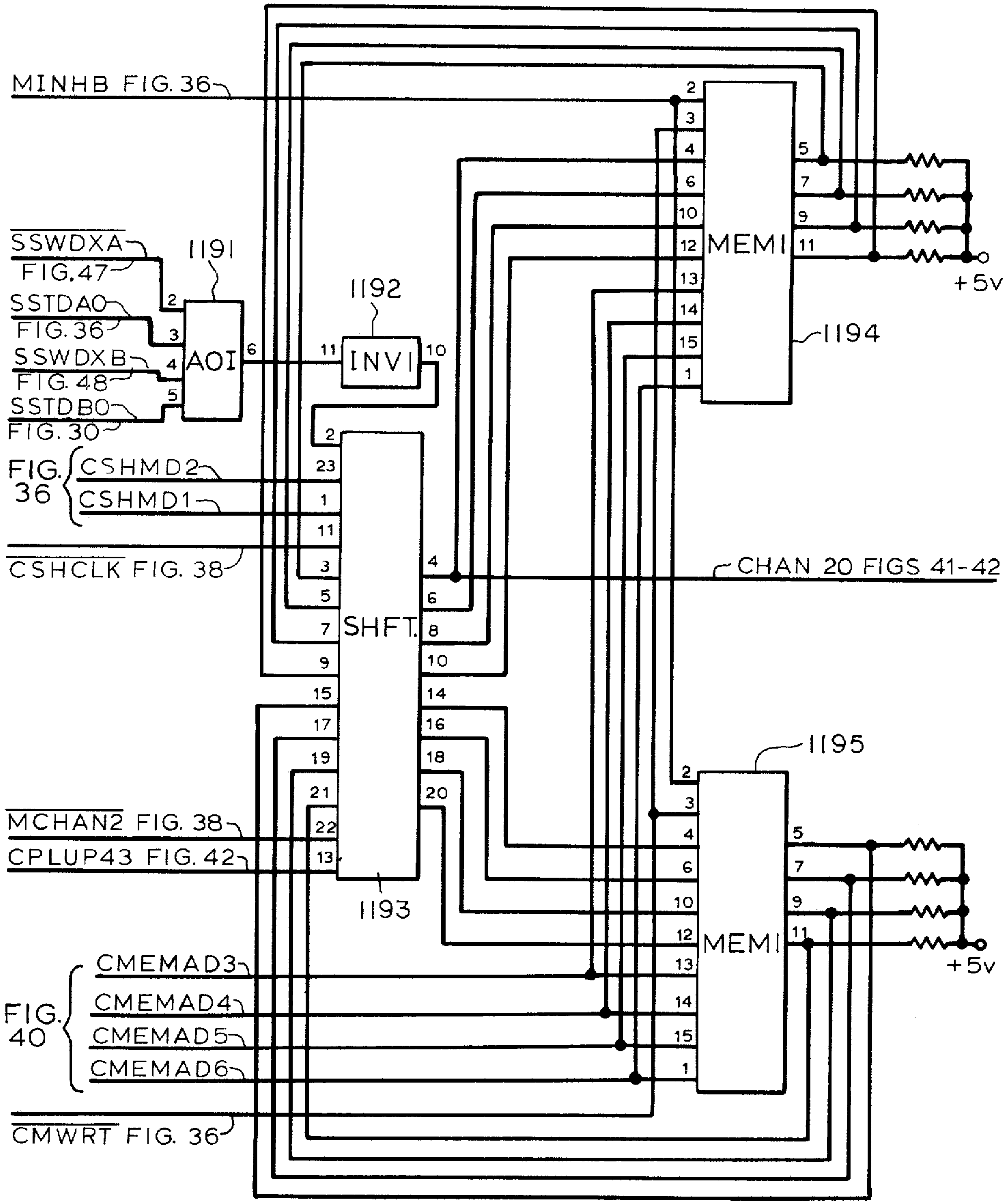
FIG. 37 is a detailed schematic circuit diagram showing the 20 bit random access memory and the memory input output buffer for bits 9–16.
Figure 38:
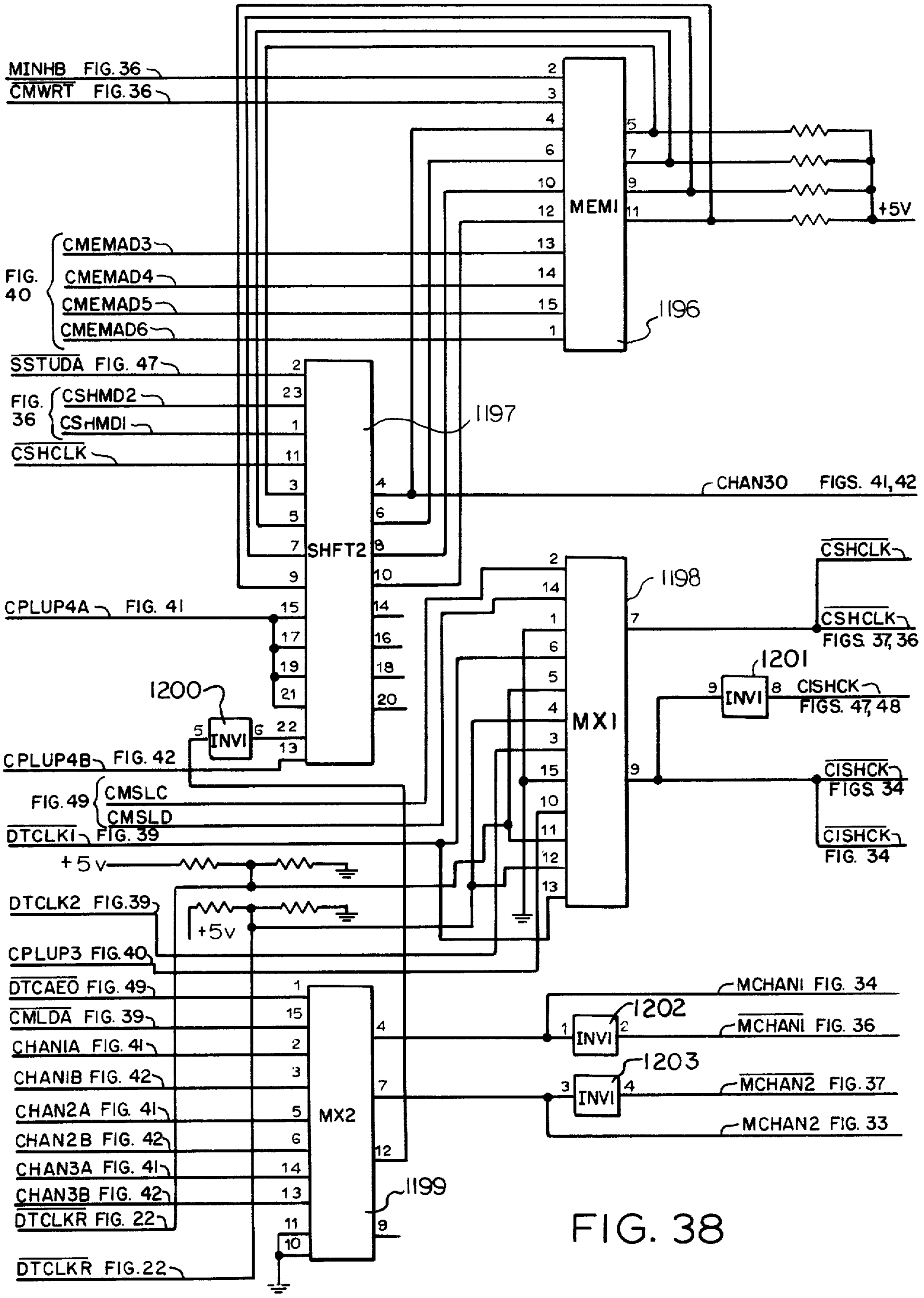
FIG. 38 is a detailed schematic circuit diagram showing the 20 bit random access memory and the memory input output buffer for bits 17–20 and the 2-1 data multiplexer of FIG. 3.
Figure 40:
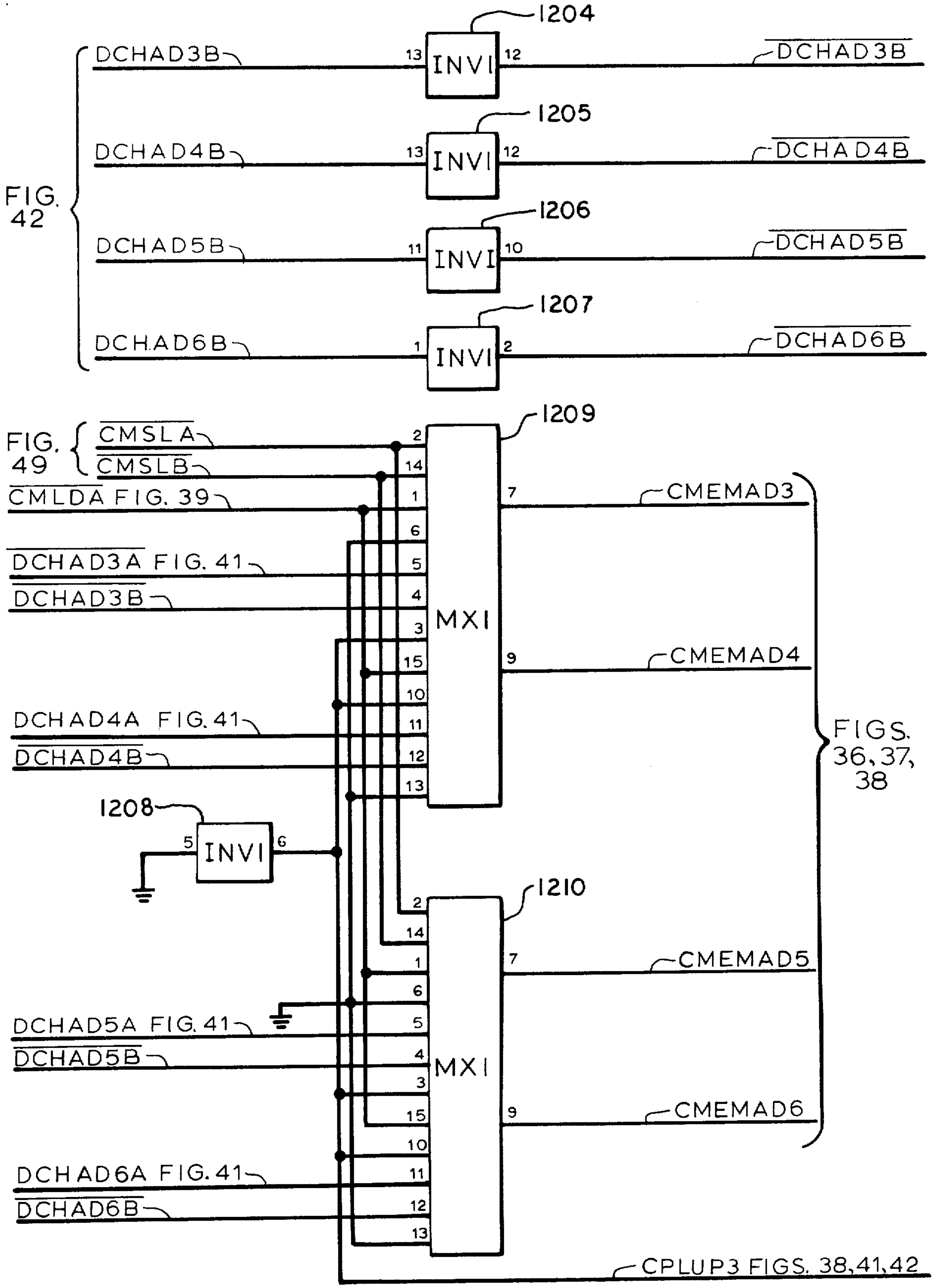
FIG. 40 is a detailed schematic circuit diagram showing the 4-1 address multiplexer and inverter of FIG. 3.

Referring now to FIGS. 36–38, and FIG. 40, FIG. 36 is a detailed schematic circuit diagram showing the 20 bit random access memory and memory input output buffer for bits 1–8. FIG. 37 is a detailed schematic circuit diagram showing the 20 bit random access memory and the memory input output buffer for bits 9–16. FIG. 38 is a detailed schematic circuit diagram showing the 20 bit random access memory and the memory input output buffer for bits 17–20 and the 2-1 data multiplexer of FIG. 3. Lastly, FIG. 40 is a detailed schematic circuit diagram showing the 4-1 address multiplexer and inverter of FIG. 3.

The circuit of FIG. 36 comprises 7451 dual 2×2 and/or/invert gate 1185, 74198 8-bit shift register 1186, 7489 16×4 random access memories 1187 and 1188, and 7404 hex inverters 1189 and 1190. The circuit of FIG. 37 comprises 7451 DUAL 2×2 AND/OR/INVERT gate 1191, 7404 HEX INVERTER 1192, 74198 8-BIT SHIFT REGISTERS 1193, and 7489 16×4 random access memories 1194 and 1195. The circuit of FIG. 38 comprises 7489 16×4 random access memory 1196, 74198 8-BIT SHIFT REGISTER 1197, 74153 DUAL 4 - 1 multiplexer 1198, 74157 QUAD 2 - 1 multiplexer 1199, and 7404 HEX INVERTERS 1200–1203. The circuit of FIG. 40 comprises 7404 HEX INVERTERS 1204–1208 and 74153 DUAL 4 - 1 multiplexers 1209 and 1210.

The configuration controller contains a 20 bit 16 word random access memory addressable by both systems using identical addresses but not identical locations. Complementing the last digit of the address accomplishes this. System B uses the address complement while system A uses the address directly. This allows both systems to use the same software and yet access different random access memory locations. Note that decoders 1036 and 1037 of FIG. 32 decode the address directly from both systems and not the complement. Refer to table 6 below for the layout of the configuration controller memory. "Own" refers to the addresses assigned to a system's own stores. "Other" refers to the addresses accessed by a s system monitoring the other system's activities.

Table 6

CFC Memory Layout

| | | |
|---|---|---|
| FFF20 | Error Address Register | own |
| FFF21 | Interprocessor Com Control Register | own |
| FFF22 | Interprocessor Com Register 1 | own |
| FFF23 | Interprocessor Com Register 2 | own |
| FFF24 | ETR Preset Word | own |

Table 6-Continued

| CFC Memory Layout | | |
|---|---|---|
| FFF25 | System Status Word | own |
| FFF26 | Processor Alarm Status Register | own |
| FFF27 | ETR Acknowledge Register | both |
| FFF28 | not used | |
| FFF29 | Processor Alarm Status Register | other |
| FFF2Θ | System Status Word | other |
| FFF2B | ETR Preset Word | other |
| FFF2C | Interprocessor Com Register 2 | other |
| FFF2D | Interprocessor Com Register 1 | other |
| FFF2E | Interprocessor Com Control Register | other |
| FFF2F | Error Address Register | other |

The error address stores are accessed by addresses FFF20 and FFF2f. Whenever a status change or error condition occurs, the fault buffer will send the contents of the system fault accumulator 0 to the configuration controller. System fault accumulator location 0 contains the current contents of the bus address register at all times. Therefore, when an error occurs, the address being accessed will be stored in error address register FFF20 or FFF2F, depending on "own" or "Other" system access.

The interprocessor processor communication control register (IPCCR) is a read/write store with the ability to set the data for system (DTFS) bits in the system status word. Conditions a), b), e) and f) will be encountered during normal processing while conditions c), d), g) and h) are primarily for back to back testing. The following conditions are possible:

a. If system A stores into the "Other" IPCCR, data for system bit is set and B system's system status word.

If system B loads from its "Own" IPCCR, data for system bit is reset in B system's status word.

c. If system A stores into its "Own"]IPCCR, data for system bit is set in A system's system status word.

d. If system A loads from its "Own" IPCCR, data for system bit is reset in A systems system status word.

e. If system B stores into the "Other" IPCCR, data for system bit is set in A system's system status word.

f. If system A loads from its "Own" IPCCR, data for system bit is reset in A system's system status word.

g. If system B stores into its "Own" IPCCR, data for system bit is set in B system's system status word.

h. If system B loads from its "Own" IPCCR, data for system bit is reset in B system's system status word.

The inner processor communication registers (IPCR) are addressed FFF22, FFF23, FFF2D and FFF2C, with the first two addresses assigned as "Own" register No. 1 with register No. 2 and the last two addresses assigned as "Other" register No. 1 and register No. 2 respectively. These registers can be used by software to transfer information from one processor to the other. The contents of the transfer register is the only information to be directed via the IPCR. During a transfer, the contents of the transfer register of the system going off line is routed via the IPCR to the system going on line to become part of the transfer print out.

The extended test routine (TR) preset word makes use of store FFF24 and FFF2B for "Own" and "Other" assignment respectively. The prime purpose of the ETR preset word is to condition a latch to allow the ETR acknowledge (ETR successful) signal to clear the ETR request when this register is accessed. Either system may access the "Other" ETR preset word, without affecting the ETR preset store content. Therefore, it is possible to transfer information between systems using the ETR preset word. If a system accesses its "Own" ETR preset word using a data in cycle (LOAD), that systems ETR preset word flip-flop will be primed to allow the acceptance of the ETR acknowledge signal. The information contained in the ETR preset word may or may not be used by the software.

Each system requires a system status word identified as FFF25 and FFF20 for "Own" and "Other" respectively. The system status word is a read only store which defines the status of the system by communicating error conditions. Under normal conditions (no failures) bits 1–16 of the on line status word will be XXX00000XX0X0XX 1 while bits 1–16 of the off line status word will be XXX10000XX0X0XX0. X means that that bit may be set. Refer to FIG. 4 for the contents of the status word.

Each system has a processor alarm status register identified as FFF26 and FFF29 for "Own" and "Other" respectively. However, only the on line system's alarm status register can access the alarm status buffer which lights the console alarm lamp and extends alarm conditions to the office alarm sender. If system A is on line and has written an alarm condition onto its own processor alarm (FFF26) status register, this alarm condition will automatically be written into the processor alarm status buffer. System B can access system A's register by referring to it as "Other." It is also possible for a system write into the other status register. However, this will not change the status buffer until the on line system actually reads and then rewrites its own status register.

The ETR acknowledge register is a write only location which must be accessed by software within a preset time period for the extended test routine to be considered successful. The address of this register is FFF27 and it is shared by both systems (not treated on an "Own" or "Other" basis). The information that is stored is irrelevant.

Memories 1187, 1188, 1194, 1195 and 1196 comprise bits 1–4, 5–8, 9–12, 13–16 and 17–20 of the configuration control memory respectively. Since these memories invert stored data information from the fault buffer is written into the memory in true low form (data not). Inverting data channel receivers NOR gates 1250–1252 of FIG. 41 or NAND gates 1280–1286 of FIG. 42 invert data back to data not for the appropriate 20 bit channel during a memory read.

The memory input output buffer (MIOB) interfaces the serial data transmissions required on the 20 bit channels of the fault buffers with the random access memories and is comprised shift registers 1186, 1193 and 1197. During CTS0, 1 busy, the MIOB is placed in the shift down load by CSHMD1, 2. The configuration controller time slots CTS0, 1 etc. are discussed in detail later. Bits 1–8 of the system status word of system A or B is shifted into shift register 1186 via and/or/invert gate 1185 while bits 9–16 are shifted into shift register 1193 and/or/invert gate 1191 $\overline{\text{SSTUDA}}$ staying true during CTSO effectively writes a (F) in bits 17–20 of system A status word (data not format) via shift register 1197. The reverse is true during CTS1. The MIOB is clocked by $\overline{\text{CSHCLK}}$ (8 pulses 50 nanoseconds wide) during CTSO and CTS1. If any of the other configuration controller time slots are busy, MIOB will be placed in shift up mode by CSHMD1,2. However, during CTF2 or 3 busy, $\overline{\text{CSHCLK}}$ will have 9, 50 nanosecond pulses. During these time slots, a fault buffer is requesting data from the configuration controller memory. While the address is presented to the configuration controller memory, CSHMD1 and CSHMD2 place the MIOB in parallel load mode during the first CSHCLK, loading the contents of the memory into the MIOB. Then CSHMD1 goes false for 800 nanoseconds, placing the MIOB in the shift up mode, allowing the remaining 8 CSHCLK pulses to shift the data out to the appropriate fault buffer via the data channel driver.

Figure 39:
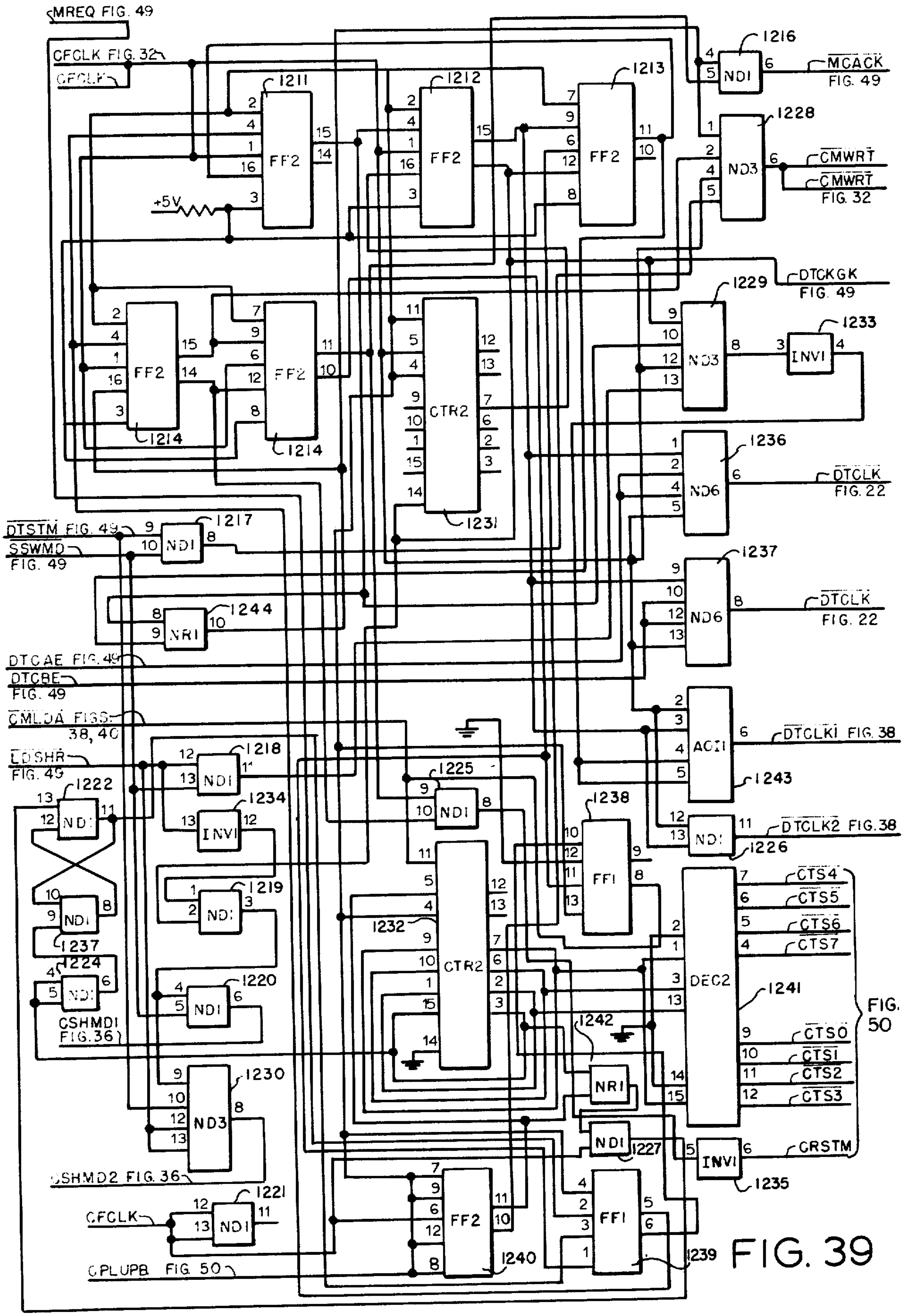
FIG. 39 is a detailed schematic circuit diagram showing the one of 8 decoder, the four bit binary counter, and the memory request logic of FIG. 3.

If CTS4, 5, 6 or 7 are busy, serial data from the appropriate fault buffer is selected by multiplexer 1199 and fed to the MIOB. The MIOB is still placed in the shift up mode but multiplexer 1198 selects DTCLKR from the appropriate fault buffer for generating CSHCLK. DTCLK is generated on the circuit of FIG. 39 is used to shift the data from the fault buffer's input output buffer to the MIOB. Then the fault buffer returns this clock as DTCLK to prevent loss of data due to propagation delay time. CMSLC and CMSLD generated on the circuit of FIG. 49 determines which clocks are used by multiplexer 1198 to generate CSHCLK and CISHCK. When CTS0 or CTS1 are busy, multiplexer 1198 selects DTCLK2, DTCLK1 to generate CSHCLK and CISHCK respectively. If CTS2 or CTS3 are busy, DTCLK1 generates CSHCLK while CISHCK remains false. If CTS4, 5, 6 or 7 are busy, the appropriate DTCLKR is used to generate both CSHCLK and CISHCK. CMLDA generated on the circuit of FIG. 39 strobes multiplexer 1199 while DTCAEO generated on the circuit of FIG. 49 determines which fault buffer is sending data to the configuration controller memory via multiplexer 1199.

Inverters 1204 through 1207 are used to complement the last digit of the address sent from system B's fault buffer. This is to facilitate the addressing arrangement discussed previously. If CMSLA and CMSLB are both true, multiplexers 1199 and 1210 automatically send a last digit of address FFF25 to the configuration controller memory to update system A's systems status word during CTSO. If these signals are both false, multiplexers 1209 and 1210 automatically send the last digit of address FFF20 to update system B's system status word during CTS1. If only CMSLA or CMSLB is true, the last digit of an address sent for systems A or B fault buffer and stored in the counters of FIG. 39 will be sent to the configuration control memory.

Figure 49:
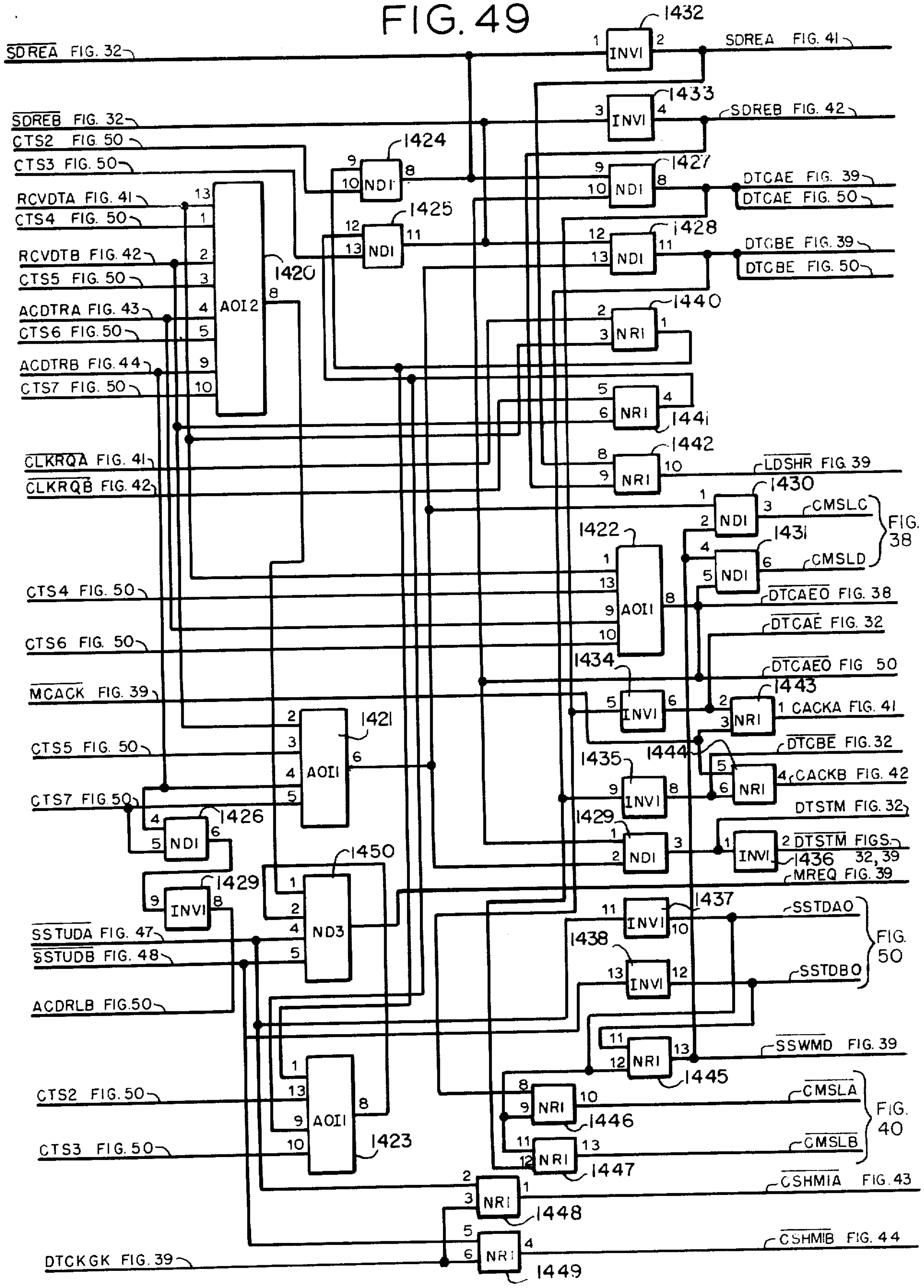
FIGS. 49 and 50 are detailed schematic circuit diagrams showing the request auction control of FIG. 3.
Figure 50:
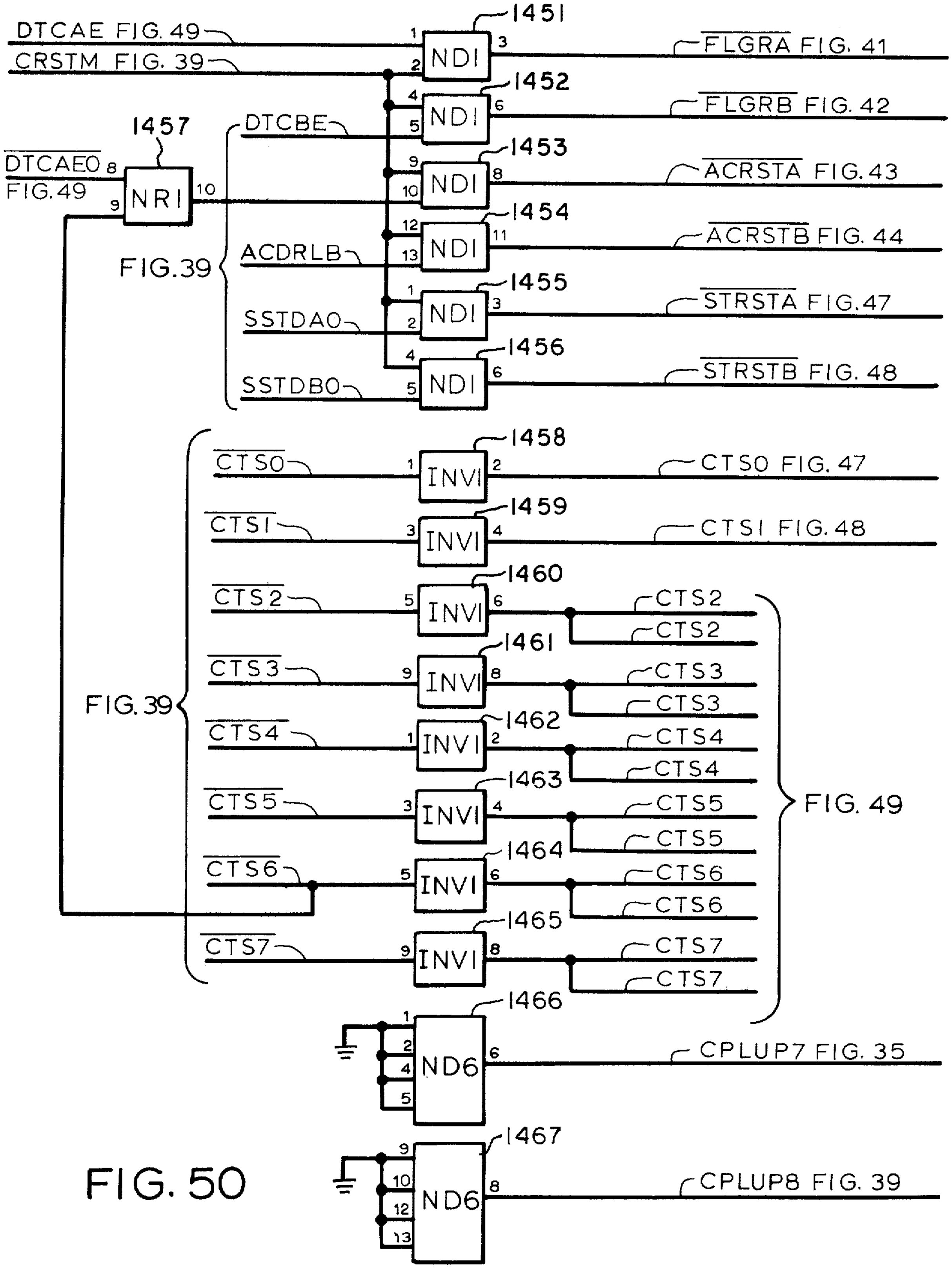

Referring now to FIGS. 39, 49 and 50. FIG. 39 is a detailed schematic circuit diagram showing the 1–8 decoder, the 4 bit binary counter and the memory request logic of FIG. 3 and FIGS. 49 and 50 are detailed schematic circuit diagrams snowing the request auction control of FIG. 3.

The circuit of FIG. 39 comprises 7476 DUAL JK FLIP-FLOPS 1211–1215, 7400 QUAD 2-NAND gates 1216–1227, 7420 DUAL 4-NAND gates 1228–1230, 74193 4 BIT UP/DOWN COUNTERS 1231 and 1232, 7404 HEX INVERTERS 1233–1235, 7440 DUAL 4-NAND BUFFER gates 1236 and 1237, 7474 DUAL D FLIP-FLOPS 1238 and 1239, 7476 DUAL JK FLIP-FLOP 1240, 74155 1/8 or DUAL 1/4 DECODER 1241, 7402 QUAD 2-NOR gates 1242 and 1244 and 7454 DUAL 2×2 AND/OR/INVERT gate 1243.

The circuit of FIG. 49 comprises 7454 4×2 AND-/OR/INVERT gate 1420, 7451 DUAL 2×2 AND/OR-/INVERT gates 1421–1423, 7400 QUAD 2-NAND gates 1424–1431, 7404 HEX INVERTERS 1432–1439, 7402 QUAD 2-NOR gates 1440–1449 and 7420 DUAL 4-NAND gate 1450.

The circuit of FIG. 50 comprises 7400 QUAD 2-NAND gates 1451–1456, 7402 QUAD 2-NOR gate 1457, 7404 HEX INVERTERS 1458–1465 and 7440 DUAL 4-NAND BUFFER gates 1466 and 1467.

The timer consists of counter 1232 and decoder 1241. The counter is driven by a 5 megahertz clock derived from CFCLK. Q8 of counter 1232 determines if a 1Y or 2Y lead of decoder 1241 goes true while Q4 and Q6 are used for addressing. This effectively makes decoder 1241 a 1 out of 8 decoder. If there are no servicing requests, each decoder output is true for 400 nanoseconds, making the minimum cycle time 3.2 microseconds. Table 7 shows the configuration controller timing sequence generated by the circuit of FIG. 39.

Table 7

| CFC Timing (CFC 08) CTR2-2 | DEC2-1 |
|---|---|
| 0000 | CTS0 |
| 0010 | CTS1 |
| 0100 | CTS2 |
| 0110 | CTS3 |
| 1000 | CTS4 |
| 1010 | CTS5 |
| 1100 | CTS6 |
| 1110 | CTS7 |

Note:

1. Bit 1 of CTR2-2 (Q8) determines if a 1Y or 2Y lead of DEC2-1 goes low.
2. Bits 2 and 3 (Q4 and Q2) are used for addressing DEC2-1.
3. Bit 4 (Q1) does not affect DEC2-1.

Each request requires an additional 1.4 microseconds. However, the system status word is updated in both systems during every timing sequence so that the actual minimum cycle time is 6 microseconds. This circuitry services 8 types of requests. Since a system can not request both a data in and a data out simultaneously, the maximum cycle time should be 3.2 + 6 (1.4) which equals 11.4 microseconds. If a request is present, the processing cycle consists of an optional load pulse followed by 8 shift pulses and an acknowledge pulse.

The 8 time slots are used to service the following types of requests. CTS0 is used to update system A's system status word. CTS1 is used to update system B's status word. CTS2 is used to send data within the configuration controller memory to system A's fault buffer. CTS3 is used to send data from the configuration controller memory to system B's fault buffer. CTS4 is used to send data from system A's fault buffer to the configuration controller. CTS5 is used to send information to the configuration controller memory from system B's faul buffer. CTS6 is used for storing the contents of system A's system fault accumulator memory stored in the configuration control memory. And lastly, CTS7 is used for storing the contents of system B's system fault accumulator memory in the configuration controller memory.

When system A's system status word is updated in the configuration controller memory, the request is processed in the following manner. When CTSO goes true during the trailing edge of the first CSCLK pulse, it makes SSTUDA and MREQ go true via inverter 1458, inverter 1463, and NAND gate 1450 making SSTDAO SSWMD, CMSLA, and CMSLB true via inverters 1437, 1438, and NAND gate 1445, NAND gate 1446 and NAND gate 1447. MREQ maintains a load signal on counter 1232 for 1.25 microseconds by presetting flip-flop 1238 via flip-flop 1239. Flip-flop 1239 is clocked set by MREQ when a latch comprising NAND gates 1222 and 1223 is set by NAND gate 1227 being enabled and NOR gate 1242 being disabled (during the leading edge of the third CSCLK when counter 1232 Q1 lead is low and flip-flop 1240 is reset). This locks the configuration controller timing in CTSO for 1.8 microseconds. When CSHMB1 goes true and SCHMD2 goes false via NAND gates 1220 and 1230, the MIOB is placed in a shift down mode. When CMSLC and CMSLD go true via NAND gates 1430 and 1431, DTCLK1 and DTCLK2 are selected by multiplexer 1198 of FIG. 38 to produce CISHCK and CSHCLK respectively. These signals clock the MIOB (shift registers 1186, 1193, and 1197), the error buffer shift register of FIG. 47 and the status and command buffer of FIG. 43. CMSLA and CMSLB being true forces multiplexers 1209 and 1210 to preset the last digit of the address FFF25 to the configuration controller memory automatically.

When flip-flop 1180 of FIG. 35 set, flip-flops 1211 and 1214 will be set during the trailing edge of the third CSCLK. With flip-flop 1211 set and SSWMD, the first DTCLK1 pulse will be generated via NAND gate 1218, NAND gate 1229, inverter 1233 and and/or/invert gate 1243. Flip-flops 1212 and 1215 set during the trailing edge of the fourth CSCLK. Flip-flop 1215 set clears flip-flop 1239. Flip-flop 1212 set allows and/or/invert gate 1243, NAND gate 1226 to generate DTCLK1, DTCLK2 and counter 1231 to count eight CSCLK pulses. When counter 1231 at output Q8 goes high, the trailing edge of the twelfth CSCLK will reset flip-flop 1212 and counter 1231. Flip-flop 1212 causes DTCKGK to force CSHM1A true via NOR gate 1448 for the first 300 ns, then false for 800 ns. This arrangement permits bits 9–16 of A's system status word to be updated in the shift register of FIG. 47 by the first CISHCK pulse, then transmitted serially to the MIOB by the following eight CISHCK pulses. The shift register of FIG. 43 (bits 1–8 of the system status word) is inhibited during the first CISHCK pulses and then placed in the shift down mode when CSHM1A goes false. The CISCHCK and CSHCLK serially shift the data from the shift register of FIG. 47 and the shift register of FIG. 43 to the MIOB.

After flip-flop 1212 is set, flip-flop 1213 sets during the trailing edge of the fifth CSCLK, setting flip-flop 1211 during the next CFCLK. When flip-flop 1212 is reset by counter 1231, during the twelfth CFCLK, flip-flop 1213 resets during the next CFCLK. Flip-flops 1211 and 1213 being reset while flip-flop 1215 is set causes NAND gate 1216 to generate MCACK while NAND gate 1228 generates CMWRT during the fourteenth CFCLK. CMWRT writes the contents of the MIOB into the configuration controller memory. Flip-flops 1211 and 1213 reset also resets flip-flop 1214 during the trailing edge of the fourteenth CFCLK, generating CRSTM via inverter 1235, NAND gate 1227, while flip-flop 1215 is set. CRSTM clears the shift register of FIG. 47 via NAND gate 1449. Flip-flop 1215 resets during the trailing edge of the fourteenth CFCLK, resetting flip-flop 1238 and making CRSTM and MCACK false. The resetting of flip-flop 1238 allows counter 1232 to resume counting. When counter 1232 at its Q1 output lead goes high, the latch comprising NAND gates 1222 and 1223 is reset. When counter 1232 at its Q2 lead goes high, CTSO and MREQ are terminated.

An almost identical chain of events (except for labeling) takes place in a configuration controller timing when CTS1 is busy. The following differences apply to CTS2–CTS7. If anyone of these time slots are busy, MREQ lasts for 1.3 microseconds. This is because CRSTM indirectly resets the appropriate reset signal via NAND gates 1451 through 1454 that raised MREQ. If CTS2 or CTS3 are busy, LDSHR being true insures DTCLK1 has 9 clock pulses via NAND gates 1152 of FIG. 35, 1229, inverter 1233 and and/or/invert gate 1243. CSHMD1 and CSHMD2 both remain true via inverter 1234, NAND gate 1219, NAND gate 1220, and NAND gate 1230 until flip-flop 1212 sets during the trailing edge of the first DTCLK1 pulse, to load the contents of the configuration control memory into the MIOB. This disables NAND gate 1219, making CSHMD1 false for 800 ns., placing the MIOB in the shift up mode during the remaining 8 DTCLK1 pulses. Then CMWRT will write the contents of the MIOB (now all ones) back into the memory. MREQ will be generated during CTS2 by NOR gate 1440 and and/or-/invert gate 1423 if CLKRQA is true and RCVDTA is false. SDREA will also be generated via NOR gate 1440, NAND gate 1220 and inverter 1208 to enable the data channel drivers to fault buffer A. DTCAE is generated via NAND gate 1427, allowing NAND gate 1451 to generate FLGRA when CRSTM is true, resetting CLKRQA and MREQ. While DTCAE is true, CMSLA is generated via NOR gate 1446, allowing multiplexers 1209 and 1210 of FIG. 40 to select the address stored in the data channel address counter of FIG. 41 which was sent by fault buffer A. DTCAE also allows inverter 1434 of FIG. 49 and NOR gate 1443 to generate CACKA when MCACK is true. DTCAE also enables NAND gate 1236 of FIG. 39 to send eight DTCLK pulses to fault buffer A as they are needed to clock the serial data from configuration controller into the fault buffer input output buffer shift registers shown on FIGS. 27 and 29. An almost identical method for generating MREQ etc. is used during CTS3.

If CTS4, 5, 6 or 7 are busy, LDSHR and SSWMD being false enable NAND gate 1220 of FIG. 39 making CSHMD1 false. DTSTM being true for 1.3 microseconds disables NAND gate 1230, making CSHMD2 true for 1.3 microseconds. This places the MIOB in the shift up mode. When the appropriate request for CTS4, 5, 6 or 7 is present, and/or/invert gate 1243 will be made, generating MREQ via NAND gate 1450 of FIG. 49. If the request is for CTS5 or 7, and/or/invert gate 1421 of FIG. 49 will be made to generate DTSTM via NAND gate 1429 of FIG. 49 and inverter 1436, DTCBE via NAND gate 1428, CMSLB via NOR gate 1447 and CACKB via NOR gate 1444 and inverter 1435. And-/or/invert gate 1421 also makes CMSLC true via NAND gate 1430 while CMSLD remains false, allowing multiplexer 1198 of FIG. 38 to select DTCLKR from fault buffer B to generate both CSHCLK and CISHCK to clock the data from the fault buffer into the MIOB. If the request is for CTS4 or 6, and/or/invert gate 1422 generates DTSTM, DTCAE, CMSLA, and DTCAEO. CACKA is generated in a similar manner.

Figure 41:
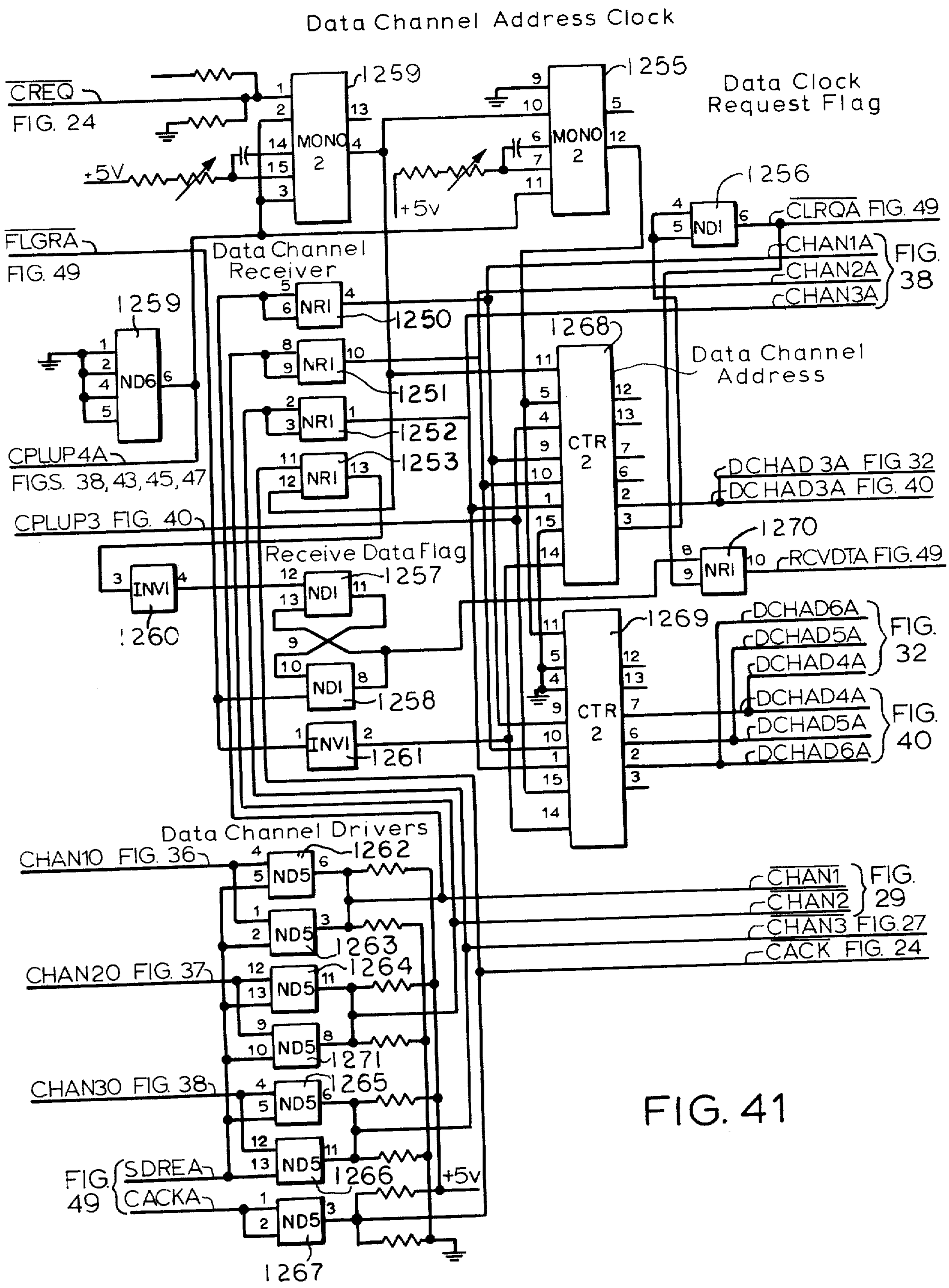
FIG. 41 is a detailed schematic circuit diagram showing the data channel control A, the receiver coupled to it, the 6 bit address register and the channel 1, 2 and 3 receivers and drivers.
Figure 42:
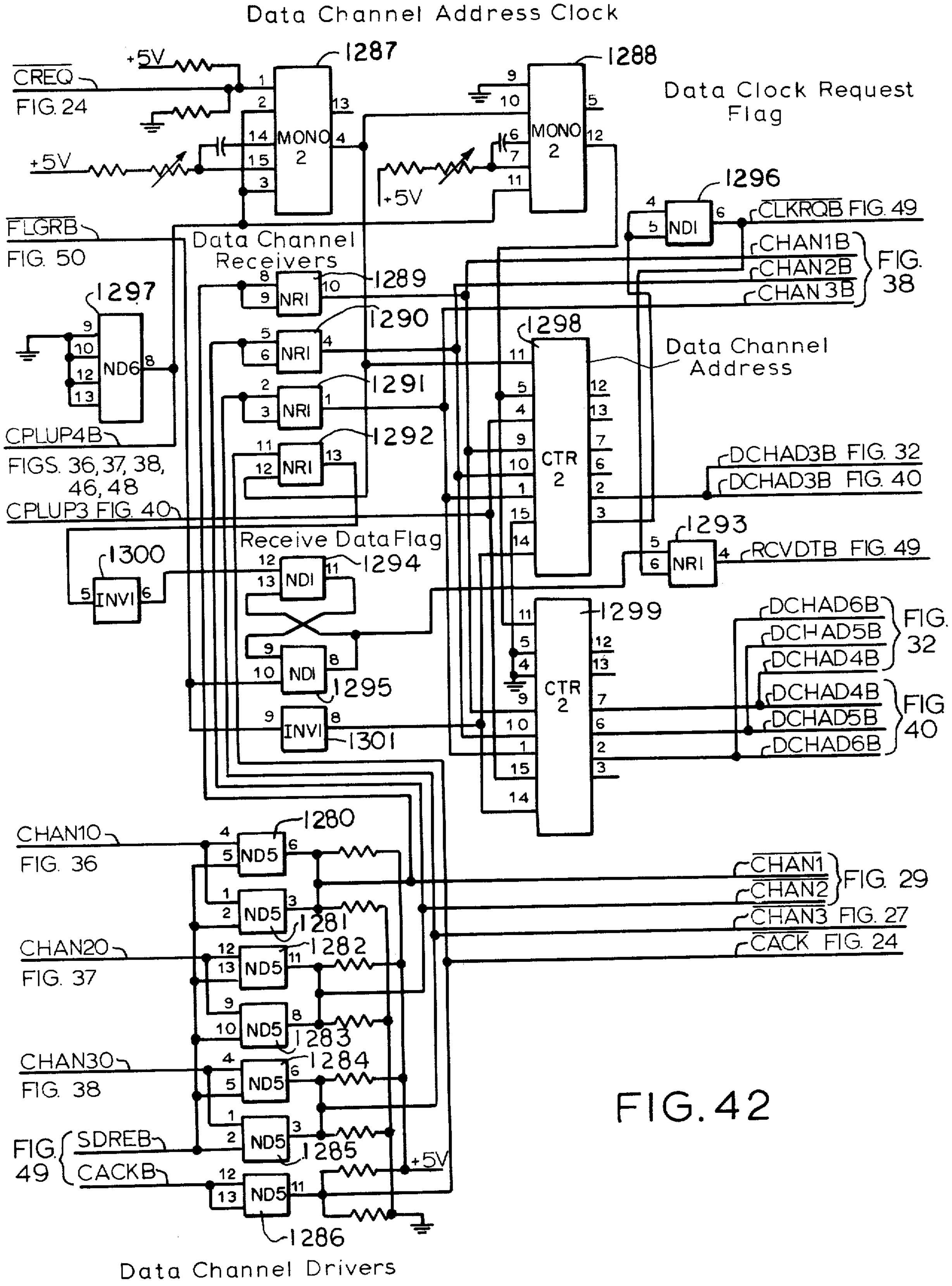
FIG. 42 is a detailed schematic circuit diagram showing the data channel control B, the receiver coupled to it, the 6 bit address register and the channels 1, 2 and 3 receivers and drivers of FIG. 3.

Referring now to FIGS. 41 and 42, FIG. 41 is a detailed schematic circuit diagram showing the data channel control A, the receiver coupled to it, the 16 bit address register, and the channel 1, 2, and 3 receivers and drivers of FIG. 3 and FIG. 42 is the detailed schematic circuit diagram showing the data channel control B, the receiver coupled to it, the 6 bit address register and the channels 1, 2 and 3 receivers and drivers of FIG. 3.

The circuit of FIG. 41 comprises 7402 QUAD 2-NOR gates 1250–1253, 74123 DUAL RETRIGGERABLE MONOSTABLES 1254 and 1255, 7400 QUAD 2-NAND gates 1256–1258, 7440 DUAL 4-NAND BUFFER gate 1259, 7404 HEX INVERTER 1260 and 1261, 7438 open collector QUAD 2-NAND BUFFER gates 1262–1267 and 1271, 74193 4-BIT UP/DOWN counters 1268 and 1269, and 7402 QUAD 2-NOR gate 1270. The circuit of FIG. 42 comprises 7438 open collector QUAD 2-NAND BUFFER gates 1280-1286, 74123 DUAL RETRIGGERABLE MONOSTABLES 1287 and 1288, 7402 QUAD 2-NOR gates 1289–1293, 7400 QUAD 2-NAND gates 1294–1296, 7440 DUAL 4-NAND BUFFER gates 1297, 74193 4-BIT UP/DOWN COUNTERS 1298 and 1299, and 7404 HEX INVERTERS 1300 and 1301.

The data channel is duplicated, one section for system A and the other for system B. Only the circuit of FIG. 41 will be described because FIG. 42 is identical except for labeling.

In the receive data mode, the fault buffer sends data to the configuration controller. This sequence begins with a communication request signal, data direction indicator and address being sent by the fault buffer. When the configuration controller receives this request, it generates two strobe signals to store the address (sent in two three bit segments) and the data channel address registers and also samples the data direction line to determine the type of request to be sent. Bits 15, 16 and 17 are stored on the first strobe pulse also causes $\overline{\text{CLKRQA}}$ to become true. IF RCVDT is also true, the scanner logic will service this request at time slot 4 for system A and time slot 5 for system B. The servicing will consist of presenting the stored address to the configuration control memory and generating the shifting sequences to move data from the fault buffer I/O shift buffer to the memory I/O buffer in the configuration controller. At the end of the shifting sequence the data is written into the address presented to the configuration control memory.

A communication request by the fault buffer begins with the $\overline{\text{CREQ}}$ signal. This triggers monostable 1254, generating a 160 ns. pulse. If while monostable 1254 at its $\overline{\text{Q}}$ lead is low NOR gate 1253 finds $\overline{\text{CACK}}$ true, it sets the receive data flag latch comprising NAND gates 1257 and 1258. This indicates the fault buffer is performing a data out cycle. The leading edge of the $\overline{\text{Q}}$ output of monostable 1254 clocks bits 15–17 of the address present on $\overline{\text{CHAN1}}$, $\overline{\text{CHAN2}}$ and $\overline{\text{CHAN3}}$ into the data channel address register counter 1268, while the trailing edge triggers monostable 1255. Monostable 1255 produces a 60 ns. pulse, clocking bits 18–20 of the address into the second data channel address register counter 1269. This 60 ns. pulse also sets the data clock request flag $\overline{\text{CLKRQA}}$ via counter 1268 at its Q1 output and NAND gate 1256. This indicates to the configuration control scanner a request for servicing. Once $\overline{\text{CLKRQA}}$ is true, RCVDTA will go true via NOR gate 1270 if the receive data flag is set. At the end of the servicing cycle, $\overline{\text{FLGRA}}$ clears both flags described above plus the data channel address register. In the send data mode, $\overline{\text{CREQ}}$ is processed the same way, except RCVDTA remains false and the data channels drivers NAND gates 1262–1266 are enabled so that the data stored at the address requested by the fault buffer is serially shifted to the fault buffers IOB via the MIOB. The fault buffer gates this data loaded into the IOB to the central processor when the configuration control scanner sends CACKA.

Figure 43:
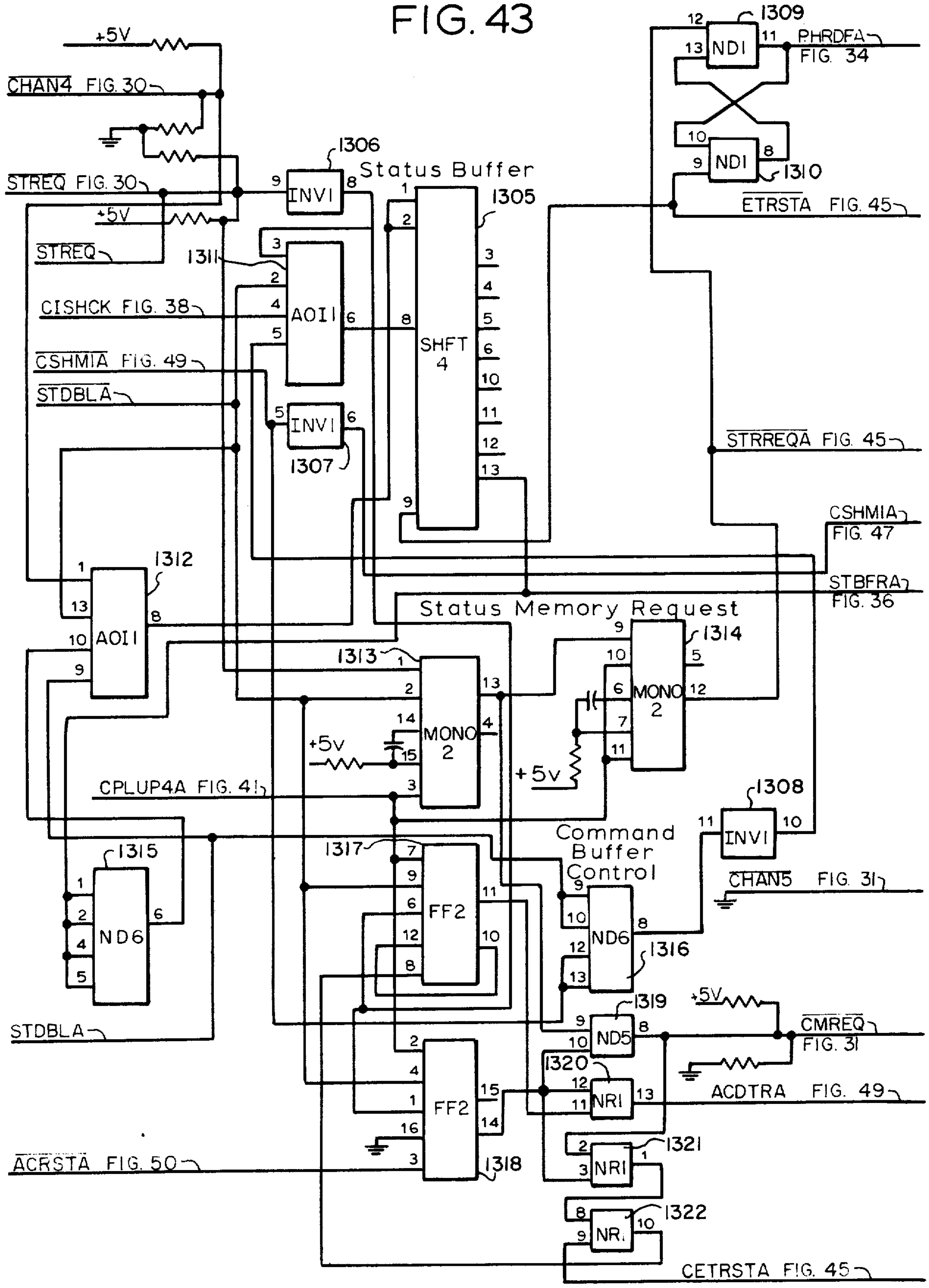
FIG. 43 is a detailed schematic circuit diagram showing the system A status buffer receiver and status buffer control.
Figure 44:
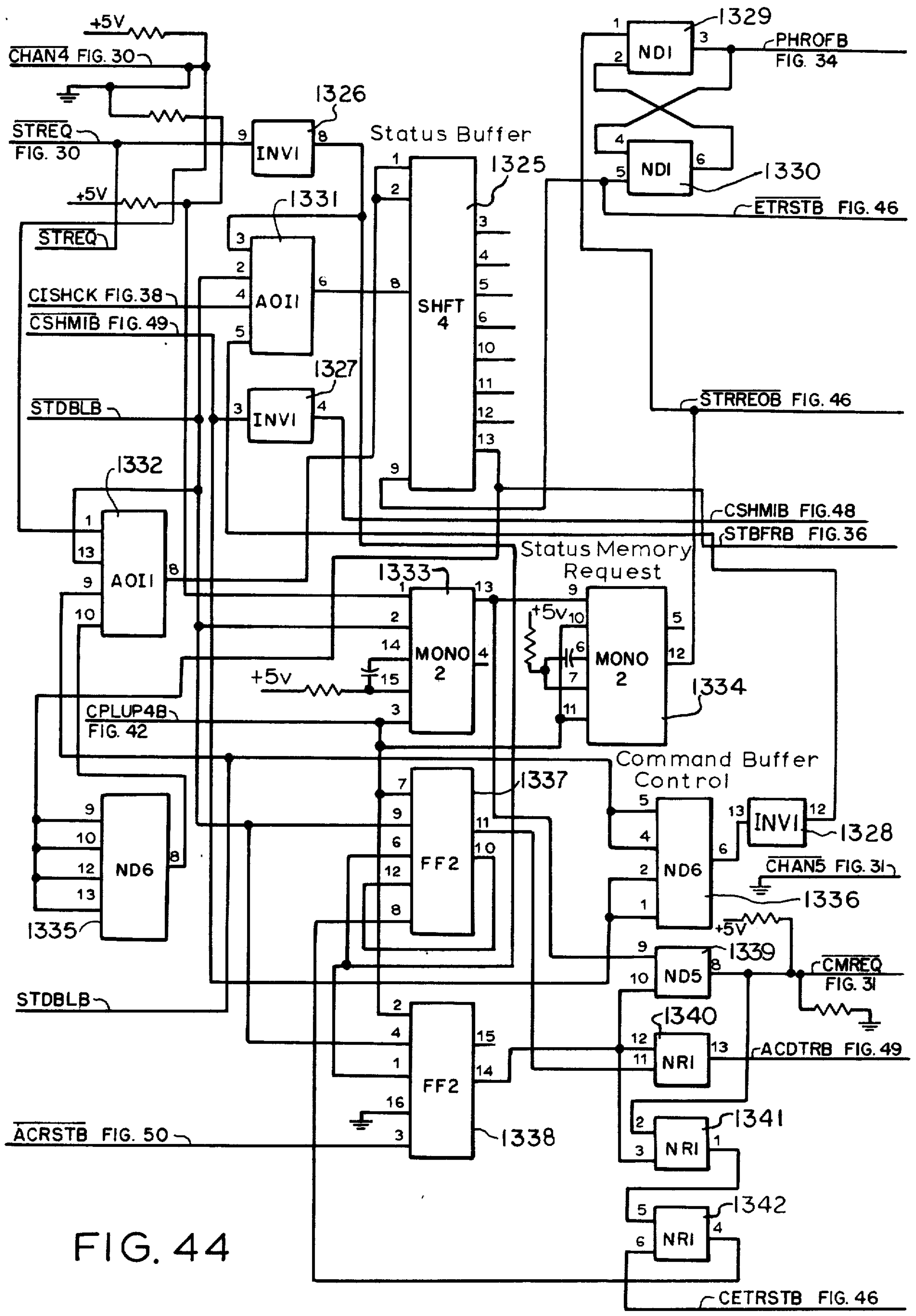
FIG. 44 is a detailed schematic circuit diagram showing the system B status buffer receiver and status buffer control of FIG. 3.

Referring now to FIGS. 43 and 44, FIG. 43 is a detailed schematic circuit diagram showing the system A status buffer receiver and status buffer control and FIG. 44 is a detailed schematic circuit diagram showing the system B status buffer receiver and status buffer control. The circuit of FIG. 43 comprises 74164 8-bit shift register 1305, 7404 HEX INVERTERS 1306–1308, 7400 QUAD 2-NAND gates 1309 and 1310, 7451 DUAL 2×2 and/or/invert gates 1311 and 1312, 74123 DUAL RETRIGGERABLE MONOSTABLES 1313 and 1314, 7440 DUAL 4-NAND BUFFER gates 1315 and 1316, 7476 DUAL JK FLIP-FLOPS 1317 and 1318, 7438 open collector QUAD 2-NAND BUFFER gates 1319, and 7402 QUAD 2-NOR gates 1320-1322. The circuit of FIG. 44 comprises 74164 8-bit shift register 1325, 7404 HEX INVERTERS 1326–1328, 7400 QUAD 2-NAND gates 1329 and 1330, 7451 DUAL 2X2 AND/OR/INVERT gates 1331 and 1332, 74123 DUAL RETRIGGERABLE MONOSTABLES 1333 and 1334, 7440 DUAL 4-NAND BUFFER gates 1335 and 1336, 7476 DUAL JK FLIP-FLOPS 1337 and 1338, 7438 open collector QUAD 2-NAND BUFFER gate 1339, and 7402 QUAD 2-NOR gates 1340–1342.

The circuit diagrams of FIGS. 43 and 44 are identical except for labeling so only FIG. 43 (system A) will be explained. If a time base failure, address time out of bus initial conditions failure is detected by the fault buffer, a status request cycle (STREQ) is started to transmit the error conditions through the configuration controller. A train of nine clock pulses is sent over the $\overline{\text{STREQ}}$ line while bits 1–8 of the system status word are serially transmitted over the $\overline{\text{CHAN4}}$ line. The first signal received by the status and command buffer is the first $\overline{\text{STREQ}}$ clock pulse, causing shift register 1305 to shift into Q1-8 the data present at the SIN2 input. Since this data has not been enabled back at the fault buffer, it will always be O. The leading edge of this pulse also triggers monostable 1313 which acts as a pulse absence detector. The following 8 pulses will keep monostable 1313 set until 250 ns after the last pulse. The trailing edge of the first $\overline{\text{STREQ}}$ pulse will clock flip-flop 1317 and flip-flop 1318 to a set condition, allowing this pulse to be returned to the fault buffer on the $\overline{\text{CMREQ}}$ lead via NAND gate 1319. Flip-flop 1318 by being set disables NAND gate 1319 and enables NOR gate 1321 to receive $\overline{\text{CMREQ}}$ from the fault buffer. The first $\overline{\text{STREQ}}$ pulse is returned to request the fault buffer to retrieve the error address stored in the location 0 of the system fault accumulator memory and place it into the fault buffer I/O shift buffer. This generates a data ready on the $\overline{\text{CMREQ}}$ lead, resetting flip-flop 1317 via NOR gate 1321, causing NOR gate 1320 to generate ACDTRA. This requests the configuration control scanner to clock this data from the fault buffer I/O to the MIOB, storing it in the configuration control memory.

Once this request has been serviced, flip-flop 1318 will be reset by $\overline{ACRSTA}$ when CRSTM goes true. When monostable 1313 resets, monostable 1314 will fire, setting the PHRDFA latch comprising NAND gates 1309 and 1310. STDBLA will go true 500 ns. after the last $\overline{STREQ}$ pulse or when CTSO begins while PHRDFA is set (whichever comes first) preventing additional status request from being serviced until PHRDFA is reset by $\overline{ETRSTA}$ and the following CTSO, or CETRSTA goes true. During CTSO, CSHMIA goes false for 800 ns., insuring the contents of shift register 1305 is transmitted to the MIOB by the remaining 8 $\overline{CISHCK}$ pulses. If STDBLA is false during CTS0, the data in shift register 1305 is destroyed after it is transferred to the MIOB. If STDBLA is true during CTS0, the contents of shift register 1305 is recirculated via and/or/invert gate 1312 and NAND gate 1315.

Figure 45:
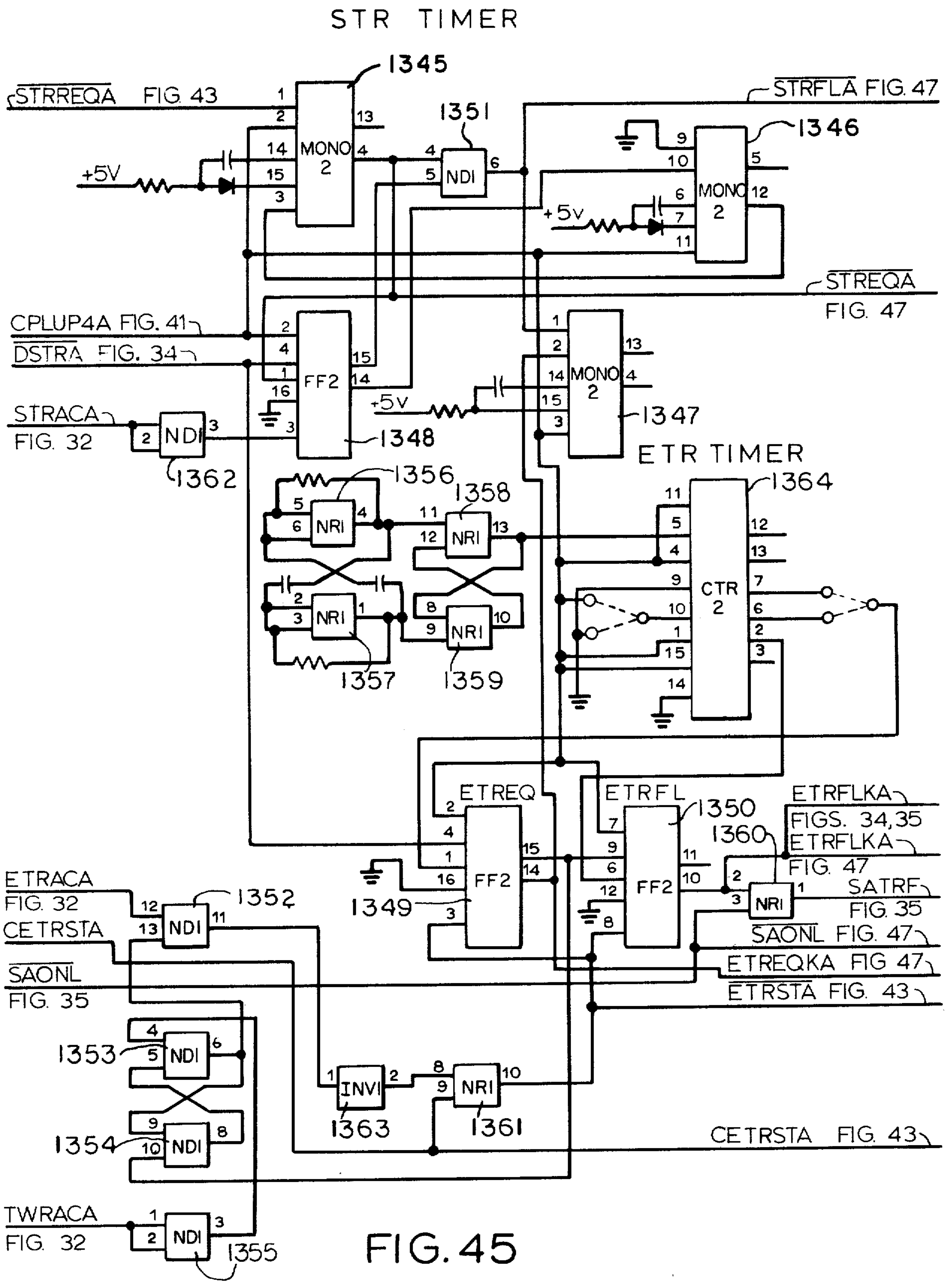
FIG. 45 is a detailed schematic circuit diagram showing the STR and ETR logic for system A of FIG. 3.
Figure 46:
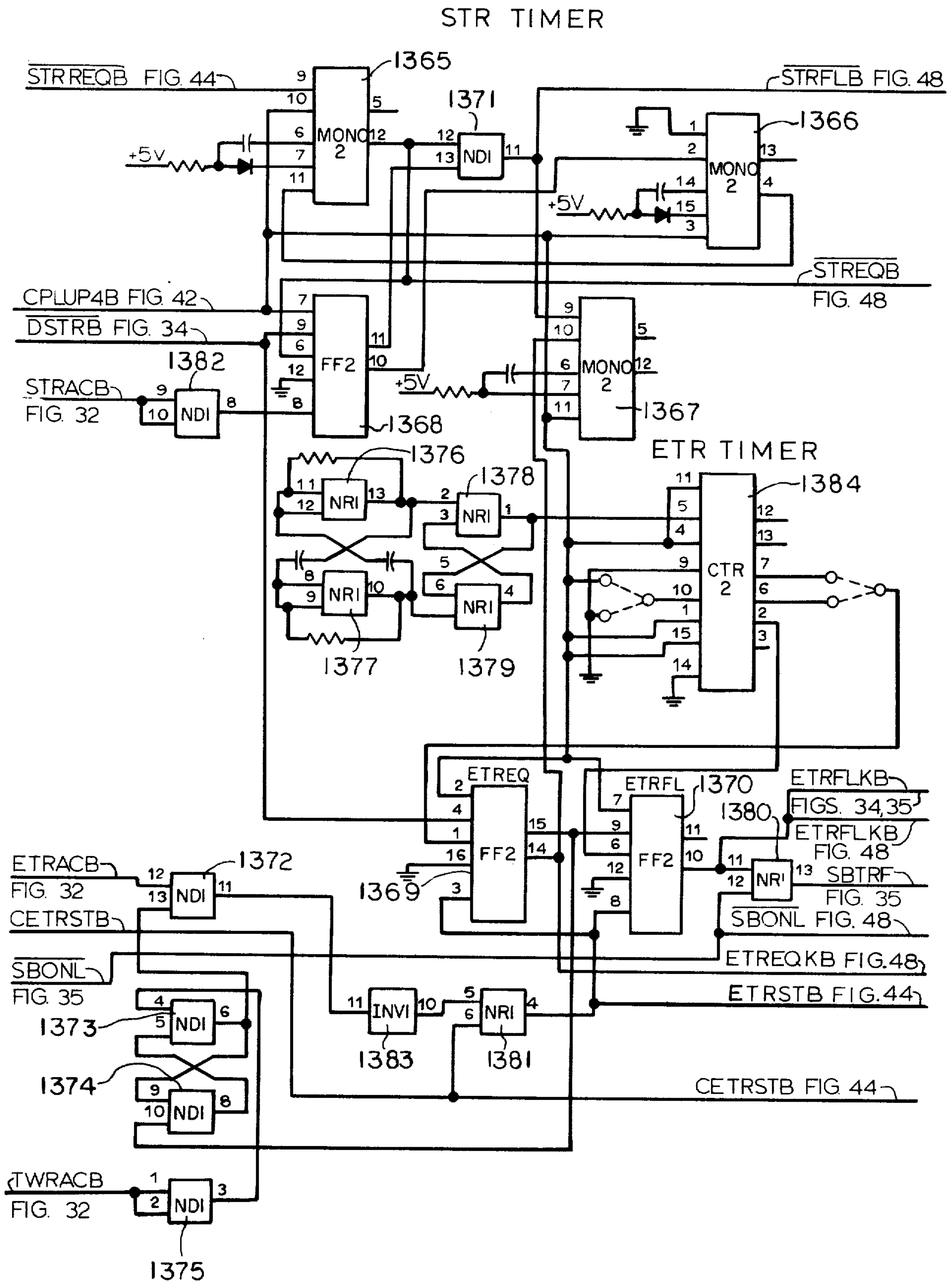
FIG. 46 is a detailed schematic circuit diagram showing the system B STR and ETR logic of FIG. 3.

Referring now to FIGS. 45 and 46, FIG. 45 is a detailed schematic circuit diagram showing the STR and ETR logic for system A and FIG. 46 is a detailed schematic circuit diagram showing the system B STR and ETR logic.

The circuit of FIG. 45 comprises 74123 DUAL RETRIGGERABLE MONOSTABLES 1345–1347, 7476 DUAL JK FLIP-FLOPS 1348–1350, 7400 QUAD 2-NAND gates 1351–1355, 7402 QUAD 2-NOR gates 1356–1361, 7400 QUAD 2-NAND gate 1362, 7404 HEX INVERTER 1363, and 74193 4-bit up/down counter 1364. The circuit of FIG. 46 comprises 74123 DUAL RETRIGGERABLE MONOSTABLES 1365–1367, 7476 DUAL JK FLIP-FLOPS 1368–1370, 7400 QUAD 2-NAND gates 1371–1375, 7402 QUAD 2-NOR gates 1376–1381, 7400 QUAD 2-NAND gate 1382, 7404 HEX INVERTER 1383, and 74193 4-bit up/down counter 1384.

Only the circuit of FIG. 45 will be described since FIGS. 45 and 46 are identical except for labeling. The ETR timer counter 1364 is clocked every 25 miliseconds by NOR gates 1356–1359. Each time counter 1364 goes low at leads Q4 of Q8, flip-flop 1349 will be set if $\overline{DSTRA}$ is false, causing an ETR request. If an ETR acknowledge is not sent within 150 miliseconds, output Q2 of counter 1364 will set flip-flop 1350 (ETR Fail). ETRACA can not reset flip-flop 1349 unless the conditioning latch comprising NAND gates 1353 and 1354 is set by TWRACA. TWRACA is true when the ETR preset word (FFF24) is accessed and SDREA is true. ETRACA is true when the ETR acknowledge register (FFF27) is accessed and $\overline{CMWRT}$ is true. Flip-flop 1350 may be cleared by software or operating the system fault reset switch.

Figure 47:
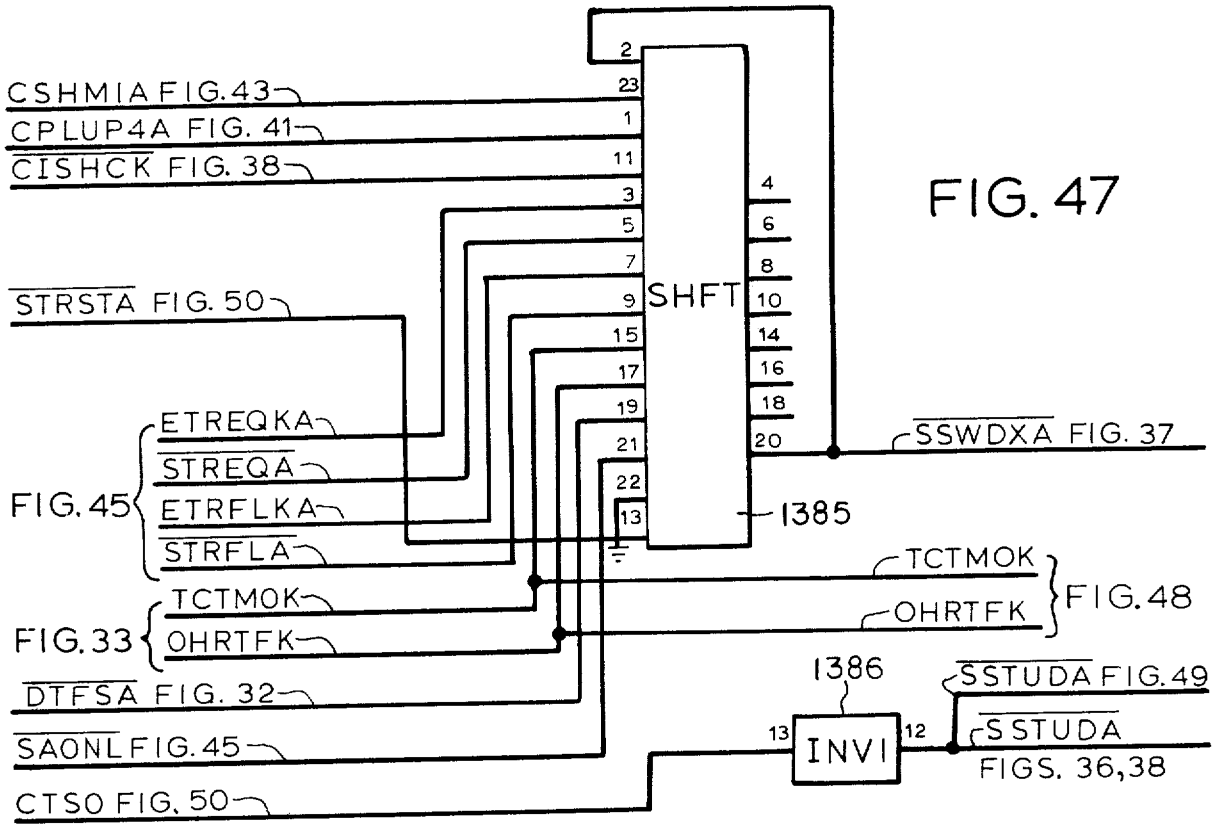
FIG. 47 is a detailed schematic circuit diagram showing the system A error buffer of FIG. 3.
Figure 48:
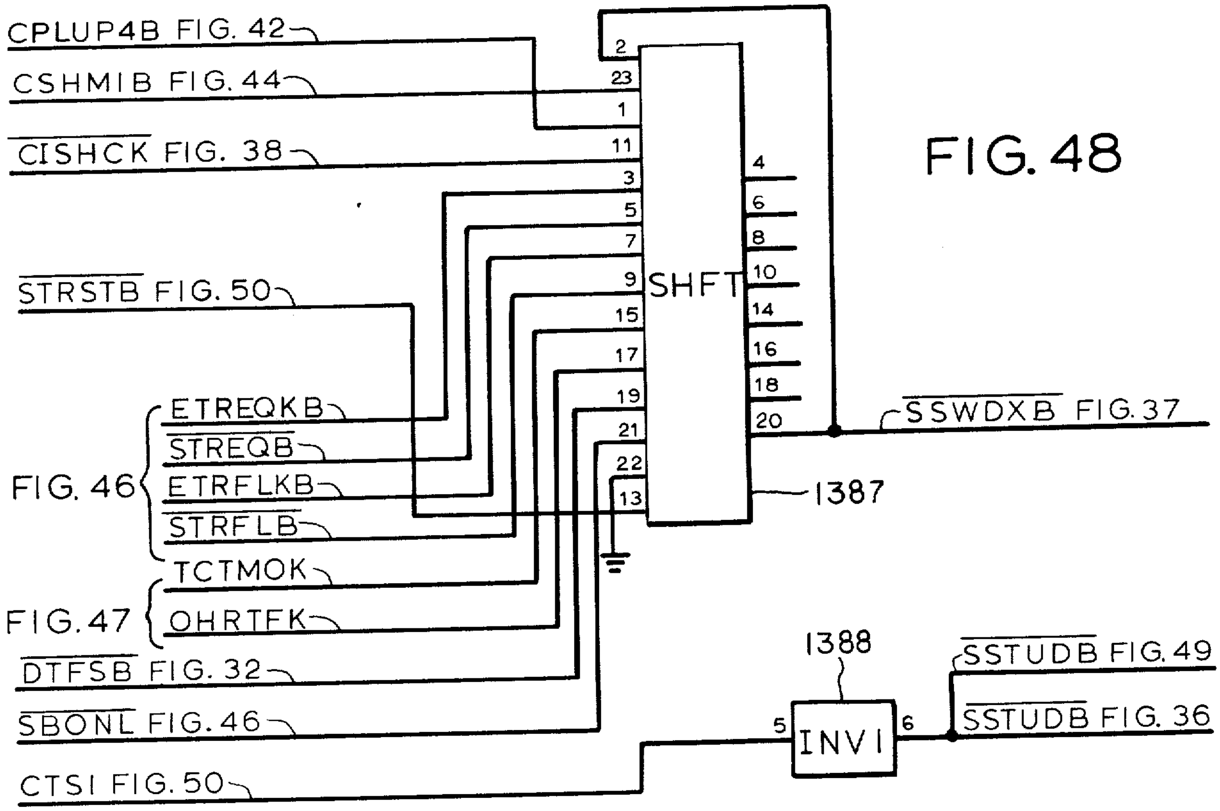
FIG. 48 is a detailed schematic circuit diagram showing the system B error buffer of FIG. 3.

Referring now to FIGS. 47 and 48, FIG. 47 is a detailed schematic circuit diagram showing the system A error buffer and FIG. 48 is a detailed schematic circuit diagram showing the system B error buffer. The circuit of FIG. 47 comprises 74198 8-bit shift register 1385 and 7404 HEX INVERTER 1386. FIG. 48 similarly comprises 74198 8-bit shift register 1387 and 7404 HEX INVERTER 1388. Only the circuit of FIG. 47 will be explained since the circuit of FIG. 48 is identical except for labeling.

The error buffer shift register 1385 is used to store bits 9–16 of system A's system status word. While CSHMIA remains true, shift register 1385 is placed in the parallel load mode, allowing $\overline{CISHCK}$ to constantly update this buffer until CSHMIA goes false after the first $\overline{CISHCK}$ pulse during CTS0. CSHMIA remains false for 800 ns., placing shift register 1385 in the shift down mode, allowing the remaining 8 $\overline{CISHCK}$ pulses to shift the contents of the error buffer to the MIOB. Shift register 1385 is cleared when CRSTM goes true.

While a particular embodiment of the invention has been shown and described it will be obvious to those skilled in the art that changes and modifications may be made without departing from the invention in its broader aspects, and therefore, the aim in the appended claims is to cover all such changes and modifications as may fall within the true spirit and scope of the invention.

We claim:

1. In a telephone exchange of the type which includes a first common data bus, a second common data bus, a first plurality of subsystems dedicated only to said first common data bus, a second plurality of subsystems dedicated only to said second common data bus and a third plurality of subsystems common to both of the first and second common data buses, wherein only one common data bus and its associated dedicated subsystems are operatively on line with the third plurality of subsystems at any instant in time for providing requested telephone subscriber service, and whrein each of the first and second dedicated subsystems includes a program memory for storing a plurality of operational codes including a plurality of test instructions, and a central processor for controlling the operation of its associated dedicated subsystems and the third plurality of subsystems in response to its program memory operational codes, a fault detection system for transferring the control of the telephone exchange from the presently on line common data bus and its associated dedicated subsystems over the off line common data bus and its associated dedicated subsystems, said fault detection system comprising:

monitoring means for monitoring the operation of the on line common data bus and its associated dedicated subsystems for providing a first multiple bit status word indicative of the operative conditions of the on line common data bus and its associated dedicated subsystems;

means coupled to said monitoring means for storing said first multiple bit status word;

status word updating means coupled to said monitoring means and said storing means for updating said first status word to indicate the current operative status of the on line common data bus and associated dedicated subsystems and for setting a bit within said first status word indicating a request for a first test routine;

means for transmitting said first status word to the on line central processor for causing it to obtain a first test instruction from its program memory and for acting thereupon;

clock means coupled to said monitoring means for setting a predetermined time period and for providing a control signal when the on line common bus and its associated dedicated subsystems fail to complete the first test instruction routine within said predetermined time; and transfer means coupled to said clock means and to said dedicated subsystems for transferring the control of the telephone exchange from the on line common data bus and its associated dedicated subsystems over to the off line common data bus and its associated dedicated subsystems in response to said control signal.

2. A fault detection system in accordance with claim 1 wherein said monitoring means also provides the off line common data bus and its associated dedicated subsystems with a second multiple bit status word, wherein one of the bits of the second multiple bit status word indicates its off line status and wherein said updating means also sets a bit in said second multiple bit status word to cause the off line central processor to initiate a second test routine, said second test routine including fewer instructions than said first test routine.

3. A fault detection system in accordance with claim 1 wherein said first common data bus and said second common data bus each comprises a plurality of lines and wherein said monitoring means includes means for detecting inoperative lines of said on line common data bus and for setting a bit in said first status word indicating the presence of an inoperative on line common data bus line.

4. A fault detection system in accordance with claim 1 wherein each central processor includes a bit time counter comprising a shift register for providing a shifting bit to initiate each operational code instruction and wherein said monitoring means includes a time base fault detector coupled to said bit time counter for detecting the absence of said shifting bit and for setting a bit in said first status word responsive to said detection.

5. A fault detection system in accordance with claim 2 further comprising interlocking means coupled to said first and second common data buses for precluding the off line data bus from transmitting data to the third plurality of subsystems.

6. A fault detection system in accordance with claim 5 further comprising write enable control means and printing means, said write enable control means being coupled to said monitoring means for setting a write bit in said second system status word and to said interlocking means for enabling said off line common bus and its associated dedicated subsystems to transmit to said printing means.

7. A fault detection system in accordance with claim 1 wherein each subsystem is assigned a discrete unique address and wherein said fault detection system additionally comprises an address selecting means, a comparator means, and a printing means, said address selecting means for selecting one of said discrete unique addresses, said comparator means being coupled to said address selecting means and to said on line common bus for comparing said selected address with the address of the subsystem transmitting data onto the on line bus, and coupled to said monitoring means for setting a print status bit in said first system status word when said selected address matches the address of the subsystem transmitting data onto the on line bus, and said printing means being responsive to said print status bit for printing the data received from the subsystem having said selected address.

8. A fault detection system in accordance with claim 1 additionally comprising an executive cycle timer and wherein the performance of a predetermined number operational codes by each central processor is an executive cycle, said executive cycle timer being coupled to said monitoring means and reset by the on line central processor at the beginning of each central processor executive cycle and adapted to establish a predetermined time interval to set an interrupt bit in said first status word for resetting the central processor when an on line central processor executive cycle exceeds said predetermined time interval.

9. A central processor in accordance with claim 8 further comprising an interrupt status means coupled to said executive cycle timer for enabling said interrupt bit to reset the on line central processor.

10. A fault detection system in accordance with claim 1 further comprising means for periodically initiating a test call for service to be processed by the on line common bus and its associated dedicated subsystems in conjunction with said third plurality of subsystems and said monitoring means including test call timing means for establishing a minimum test call execution time and providing a test call fail signal when the time required by said on line common bus and its associated dedicated subsystems in conjunction with said third plurality of subsystems to process said test call exceeds said minimum test call execution time, counting means coupled to said monitoring means for counting the test call fail signals and for setting a test call fail bit in said first system status word when a predetermined number of consecutive test call fail signals have been counted, said transfer means being responsive to said test call fail bit set for transferring control of the telephone exchange to the off line common bus and its associated dedicated subsystems.

11. A fault detection system in accordance with claim 10 wherein said predetermined number is two.

12. A fault detection system in accordance with claim 1 wherein each subsystem is assigned a discrete unique address and wherein said fault detection system includes address selecting means for selecting one of said unique discrete addresses, comparator means coupled to the on line data bus and to said address selecting means for comparing the address of the subsystem on the on line data bus to said selected address and control terminating means coupled to said comparator for terminating control of the telephone exchange by the on line bus and its associated subsystems when the address of the subsystem on the on line data bus matches said selected unique discrete address.

13. A fault detection system in accordance with claim 12 wherein said transfer means is responsive to said control terminating means for transferring control of the telephone exchange to the off line bus and its associated dedicated subsystems after the control by said on line bus and its associated dedicated subsystems has been terminated.

14. A fault detection system in accordance with claim 1 further comprising multiple transfer detecting means coupled to said transfer means for precluding further transfers after a predetermined number of transfers have occurred within a preset time period.

15. A fault detection system in accordance with claim 1 wherein each subsystem is assigned a unique discrete address and wherein the on line central processor transmits the address of each subsystem it controls over its associated data bus and wherein said fault detection system further comprises address storing means for storing the address of each subsystem controlled by the on line central processor.

16. A fault detection system in accordance with claim 1 wherein each central processor has access to said storing means and wherein one central processor addresses said storing means with a direct address and the other central processor addresses said storing means with a complement address.

17. A fault detection system in accordance with claim 1 wherein said storing means is a 20 bit store and wherein said storing means is coupled to the central processor over first, second and third lines,

18. A fault detection system in accordance with claim 17 wherein said first, second and third lines are 8 bit lines and wherein said third line utilizes only its first four bits.

* * * * *

UNITED STATES PATENT OFFICE
CERTIFICATE OF CORRECTION

PATENT NO. : 3,908,099

DATED : September 23, 1975

INVENTOR(S) : R. BORBAS and J. P. Dufton

It is certified that error appears in the above-identified patent and that said Letters Patent are hereby corrected as shown below:

Title Page [75] Inventors: name John "R." Dufton should be -- John P. Dufton --

Column 56, line 35, after "over" add -- to --

Signed and Sealed this

*twenty-third* Day of *December 1975*

[SEAL]

*Attest:*

RUTH C. MASON
*Attesting Officer*

C. MARSHALL DANN
*Commissioner of Patents and Trademarks*